US012810863B2

(12) United States Patent
Piernot et al.

(10) Patent No.: US 12,810,863 B2
(45) Date of Patent: Nov. 24, 2026

(54) REDUCING THE NEED FOR MANUAL START/END-POINTING AND TRIGGER PHRASES

(71) Applicant: Apple Inc., Cupertino, CA (US)

(72) Inventors: Philippe P. Piernot, Los Gatos, CA (US); Justin G. Binder, Oakland, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 18/903,971

(22) Filed: Oct. 1, 2024

(65) Prior Publication Data

US 2025/0022466 A1 Jan. 16, 2025

Related U.S. Application Data

(63) Continuation of application No. 18/231,135, filed on Aug. 7, 2023, now Pat. No. 12,118,999, which is a (Continued)

(51) Int. Cl.
*G10L 15/22* (2006.01)
*G06F 3/01* (2006.01)
(Continued)

(52) U.S. Cl.
CPC .............. *G10L 15/22* (2013.01); *G06F 3/013* (2013.01); *G06F 3/167* (2013.01); *G10L 15/26* (2013.01);
(Continued)

(58) Field of Classification Search
CPC ...... G10L 15/22; G10L 15/26; G10L 15/1815
See application file for complete search history.

(56) References Cited

U.S. PATENT DOCUMENTS 6,816,836 B2 11/2004 Basu et al.
8,473,485 B2 6/2013 Wong et al.
(Continued)

FOREIGN PATENT DOCUMENTS

AU 2014100581 B4 9/2014
AU 2015203483 A1 7/2015
(Continued)

OTHER PUBLICATIONS

Amazon, Alexa, "Getting your news with Alexa flash briefing", Online available at: https://www.youtube.com/watch?v=xui8rumrNaE, Sep. 9, 2019, 2 pages.
(Continued)

*Primary Examiner* — Ibrahim Siddo
(74) *Attorney, Agent, or Firm* — YHE Law LLP

(57) ABSTRACT

Systems and processes for selectively processing and responding to a spoken user input are provided. In one example, audio input containing a spoken user input can be received at a user device. The spoken user input can be identified from the audio input by identifying start and end-points of the spoken user input. It can be determined whether or not the spoken user input was intended for a virtual assistant based on contextual information. The determination can be made using a rule-based system or a probabilistic system. If it is determined that the spoken user input was intended for the virtual assistant, the spoken user input can be processed and an appropriate response can be generated. If it is instead determined that the spoken user input was not intended for the virtual assistant, the spoken user input can be ignored and/or no response can be generated.

48 Claims, 5 Drawing Sheets

Related U.S. Application Data continuation of application No. 17/461,018, filed on Aug. 30, 2021, now Pat. No. 11,810,562, which is a continuation of application No. 16/800,456, filed on Feb. 25, 2020, now Pat. No. 11,133,008, which is a continuation of application No. 16/530,708, filed on Aug. 2, 2019, now Pat. No. 10,770,073, which is a continuation of application No. 15/656,793, filed on Jul. 21, 2017, now Pat. No. 10,373,617, which is a continuation of application No. 14/502,737, filed on Sep. 30, 2014, now Pat. No. 9,715,875.

(60) Provisional application No. 62/005,760, filed on May 30, 2014.

(51) Int. Cl.
*G06F 3/16* (2006.01)
*G10L 15/26* (2006.01)
*H04W 4/02* (2018.01)
*G10L 15/18* (2013.01)
*G10L 17/00* (2013.01)

(52) U.S. Cl.
CPC ..... *H04W 4/025* (2013.01); *G06F 2203/0381* (2013.01); *G10L 15/1815* (2013.01); *G10L 15/1822* (2013.01); *G10L 2015/223* (2013.01); *G10L 2015/227* (2013.01); *G10L 2015/228* (2013.01); *G10L 17/00* (2013.01)

(56) References Cited

U.S. PATENT DOCUMENTS 8,626,681 B1 1/2014 Jurca et al.
8,630,841 B2 1/2014 Van Caldwell et al.
8,635,073 B2 1/2014 Chang
8,638,363 B2 1/2014 King et al.
8,639,516 B2 1/2014 Lindahl et al.
8,645,128 B1 2/2014 Agiomyrgiannakis
8,645,137 B2 2/2014 Bellegarda et al.
8,645,138 B1 2/2014 Weinstein et al.
8,654,936 B1 2/2014 Eslambolchi et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,924 B2 2/2014 Hoch et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,273 B1 3/2014 Fujisaki
8,676,583 B2 3/2014 Gupta et al.
8,676,904 B2 3/2014 Lindahl
8,677,377 B2 3/2014 Cheyer et al.
8,681,950 B2 3/2014 Mack et al.
8,682,667 B2 3/2014 Haughay
8,687,777 B1 4/2014 Lavian et al.
8,688,446 B2 4/2014 Yanagihara
8,688,453 B1 4/2014 Joshi et al.
8,689,135 B2 4/2014 Portele et al.
8,694,322 B2 4/2014 Snitkovskiy et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,707,195 B2 4/2014 Fleizach et al.
8,707,419 B2 4/2014 Kurapati et al.
8,712,778 B1 4/2014 Thenthiruperai
8,713,119 B2 4/2014 Lindahl et al.
8,713,418 B2 4/2014 King et al.
8,719,006 B2 5/2014 Bellegarda
8,719,014 B2 5/2014 Wagner
8,719,039 B1 5/2014 Sharifi
8,731,610 B2 5/2014 Appaji
8,731,912 B1 5/2014 Tickner et al.
8,731,942 B2 5/2014 Cheyer et al.
8,739,208 B2 5/2014 Davis et al.
8,744,852 B1 6/2014 Seymour et al.
8,744,995 B1 6/2014 Hewinson
8,751,971 B2 6/2014 Fleizach et al.
8,760,537 B2 6/2014 Johnson et al.
8,762,145 B2 6/2014 Ouchi et al.
8,762,156 B2 6/2014 Chen
8,762,469 B2 6/2014 Lindahl
8,768,693 B2 7/2014 Somekh et al.
8,768,702 B2 7/2014 Mason et al.
8,775,154 B2 7/2014 Clinchant et al.
8,775,177 B1 7/2014 Heigold et al.
8,775,341 B1 7/2014 Commons
8,775,931 B2 7/2014 Fux et al.
8,781,456 B2 7/2014 Prociw
8,781,841 B1 7/2014 Wang
8,788,271 B2 7/2014 James et al.
8,793,301 B2 7/2014 Wegenkittl et al.
8,798,255 B2 8/2014 Lubowich et al.
8,798,995 B1 8/2014 Edara
8,799,000 B2 8/2014 Guzzoni et al.
8,805,684 B1 8/2014 Aleksic et al.
8,805,690 B1 8/2014 Lebeau et al.
8,812,299 B1 8/2014 Su
8,812,302 B2 8/2014 Xiao et al.
8,812,321 B2 8/2014 Gilbert et al.
8,823,507 B1 9/2014 Touloumtzis
8,823,793 B2 9/2014 Clayton et al.
8,825,474 B1 9/2014 Zhai et al.
8,831,947 B2 9/2014 Wasserblat et al.
8,831,949 B1 9/2014 Smith et al.
8,838,454 B1 9/2014 Thenthiruperai
8,838,457 B2 9/2014 Cerra et al.
8,843,369 B1 9/2014 Sharifi
8,849,675 B1 9/2014 Foerster et al.
8,855,915 B2 10/2014 Furuhata et al.
8,861,925 B1 10/2014 Ohme
8,862,252 B2 10/2014 Rottler et al.
8,868,111 B1 10/2014 Kahn et al.
8,868,400 B2 10/2014 Susarla et al.
8,868,409 B1 10/2014 Mengibar et al.
8,868,431 B2 10/2014 Yamazaki et al.
8,868,469 B2 10/2014 Xu et al.
8,868,529 B2 10/2014 Lerenc
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,897,822 B2 11/2014 Martin
8,898,064 B1 11/2014 Thomas et al.
8,898,568 B2 11/2014 Bull et al.
8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,934,645 B2 1/2015 Coffman et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,954,440 B1 2/2015 Gattani et al.
8,958,854 B1 2/2015 Morley et al.
8,964,947 B1 2/2015 Noolu et al.
8,965,770 B2 2/2015 Petrushin
8,972,240 B2 3/2015 Brockett et al.
8,972,432 B2 3/2015 Shaw et al.
8,972,878 B2 3/2015 Mohler et al.
8,976,063 B1 3/2015 Hawkins et al.
8,976,108 B2 3/2015 Hawkins et al.

(56) References Cited

U.S. PATENT DOCUMENTS

| | | | |
|---|---|---|---|
| 8,977,255 | B2 | 3/2015 | Freeman et al. |
| 8,983,383 | B1 | 3/2015 | Haskin |
| 8,984,098 | B1 | 3/2015 | Tomkins et al. |
| 8,989,713 | B2 | 3/2015 | Doulton |
| 8,990,235 | B2 | 3/2015 | King et al. |
| 8,994,660 | B2 | 3/2015 | Neels et al. |
| 8,995,972 | B1 | 3/2015 | Cronin |
| 8,996,350 | B1 | 3/2015 | Dub et al. |
| 8,996,376 | B2 | 3/2015 | Fleizach et al. |
| 8,996,381 | B2 | 3/2015 | Mozer et al. |
| 8,996,550 | B2 | 3/2015 | Ko et al. |
| 8,996,639 | B1 | 3/2015 | Faaborg et al. |
| 9,002,703 | B1 | 4/2015 | Crosley |
| 9,002,714 | B2 | 4/2015 | Kim et al. |
| 9,009,046 | B1 | 4/2015 | Stewart |
| 9,013,992 | B2 | 4/2015 | Perkins |
| 9,015,036 | B2 | 4/2015 | Zangvil et al. |
| 9,020,804 | B2 | 4/2015 | Barbaiani et al. |
| 9,026,425 | B2 | 5/2015 | Nikoulina et al. |
| 9,026,426 | B2 | 5/2015 | Wu et al. |
| 9,031,834 | B2 | 5/2015 | Coorman et al. |
| 9,031,970 | B1 | 5/2015 | Das et al. |
| 9,037,967 | B1 | 5/2015 | Al-Jefri et al. |
| 9,043,208 | B2 | 5/2015 | Koch et al. |
| 9,043,210 | B1 | 5/2015 | Adcock et al. |
| 9,043,211 | B2 | 5/2015 | Haiut et al. |
| 9,043,319 | B1 | 5/2015 | Burns et al. |
| 9,046,932 | B2 | 6/2015 | Medlock et al. |
| 9,049,255 | B2 | 6/2015 | Macfarlane et al. |
| 9,049,295 | B1 | 6/2015 | Cooper et al. |
| 9,053,706 | B2 | 6/2015 | Jitkoff et al. |
| 9,058,105 | B2 | 6/2015 | Drory et al. |
| 9,058,332 | B1 | 6/2015 | Darby et al. |
| 9,058,811 | B2 | 6/2015 | Wang et al. |
| 9,063,979 | B2 | 6/2015 | Chiu et al. |
| 9,064,495 | B1 | 6/2015 | Torok et al. |
| 9,065,660 | B2 | 6/2015 | Ellis et al. |
| 9,070,247 | B2 | 6/2015 | Kuhn et al. |
| 9,070,366 | B1 | 6/2015 | Mathias et al. |
| 9,071,701 | B2 | 6/2015 | Donaldson et al. |
| 9,075,435 | B1 | 7/2015 | Noble et al. |
| 9,075,824 | B2 | 7/2015 | Gordo et al. |
| 9,076,448 | B2 | 7/2015 | Bennett et al. |
| 9,076,450 | B1 | 7/2015 | Sadek et al. |
| 9,081,411 | B2 | 7/2015 | Kalns et al. |
| 9,081,482 | B1 | 7/2015 | Zhai et al. |
| 9,082,402 | B2 | 7/2015 | Yadgar et al. |
| 9,083,581 | B1 | 7/2015 | Addepalli et al. |
| 9,087,508 | B1 | 7/2015 | Dzik |
| 9,092,433 | B2 | 7/2015 | Rodriguez |
| 9,092,789 | B2 | 7/2015 | Anshul |
| 9,094,576 | B1 | 7/2015 | Karakotsios |
| 9,094,636 | B1 | 7/2015 | Sanders et al. |
| 9,098,467 | B1 | 8/2015 | Blanksteen et al. |
| 9,101,279 | B2 | 8/2015 | Ritchey et al. |
| 9,110,635 | B2 | 8/2015 | Knox et al. |
| 9,112,984 | B2 | 8/2015 | Sejnoha et al. |
| 9,117,212 | B2 | 8/2015 | Sheets et al. |
| 9,117,447 | B2 | 8/2015 | Gruber et al. |
| 9,122,697 | B1 | 9/2015 | Bono et al. |
| 9,123,338 | B1 | 9/2015 | Sanders et al. |
| 9,143,907 | B1 | 9/2015 | Caldwell et al. |
| 9,159,319 | B1 | 10/2015 | Hoffmeister |
| 9,164,983 | B2 | 10/2015 | Liu et al. |
| 9,171,541 | B2 | 10/2015 | Kennewick et al. |
| 9,171,546 | B1 | 10/2015 | Pike |
| 9,172,747 | B2 | 10/2015 | Walters et al. |
| 9,183,845 | B1 | 11/2015 | Gopalakrishnan et al. |
| 9,190,062 | B2 | 11/2015 | Haughay |
| 9,195,746 | B2 | 11/2015 | Tomko et al. |
| 9,196,245 | B2 | 11/2015 | Larcheveque et al. |
| 9,197,848 | B2 | 11/2015 | Felkai et al. |
| 9,201,955 | B1 | 12/2015 | Quintao et al. |
| 9,202,520 | B1 | 12/2015 | Tang |
| 9,207,835 | B1 | 12/2015 | Yang et al. |
| 9,208,153 | B1 | 12/2015 | Zaveri et al. |
| 9,213,754 | B1 | 12/2015 | Zhan et al. |
| 9,214,137 | B2 | 12/2015 | Bala et al. |
| 9,218,122 | B2 | 12/2015 | Thoma et al. |
| 9,218,809 | B2 | 12/2015 | Bellegard et al. |
| 9,218,819 | B1 | 12/2015 | Stekkelpa et al. |
| 9,223,529 | B1 | 12/2015 | Khafizova |
| 9,223,537 | B2 | 12/2015 | Brown et al. |
| 9,230,561 | B2 | 1/2016 | Ostermann et al. |
| 9,232,293 | B1 | 1/2016 | Hanson |
| 9,236,047 | B2 | 1/2016 | Rasmussen |
| 9,240,022 | B2 | 1/2016 | Treyz et al. |
| 9,241,073 | B1 | 1/2016 | Rensburg et al. |
| 9,245,151 | B2 | 1/2016 | LeBeau et al. |
| 9,245,388 | B2 | 1/2016 | Poulos et al. |
| 9,246,984 | B2 | 1/2016 | Zises |
| 9,247,377 | B2 | 1/2016 | Pai et al. |
| 9,247,525 | B2 | 1/2016 | Jacobs et al. |
| 9,250,703 | B2 | 2/2016 | Hernandez-Abrego et al. |
| 9,251,713 | B1 | 2/2016 | Giovanniello et al. |
| 9,251,787 | B1 | 2/2016 | Hart et al. |
| 9,255,812 | B2 | 2/2016 | Maeoka et al. |
| 9,256,596 | B2 | 2/2016 | Nissan et al. |
| 9,257,120 | B1 | 2/2016 | Guevara et al. |
| 9,258,604 | B1 | 2/2016 | Bilobrov et al. |
| 9,262,412 | B2 | 2/2016 | Yang et al. |
| 9,262,612 | B2 | 2/2016 | Cheyer |
| 9,263,058 | B2 | 2/2016 | Huang et al. |
| 9,274,598 | B2 | 3/2016 | Beymer et al. |
| 9,280,535 | B2 | 3/2016 | Varma et al. |
| 9,282,211 | B2 | 3/2016 | Osawa |
| 9,286,287 | B1 | 3/2016 | Tierney |
| 9,286,727 | B2 | 3/2016 | Kim et al. |
| 9,286,910 | B1 | 3/2016 | Li et al. |
| 9,292,487 | B1 | 3/2016 | Weber |
| 9,292,489 | B1 | 3/2016 | Sak et al. |
| 9,292,492 | B2 | 3/2016 | Sarikaya et al. |
| 9,298,358 | B1 | 3/2016 | Wilden et al. |
| 9,299,344 | B2 | 3/2016 | Braho et al. |
| 9,300,718 | B2 | 3/2016 | Khanna |
| 9,301,256 | B2 | 3/2016 | Mohan et al. |
| 9,305,543 | B2 | 4/2016 | Fleizach et al. |
| 9,305,548 | B2 | 4/2016 | Kennewick et al. |
| 9,311,308 | B2 | 4/2016 | Sankarasubramaniam et al. |
| 9,311,912 | B1 | 4/2016 | Swietlinski et al. |
| 9,313,317 | B1 | 4/2016 | LeBeau et al. |
| 9,318,108 | B2 | 4/2016 | Gruber et al. |
| 9,325,809 | B1 | 4/2016 | Barros et al. |
| 9,325,842 | B1 | 4/2016 | Siddiqi et al. |
| 9,330,659 | B2 | 5/2016 | Ju et al. |
| 9,330,668 | B2 | 5/2016 | Nanavati et al. |
| 9,330,720 | B2 | 5/2016 | Lee |
| 9,335,983 | B2 | 5/2016 | Breiner et al. |
| 9,336,514 | B2 | 5/2016 | Gittleman |
| 9,338,057 | B2 | 5/2016 | Jangra et al. |
| 9,338,242 | B1 | 5/2016 | Suchland et al. |
| 9,338,493 | B2 | 5/2016 | Van Os et al. |
| 9,342,829 | B2 | 5/2016 | Zhou et al. |
| 9,342,930 | B1 | 5/2016 | Kraft et al. |
| 9,349,368 | B1 | 5/2016 | Lebeau et al. |
| 9,355,472 | B2 | 5/2016 | Kocienda et al. |
| 9,361,084 | B1 | 6/2016 | Costa |
| 9,361,625 | B2 | 6/2016 | Parker et al. |
| 9,367,541 | B1 | 6/2016 | Servan et al. |
| 9,368,114 | B2 | 6/2016 | Larson et al. |
| 9,377,865 | B2 | 6/2016 | Berenson et al. |
| 9,377,871 | B2 | 6/2016 | Waddell et al. |
| 9,378,456 | B2 | 6/2016 | White et al. |
| 9,378,740 | B1 | 6/2016 | Rosen et al. |
| 9,380,155 | B1 | 6/2016 | Reding et al. |
| 9,383,827 | B1 | 7/2016 | Faaborg et al. |
| 9,384,185 | B2 | 7/2016 | Medlock et al. |
| 9,390,726 | B1 | 7/2016 | Smus et al. |
| 9,396,722 | B2 | 7/2016 | Chung et al. |
| 9,400,779 | B2 | 7/2016 | Convertino et al. |
| 9,401,140 | B1 | 7/2016 | Weber et al. |
| 9,401,147 | B2 | 7/2016 | Jitkoff et al. |
| 9,405,741 | B1 | 8/2016 | Schaaf et al. |
| 9,406,224 | B1 | 8/2016 | Sanders et al. |

(56) References Cited

U.S. PATENT DOCUMENTS

| | | | |
|---|---|---|---|
| 9,406,299 | B2 | 8/2016 | Gollan et al. |
| 9,408,182 | B1 | 8/2016 | Hurley et al. |
| 9,412,392 | B2 | 8/2016 | Lindahl |
| 9,418,650 | B2 | 8/2016 | Bharadwaj et al. |
| 9,423,266 | B2 | 8/2016 | Clark et al. |
| 9,424,246 | B2 | 8/2016 | Spencer et al. |
| 9,424,840 | B1 | 8/2016 | Hart et al. |
| 9,431,021 | B1 | 8/2016 | Scalise et al. |
| 9,432,499 | B2 | 8/2016 | Hajdu et al. |
| 9,436,918 | B2 | 9/2016 | Pantel et al. |
| 9,437,186 | B1 | 9/2016 | Liu et al. |
| 9,437,189 | B2 | 9/2016 | Epstein et al. |
| 9,442,687 | B2 | 9/2016 | Park et al. |
| 9,443,527 | B1 | 9/2016 | Watanabe et al. |
| 9,445,230 | B1 | 9/2016 | Sipher et al. |
| 9,454,599 | B2 | 9/2016 | Golden et al. |
| 9,454,957 | B1 | 9/2016 | Mathias et al. |
| 9,460,713 | B1 | 10/2016 | Mengibar et al. |
| 9,465,798 | B2 | 10/2016 | Lin |
| 9,465,833 | B2 | 10/2016 | Aravamudan et al. |
| 9,465,864 | B2 | 10/2016 | Hu et al. |
| 9,466,027 | B2 | 10/2016 | Byrne et al. |
| 9,466,121 | B2 | 10/2016 | Yang et al. |
| 9,466,294 | B1 | 10/2016 | Tunstall-Pedoe et al. |
| 9,471,566 | B1 | 10/2016 | Zhang et al. |
| 9,472,196 | B1 | 10/2016 | Wang et al. |
| 9,483,388 | B2 | 11/2016 | Sankaranarasimhan et al. |
| 9,483,461 | B2 | 11/2016 | Fleizach et al. |
| 9,483,529 | B1 | 11/2016 | Pasoi et al. |
| 9,484,021 | B1 | 11/2016 | Mairesse et al. |
| 9,485,286 | B1 | 11/2016 | Sellier et al. |
| 9,495,129 | B2 | 11/2016 | Fleizach et al. |
| 9,495,801 | B2 | 11/2016 | Ebstyne et al. |
| 9,501,741 | B2 | 11/2016 | Yu |
| 9,502,025 | B2 | 11/2016 | Purcell et al. |
| 9,508,028 | B2 | 11/2016 | Bannister et al. |
| 9,510,044 | B1 | 11/2016 | Pereira et al. |
| 9,514,470 | B2 | 12/2016 | Topatan et al. |
| 9,516,014 | B2 | 12/2016 | Zafiroglu et al. |
| 9,519,453 | B2 | 12/2016 | Perkuhn et al. |
| 9,524,347 | B1 | 12/2016 | Jung et al. |
| 9,524,355 | B2 | 12/2016 | Forbes et al. |
| 9,529,500 | B1 | 12/2016 | Gauci et al. |
| 9,531,803 | B2 | 12/2016 | Chen et al. |
| 9,531,823 | B1 | 12/2016 | Suchland et al. |
| 9,531,862 | B1 | 12/2016 | Vadodaria |
| 9,535,906 | B2 | 1/2017 | Lee et al. |
| 9,536,518 | B2 | 1/2017 | Itoh et al. |
| 9,536,527 | B1 | 1/2017 | Carlson |
| 9,536,544 | B2 | 1/2017 | Osterman et al. |
| 9,547,647 | B2 | 1/2017 | Badaskar |
| 9,548,050 | B2 | 1/2017 | Gruber et al. |
| 9,548,053 | B1 | 1/2017 | Basye et al. |
| 9,548,979 | B1 | 1/2017 | Johnson et al. |
| 9,569,549 | B1 | 2/2017 | Jenkins et al. |
| 9,571,645 | B2 | 2/2017 | Quast et al. |
| 9,571,995 | B1 | 2/2017 | Scheer et al. |
| 9,574,894 | B1 | 2/2017 | Karakotsios et al. |
| 9,575,964 | B2 | 2/2017 | Yadgar et al. |
| 9,576,196 | B1 | 2/2017 | Natarajan |
| 9,576,575 | B2 | 2/2017 | Heide |
| 9,578,173 | B2 | 2/2017 | Sanghavi et al. |
| 9,584,946 | B1 | 2/2017 | Lyren et al. |
| 9,586,318 | B2 | 3/2017 | Djugash et al. |
| 9,602,946 | B2 | 3/2017 | Karkkainen et al. |
| 9,606,986 | B2 | 3/2017 | Bellegarda |
| 9,607,612 | B2 | 3/2017 | Deleeuw |
| 9,612,999 | B2 | 4/2017 | Prakah-Asante et al. |
| 9,619,200 | B2 | 4/2017 | Chakladar et al. |
| 9,619,459 | B2 | 4/2017 | Hebert et al. |
| 9,620,113 | B2 | 4/2017 | Kennewick et al. |
| 9,620,126 | B2 | 4/2017 | Chiba |
| 9,626,695 | B2 | 4/2017 | Balasubramanian et al. |
| 9,626,799 | B2 | 4/2017 | McArdle et al. |
| 9,626,955 | B2 | 4/2017 | Fleizach et al. |
| 9,628,844 | B2 | 4/2017 | Conrad et al. |
| 9,633,004 | B2 | 4/2017 | Giuli et al. |
| 9,633,191 | B2 | 4/2017 | Fleizach et al. |
| 9,633,660 | B2 | 4/2017 | Haughay |
| 9,633,674 | B2 | 4/2017 | Sinha |
| 9,646,313 | B2 | 5/2017 | Kim et al. |
| 9,648,107 | B1 | 5/2017 | Penilla et al. |
| 9,652,453 | B2 | 5/2017 | Mathur et al. |
| 9,653,067 | B2 | 5/2017 | Brooks et al. |
| 9,658,746 | B2 | 5/2017 | Cohn et al. |
| 9,659,002 | B2 | 5/2017 | Medlock et al. |
| 9,659,298 | B2 | 5/2017 | Lynch et al. |
| 9,665,567 | B2 | 5/2017 | Li et al. |
| 9,665,662 | B1 | 5/2017 | Gautam et al. |
| 9,668,121 | B2 | 5/2017 | Naik et al. |
| 9,672,725 | B2 | 6/2017 | Dotan-Cohen et al. |
| 9,672,822 | B2 | 6/2017 | Brown et al. |
| 9,678,664 | B2 | 6/2017 | Zhai et al. |
| 9,679,570 | B1 | 6/2017 | Edara |
| 9,690,542 | B2 | 6/2017 | Reddy et al. |
| 9,691,161 | B1 | 6/2017 | Yalniz et al. |
| 9,691,378 | B1 | 6/2017 | Meyers et al. |
| 9,691,384 | B1 | 6/2017 | Wang et al. |
| 9,696,963 | B2 | 7/2017 | Son et al. |
| 9,697,016 | B2 | 7/2017 | Jacob |
| 9,697,822 | B1 | 7/2017 | Naik et al. |
| 9,697,827 | B1 | 7/2017 | Lilly et al. |
| 9,697,828 | B1 | 7/2017 | Prasad et al. |
| 9,697,829 | B1 | 7/2017 | Tickner et al. |
| 9,698,999 | B2 | 7/2017 | Mutagi |
| 9,711,148 | B1 | 7/2017 | Sharifi et al. |
| 9,715,875 | B2 | 7/2017 | Piernot et al. |
| 9,720,907 | B2 | 8/2017 | Bangalore et al. |
| 9,721,566 | B2 | 8/2017 | Newendorp et al. |
| 9,721,570 | B1 | 8/2017 | Beal et al. |
| 9,723,130 | B2 | 8/2017 | Rand |
| 9,734,817 | B1 | 8/2017 | Putrycz |
| 9,734,839 | B1 | 8/2017 | Adams |
| 9,741,343 | B1 | 8/2017 | Miles et al. |
| 9,747,083 | B1 | 8/2017 | Roman et al. |
| 9,747,093 | B2 | 8/2017 | Latino et al. |
| 9,754,016 | B1 | 9/2017 | Bozarth et al. |
| 9,754,591 | B1 | 9/2017 | Kumar et al. |
| 9,755,605 | B1 | 9/2017 | Li et al. |
| 9,760,566 | B2 | 9/2017 | Heck et al. |
| 9,767,710 | B2 | 9/2017 | Lee et al. |
| 9,772,994 | B2 | 9/2017 | Karov et al. |
| 9,779,517 | B2 | 10/2017 | Ballard et al. |
| 9,786,271 | B1 | 10/2017 | Combs et al. |
| 9,792,907 | B2 | 10/2017 | Bocklet et al. |
| 9,798,719 | B2 | 10/2017 | Karov et al. |
| 9,812,128 | B2 | 11/2017 | Mixter et al. |
| 9,813,882 | B1 | 11/2017 | Masterman |
| 9,818,400 | B2 | 11/2017 | Paulik et al. |
| 9,823,811 | B2 | 11/2017 | Brown et al. |
| 9,823,828 | B2 | 11/2017 | Zambetti et al. |
| 9,824,379 | B2 | 11/2017 | Khandelwal et al. |
| 9,824,691 | B1 | 11/2017 | Montero et al. |
| 9,824,692 | B1 | 11/2017 | Khoury et al. |
| 9,830,044 | B2 | 11/2017 | Brown et al. |
| 9,830,449 | B1 | 11/2017 | Wagner |
| 9,842,168 | B2 | 12/2017 | Heck et al. |
| 9,842,584 | B1 | 12/2017 | Hart et al. |
| 9,846,685 | B2 | 12/2017 | Li |
| 9,846,836 | B2 | 12/2017 | Gao et al. |
| 9,858,925 | B2 | 1/2018 | Gruber et al. |
| 9,858,927 | B2 | 1/2018 | Williams et al. |
| 9,886,953 | B2 | 2/2018 | Lemay et al. |
| 9,887,949 | B2 | 2/2018 | Shepherd et al. |
| 9,891,811 | B2 | 2/2018 | Federighi et al. |
| 9,892,732 | B1 | 2/2018 | Tian et al. |
| 9,911,415 | B2 | 3/2018 | Vanblon et al. |
| 9,916,839 | B1 | 3/2018 | Scalise et al. |
| 9,922,642 | B2 | 3/2018 | Pitschel et al. |
| 9,928,835 | B1 | 3/2018 | Tang |
| 9,934,777 | B1 | 4/2018 | Joseph et al. |
| 9,934,785 | B1 | 4/2018 | Hulaud |
| 9,940,616 | B1 | 4/2018 | Morgan et al. |
| 9,946,862 | B2 | 4/2018 | Yun et al. |

(56) References Cited

U.S. PATENT DOCUMENTS 9,948,728 B2 4/2018 Linn et al.
9,953,634 B1 4/2018 Pearce et al.
9,959,129 B2 5/2018 Kannan et al.
9,959,506 B1 5/2018 Karppanen
9,959,867 B2 5/2018 Lindahl
9,966,065 B2 5/2018 Gruber et al.
9,966,068 B2 5/2018 Cash et al.
9,967,381 B1 5/2018 Kashimba et al.
9,971,495 B2 5/2018 Shetty et al.
9,972,304 B2 5/2018 Paulik et al.
9,972,318 B1 5/2018 Kelly et al.
9,978,180 B2 5/2018 Margolis et al.
9,983,785 B2 5/2018 Wong et al.
9,984,686 B1 5/2018 Mutagi et al.
9,986,419 B2 5/2018 Naik et al.
9,990,129 B2 6/2018 Yang et al.
9,990,176 B1 6/2018 Gray
9,990,921 B2 6/2018 Vanblon et al.
9,990,926 B1 6/2018 Pearce
9,996,626 B1 6/2018 Bailey et al.
9,998,552 B1 6/2018 Ledet
10,001,817 B2 6/2018 Zambetti et al.
10,009,666 B1 6/2018 Van Scheltinga et al.
10,013,416 B1 7/2018 Bhardwaj et al.
10,013,654 B1 7/2018 Levy et al.
10,013,979 B1 7/2018 Roma et al.
10,019,436 B2 7/2018 Huang
10,025,378 B2 7/2018 Venable et al.
10,026,209 B1 7/2018 Dagley et al.
10,026,401 B1 7/2018 Mutagi et al.
10,027,662 B1 7/2018 Mutagi et al.
10,032,451 B1 7/2018 Mamkina et al.
10,032,455 B2 7/2018 Newman et al.
10,037,758 B2 7/2018 Jing et al.
10,043,516 B2 8/2018 Saddler et al.
10,048,748 B2 8/2018 Sridharan et al.
10,049,161 B2 8/2018 Kaneko
10,049,663 B2 8/2018 Orr et al.
10,049,668 B2 8/2018 Huang et al.
10,055,390 B2 8/2018 Sharifi et al.
10,055,681 B2 8/2018 Brown et al.
10,068,570 B2 9/2018 Dai et al.
10,074,360 B2 9/2018 Kim
10,074,371 B1 9/2018 Wang et al.
10,078,487 B2 9/2018 Gruber et al.
10,083,213 B1 9/2018 Podgorny et al.
10,083,688 B2 9/2018 Piernot et al.
10,083,690 B2 9/2018 Giuli et al.
10,088,972 B2 10/2018 Brown et al.
10,089,072 B2 10/2018 Piersol et al.
10,089,393 B2 10/2018 Agarwal et al.
10,089,983 B1 10/2018 Gella et al.
10,096,319 B1 10/2018 Jin et al.
10,101,887 B2 10/2018 Bernstein et al.
10,102,359 B2 10/2018 Cheyer
10,102,675 B2 10/2018 Fan et al.
10,102,851 B1 10/2018 Kiss et al.
10,115,055 B2 10/2018 Weiss et al.
10,127,901 B2 11/2018 Zhao et al.
10,127,908 B1 11/2018 Deller et al.
10,127,926 B2 11/2018 James
10,134,425 B1 11/2018 Johnson, Jr.
10,135,965 B2 11/2018 Woolsey et al.
10,140,845 B1 11/2018 Knas
10,142,222 B1 11/2018 Zhang
10,146,923 B2 12/2018 Pitkanen et al.
10,147,421 B2 12/2018 Liddell et al.
10,147,441 B1 12/2018 Pogue et al.
10,149,156 B1 12/2018 Tiku et al.
10,157,040 B2 12/2018 Ballinger et al.
10,158,728 B1 12/2018 Vanblon et al.
10,162,512 B2 12/2018 Seo et al.
10,162,817 B2 12/2018 Schlesinger et al.
10,169,329 B2 1/2019 Futrell et al.
10,170,123 B2 1/2019 Orr et al.
10,170,135 B1 1/2019 Pearce et al.
10,175,879 B2 1/2019 Missig et al.
10,176,167 B2 1/2019 Evermann
10,176,802 B1 1/2019 Ladhak et al.
10,176,808 B1 1/2019 Lovitt et al.
10,178,301 B1 1/2019 Welbourne et al.
10,180,572 B2 1/2019 Osterhout et al.
10,185,542 B2 1/2019 Carson et al.
10,186,254 B2 1/2019 Williams et al.
10,186,266 B1 1/2019 Devaraj et al.
10,191,627 B2 1/2019 Cieplinski et al.
10,191,646 B2 1/2019 Zambetti et al.
10,191,718 B2 1/2019 Rhee et al.
10,192,546 B1 1/2019 Piersol et al.
10,192,552 B2 1/2019 Raitio et al.
10,192,557 B2 1/2019 Lee et al.
10,193,840 B1 1/2019 Dar
10,198,877 B1 2/2019 Maltsev et al.
10,199,051 B2 2/2019 Binder et al.
10,200,824 B2 2/2019 Gross et al.
10,204,627 B2 2/2019 Nitz et al.
10,210,860 B1 2/2019 Ward et al.
10,216,351 B2 2/2019 Yang
10,216,832 B2 2/2019 Bangalore et al.
10,223,066 B2 3/2019 Martel et al.
10,224,030 B1 3/2019 Kiss et al.
10,225,711 B2 3/2019 Parks et al.
10,228,904 B2 3/2019 Raux
10,229,109 B1 3/2019 Cherepanov et al.
10,229,356 B1 3/2019 Liu et al.
10,229,680 B1 3/2019 Gillespie et al.
10,236,016 B1 3/2019 Li et al.
10,237,711 B2 3/2019 Linn et al.
10,241,644 B2 3/2019 Gruber et al.
10,242,501 B1 3/2019 Pusch et al.
10,248,308 B2 4/2019 Karunamuni et al.
10,248,771 B1 4/2019 Ziraknejad et al.
10,249,300 B2 4/2019 Booker et al.
10,249,305 B2 4/2019 Yu
10,255,917 B2 4/2019 Carey et al.
10,255,922 B1 4/2019 Sharifi et al.
10,257,314 B2 4/2019 Agrawal et al.
10,261,672 B1 4/2019 Dolbakian et al.
10,261,830 B2 4/2019 Gupta et al.
10,269,345 B2 4/2019 Sanchez et al.
10,271,093 B1 4/2019 Jobanputra et al.
10,275,513 B1 4/2019 Cowan et al.
10,276,170 B2 4/2019 Gruber et al.
10,282,737 B2 5/2019 Clark et al.
10,283,111 B1 5/2019 Mairesse et al.
10,289,205 B1 5/2019 Sumter et al.
10,291,066 B1 5/2019 Leabman et al.
10,296,160 B2 5/2019 Shah et al.
10,297,253 B2 5/2019 Walker, II et al.
10,303,715 B2 5/2019 Graham et al.
10,303,772 B2 5/2019 Hosn et al.
10,304,463 B2 5/2019 Mixter et al.
10,311,482 B2 6/2019 Baldwin
10,311,871 B2 6/2019 Newendorp et al.
10,317,992 B2 6/2019 Prokofieva et al.
10,325,598 B2 6/2019 Basye et al.
10,331,312 B2 6/2019 Napolitano et al.
10,332,509 B2 6/2019 Catanzaro et al.
10,332,513 B1 6/2019 D'Souza et al.
10,332,518 B2 6/2019 Garg et al.
10,339,224 B2 7/2019 Fukuoka
10,339,714 B2 7/2019 Corso et al.
10,339,721 B1 7/2019 Dascola et al.
10,339,925 B1 7/2019 Rastrow et al.
10,346,540 B2 7/2019 Karov et al.
10,346,541 B1 7/2019 Phillips et al.
10,346,753 B2 7/2019 Soon-Shiong et al.
10,346,878 B1 7/2019 Ostermann et al.
10,353,975 B2 7/2019 Oh et al.
10,354,168 B2 7/2019 Bluche
10,354,677 B2 7/2019 Mohamed et al.
10,356,243 B2 7/2019 Sanghavi et al.
10,360,305 B2 7/2019 Larcheveque et al.
10,360,716 B1 7/2019 Van Der Meulen et al.

(56) References Cited

U.S. PATENT DOCUMENTS 10,365,887 B1 7/2019 Mulherkar
10,366,160 B2 7/2019 Castelli et al.
10,366,692 B1 7/2019 Adams et al.
10,372,814 B2 8/2019 Gliozzo et al.
10,372,881 B2 8/2019 Ingrassia, Jr. et al.
10,373,381 B2 8/2019 Nuernberger et al.
10,382,799 B1 8/2019 Walters et al.
10,387,461 B2 8/2019 Sharifi et al.
10,389,876 B2 8/2019 Engelke et al.
10,402,066 B2 9/2019 Kawana
10,403,272 B1 9/2019 Fanty et al.
10,403,283 B1 9/2019 Schramm et al.
10,409,454 B2 9/2019 Kagan et al.
10,410,637 B2 9/2019 Paulik et al.
10,416,760 B2 9/2019 Burns et al.
10,417,037 B2 9/2019 Gruber et al.
10,417,344 B2 9/2019 Futrell et al.
10,417,554 B2 9/2019 Scheffler
10,418,032 B1 9/2019 Mohajer et al.
10,431,210 B1 10/2019 Huang et al.
10,437,928 B2 10/2019 Bhaya et al.
10,446,142 B2 10/2019 Lim et al.
10,453,117 B1 10/2019 Reavely et al.
10,469,665 B1 11/2019 Bell et al.
10,474,961 B2 11/2019 Brigham et al.
10,475,446 B2 11/2019 Gruber et al.
10,482,875 B2 11/2019 Henry
10,482,904 B1 11/2019 Hardie et al.
10,489,651 B2 11/2019 Luccin et al.
10,490,195 B1 11/2019 Krishnamoorthy et al.
10,496,364 B2 12/2019 Yao
10,496,705 B1 12/2019 Irani et al.
10,497,250 B1 12/2019 Hayward et al.
10,497,365 B2 12/2019 Gruber et al.
10,497,366 B2 12/2019 Sapugay et al.
10,499,146 B2 12/2019 Lang et al.
10,504,513 B1 12/2019 Gray et al.
10,504,518 B1 12/2019 Irani et al.
10,512,750 B1 12/2019 Lewin et al.
10,515,133 B1 12/2019 Sharifi
10,515,623 B1 12/2019 Grizzel
10,521,946 B1 12/2019 Roche et al.
10,528,386 B2 1/2020 Yu
10,540,976 B2 1/2020 Van Os et al.
10,558,893 B2 2/2020 Bluche
10,559,225 B1 2/2020 Tao et al.
10,559,299 B1 2/2020 Arel et al.
10,566,007 B2 2/2020 Fawaz et al.
10,568,032 B2 2/2020 Freeman et al.
10,571,715 B2 2/2020 Rizzo et al.
10,572,885 B1 2/2020 Guo et al.
10,579,401 B2 3/2020 Dawes
10,580,409 B2 3/2020 Walker, II et al.
10,582,355 B1 3/2020 Lebeau et al.
10,585,957 B2 3/2020 Heck et al.
10,586,369 B1 3/2020 Roche et al.
10,599,449 B1 3/2020 Chatzipanagiotis et al.
10,599,758 B1 3/2020 Yu et al.
10,628,483 B1 4/2020 Rao et al.
10,629,186 B1 4/2020 Slifka
10,630,795 B2 4/2020 Aoki et al.
10,642,934 B2 5/2020 Heck et al.
10,643,611 B2 5/2020 Lindahl
10,649,652 B2 5/2020 Sun
10,652,392 B1 5/2020 Eades
10,652,394 B2 5/2020 Van Os et al.
10,659,851 B2 5/2020 Lister et al.
10,671,428 B2 6/2020 Zeitlin
10,679,007 B2 6/2020 Jia et al.
10,679,608 B2 6/2020 Mixter et al.
10,684,099 B2 6/2020 Zaetterqvist
10,684,703 B2 6/2020 Hindi et al.
10,685,187 B2 6/2020 Badr et al.
10,691,473 B2 6/2020 Karashchuk et al.
10,699,697 B2 6/2020 Qian et al.
10,706,841 B2 7/2020 Gruber et al.
10,706,848 B1 7/2020 Greene et al.
10,721,190 B2 7/2020 Zhao et al.
10,726,631 B1 7/2020 Ha
10,732,708 B1 8/2020 Roche et al.
10,743,107 B1 8/2020 Yoshioka et al.
10,747,498 B2 8/2020 Stasior et al.
10,748,529 B1 8/2020 Milden
10,748,546 B2 8/2020 Kim et al.
10,754,658 B2 8/2020 Tamiya
10,755,032 B2 8/2020 Douglas et al.
10,757,499 B1 8/2020 Vautrin et al.
10,757,552 B2 8/2020 Gross et al.
10,762,143 B2 9/2020 Packer et al.
10,769,385 B2 9/2020 Evermann
10,776,933 B2 9/2020 Faulkner
10,778,839 B1 9/2020 Newstadt et al.
10,783,151 B1 9/2020 Bushkin et al.
10,783,166 B2 9/2020 Hurley et al.
10,783,883 B2 9/2020 Mixter et al.
10,789,945 B2 9/2020 Acero et al.
10,791,176 B2 9/2020 Phipps et al.
10,791,215 B2 9/2020 Ly et al.
10,795,944 B2 10/2020 Brown et al.
10,796,100 B2 10/2020 Bangalore et al.
10,798,438 B2 10/2020 Conrad et al.
10,803,255 B2 10/2020 Dubyak et al.
10,811,013 B1 10/2020 Secker-Walker et al.
10,818,288 B2 10/2020 Garcia et al.
10,831,494 B2 11/2020 Grocutt et al.
10,832,031 B2 11/2020 Kienzle et al.
10,832,684 B2 11/2020 Sarikaya
10,842,968 B1 11/2020 Kahn et al.
10,846,618 B2 11/2020 Ravi et al.
10,847,142 B2 11/2020 Newendorp et al.
10,860,096 B2 12/2020 Kelly et al.
10,860,629 B1 12/2020 Gangadharaiah et al.
10,861,483 B2 12/2020 Feinauer et al.
10,877,637 B1 12/2020 Antos et al.
10,878,047 B1 12/2020 Mutagi et al.
10,880,668 B1 12/2020 Robinson et al.
10,885,277 B2 1/2021 Ravi et al.
10,891,968 B2 1/2021 Chung et al.
10,892,996 B2 1/2021 Piersol
10,904,488 B1 1/2021 Weisz et al.
10,909,171 B2 2/2021 Graham et al.
10,909,459 B2 2/2021 Tsatsin et al.
10,931,999 B1 2/2021 Jobanputra et al.
10,937,263 B1 3/2021 Tout et al.
10,937,410 B1 3/2021 Rule
10,937,425 B2 3/2021 Summa et al.
10,942,702 B2 3/2021 Piersol et al.
10,942,703 B2 3/2021 Martel et al.
10,944,859 B2 3/2021 Weinstein et al.
10,957,310 B1 3/2021 Mohajer et al.
10,957,311 B2 3/2021 Solomon et al.
10,957,337 B2 3/2021 Chen et al.
10,970,660 B1 4/2021 Harris et al.
10,974,139 B2 4/2021 Feder et al.
10,978,056 B1 4/2021 Challa et al.
10,978,090 B2 4/2021 Binder et al.
10,983,971 B2 4/2021 Carvalho et al.
11,009,970 B2 5/2021 Hindi et al.
11,010,127 B2 5/2021 Orr et al.
11,010,763 B1 5/2021 Fillinger
11,012,942 B2 5/2021 Freeman et al.
11,017,766 B2 5/2021 Chao et al.
11,023,109 B2 6/2021 Pahud et al.
11,024,079 B1 6/2021 Chuah et al.
11,030,515 B2 6/2021 Kaufmann et al.
11,037,565 B2 6/2021 Kudurshian et al.
11,038,934 B1 6/2021 Hansen et al.
11,043,086 B1 6/2021 Daoura et al.
11,043,220 B1 6/2021 Hansen et al.
11,048,473 B2 6/2021 Carson et al.
11,061,543 B1 7/2021 Blatz et al.
11,062,696 B2 7/2021 Tadpatrikar et al.
11,072,344 B2 7/2021 Provost et al.
11,076,039 B2 7/2021 Weinstein et al.

(56) References Cited

U.S. PATENT DOCUMENTS 11,080,336 B2 8/2021 Van Dusen
11,086,858 B1 8/2021 Koukoumidis et al.
11,087,759 B2 8/2021 Lemay et al.
11,093,306 B1 8/2021 Libin
11,094,311 B2 8/2021 Candelore et al.
11,112,875 B1 9/2021 Zhou et al.
11,113,598 B2 9/2021 Socher et al.
11,126,331 B2 9/2021 Lo et al.
11,126,400 B2 9/2021 Stasior et al.
11,132,172 B1 9/2021 Naik et al.
11,133,008 B2 9/2021 Piernot et al.
11,151,899 B2 10/2021 Pitschel et al.
11,152,002 B2 10/2021 Walker et al.
11,169,660 B2 11/2021 Gupta et al.
11,181,980 B2 11/2021 Deleeuw
11,181,988 B1 11/2021 Bellegarda et al.
11,183,193 B1 11/2021 Hansen et al.
11,183,205 B1 11/2021 Ebenezer et al.
11,195,524 B2 12/2021 Mukherjee et al.
11,200,027 B2 12/2021 Aggarwal et al.
11,204,787 B2 12/2021 Radebaugh et al.
11,205,192 B1 12/2021 Rivera et al.
11,210,062 B1 12/2021 Heikinheimo et al.
11,210,477 B2 12/2021 Srinivasan et al.
11,210,863 B1 12/2021 Yan et al.
11,211,048 B2 12/2021 Kim et al.
11,211,058 B1 12/2021 Eakin et al.
11,217,255 B2 1/2022 Kim et al.
11,223,699 B1 1/2022 Niewczas
11,235,248 B1 2/2022 Orrino et al.
11,246,002 B1 2/2022 Donley et al.
11,250,844 B2 2/2022 Mont-Reynaud et al.
11,269,426 B2 3/2022 Jorasch et al.
11,269,678 B2 3/2022 Gruber et al.
11,282,497 B2 3/2022 Wang et al.
11,283,631 B2 3/2022 Yan et al.
11,289,082 B1 3/2022 Lacy et al.
11,301,766 B2 4/2022 Muramoto et al.
11,302,310 B1 4/2022 Gandhe et al.
11,347,754 B1 5/2022 Ho et al.
11,348,582 B2 5/2022 Lindahl
11,361,863 B2 6/2022 Gass et al.
11,373,645 B1 6/2022 Mathew et al.
11,380,310 B2 7/2022 Acero et al.
11,380,323 B2 7/2022 Shin et al.
11,388,291 B2 7/2022 Van Os et al.
11,418,461 B1 8/2022 Elfardy et al.
11,423,866 B2 8/2022 Park et al.
11,423,898 B2 8/2022 Shum et al.
11,449,802 B2 9/2022 Maalouf et al.
11,481,552 B2 10/2022 Krause et al.
11,481,559 B1 10/2022 Asefi et al.
11,487,932 B2 11/2022 Kramer
11,495,218 B2 11/2022 Newendorp et al.
11,507,183 B2 11/2022 Manjunath et al.
11,508,380 B2 11/2022 Hu et al.
11,537,352 B1 12/2022 Clements
11,538,469 B2 12/2022 Acero et al.
11,580,990 B2 2/2023 Paulik et al.
11,630,525 B2 4/2023 Hindi et al.
11,669,788 B2 6/2023 Balasubramanian et al.
11,671,920 B2 6/2023 Freeman et al.
11,675,829 B2 6/2023 Graham et al.
11,704,552 B2 7/2023 Sim et al.
11,755,275 B2 9/2023 Lovitt
11,756,548 B1 9/2023 Perkins et al.
11,756,574 B2 9/2023 Maddika et al.
11,763,092 B2 9/2023 Duong et al.
11,768,880 B1 9/2023 Nemani et al.
11,769,497 B2 9/2023 Manjunath et al.
11,783,805 B1 10/2023 Nadig et al.
11,784,893 B1 10/2023 Chang
11,809,783 B2 11/2023 Piersol et al.
11,818,111 B1 11/2023 Debolt
11,837,232 B2 12/2023 Manjunath et al.
11,908,159 B2 2/2024 Haapoja et al.
12,020,667 B2 6/2024 Griswold et al.
12,021,806 B1 6/2024 Lebrecht et al.
12,061,738 B2 8/2024 Du et al.
2003/0018475 A1 1/2003 Basu et al.
2006/0074658 A1* 4/2006 Chadha .................. G10L 17/00
704/E15.045
2007/0043687 A1 2/2007 Bodart et al.
2007/0075965 A1 4/2007 Huppi et al.
2008/0189110 A1 8/2008 Freeman et al.
2010/0227642 A1 9/2010 Kim et al.
2010/0312547 A1* 12/2010 Van Os .................. G10L 15/26
704/E15.04
2010/0332220 A1 12/2010 Hursey et al.
2011/0295590 A1 12/2011 Lloyd et al.
2012/0034904 A1 2/2012 LeBeau et al.
2012/0259638 A1 10/2012 Kalinli
2012/0295708 A1 11/2012 Hernandez-Abrego et al.
2013/0051755 A1 2/2013 Brown et al.
2013/0054945 A1 2/2013 Free et al.
2013/0063256 A1 3/2013 Tartz et al.
2013/0097709 A1 4/2013 Basavapatna et al.
2013/0109412 A1 5/2013 Nguyen et al.
2013/0144616 A1 6/2013 Bangalore
2013/0185074 A1 7/2013 Gruber et al.
2013/0238326 A1 9/2013 Kim et al.
2013/0300648 A1 11/2013 Kim et al.
2013/0304479 A1 11/2013 Teller et al.
2013/0325844 A1 12/2013 Plaisant
2013/0325967 A1 12/2013 Parks et al.
2014/0001255 A1 1/2014 Anthoine
2014/0002338 A1 1/2014 Raffa et al.
2014/0006012 A1 1/2014 Zhou et al.
2014/0006025 A1 1/2014 Krishnan et al.
2014/0006027 A1 1/2014 Kim et al.
2014/0006028 A1 1/2014 Hu
2014/0006030 A1 1/2014 Fleizach et al.
2014/0006153 A1 1/2014 Thangam et al.
2014/0006191 A1 1/2014 Shankar et al.
2014/0006483 A1 1/2014 Garmark et al.
2014/0006496 A1 1/2014 Dearman et al.
2014/0006562 A1 1/2014 Handa et al.
2014/0006944 A1 1/2014 Selig et al.
2014/0006947 A1 1/2014 Garmark et al.
2014/0006951 A1 1/2014 Hunter
2014/0006955 A1 1/2014 Greenzeiger et al.
2014/0008163 A1 1/2014 Mikonaho et al.
2014/0012574 A1 1/2014 Pasupalak et al.
2014/0012575 A1 1/2014 Ganong et al.
2014/0012580 A1 1/2014 Ganong, III et al.
2014/0012586 A1 1/2014 Rubin et al.
2014/0012587 A1 1/2014 Park
2014/0013336 A1 1/2014 Yang
2014/0019116 A1 1/2014 Lundberg et al.
2014/0019133 A1 1/2014 Bao et al.
2014/0019135 A1 1/2014 Talwar et al.
2014/0019460 A1 1/2014 Sambrani et al.
2014/0019873 A1 1/2014 Gupta et al.
2014/0025383 A1 1/2014 Dai et al.
2014/0026037 A1 1/2014 Garb et al.
2014/0028029 A1 1/2014 Jochman
2014/0028477 A1 1/2014 Michalske
2014/0028603 A1 1/2014 Xie et al.
2014/0028735 A1 1/2014 Williams et al.
2014/0032453 A1 1/2014 Eustice et al.
2014/0032678 A1 1/2014 Koukoumidis et al.
2014/0032706 A1 1/2014 Kuscher et al.
2014/0033071 A1 1/2014 Gruber et al.
2014/0033215 A1 1/2014 Otomo et al.
2014/0035823 A1 2/2014 Khoe et al.
2014/0035824 A1 2/2014 Bernstein et al.
2014/0037075 A1 2/2014 Bouzid et al.
2014/0039888 A1 2/2014 Taubman et al.
2014/0039893 A1 2/2014 Weiner et al.
2014/0039894 A1 2/2014 Shostak
2014/0040228 A1 2/2014 Kritt et al.
2014/0040274 A1 2/2014 Aravamudan et al.
2014/0040748 A1 2/2014 Lemay et al.
2014/0040754 A1 2/2014 Donelli

(56) References Cited

U.S. PATENT DOCUMENTS

2014/0040801 A1 2/2014 Patel et al.
2014/0040905 A1 2/2014 Tsunoda et al.
2014/0040918 A1 2/2014 Li
2014/0040961 A1 2/2014 Green et al.
2014/0045463 A1 2/2014 Hsieh et al.
2014/0045547 A1 2/2014 Singamsetty et al.
2014/0046922 A1 2/2014 Crook et al.
2014/0046934 A1 2/2014 Zhou et al.
2014/0047001 A1 2/2014 Phillips et al.
2014/0051399 A1 2/2014 Walker
2014/0052451 A1 2/2014 Cheong et al.
2014/0052680 A1 2/2014 Nitz et al.
2014/0052791 A1 2/2014 Chakra et al.
2014/0053082 A1 2/2014 Park
2014/0053101 A1 2/2014 Buehler et al.
2014/0053198 A1 2/2014 Sirpal et al.
2014/0053210 A1 2/2014 Cheong et al.
2014/0056439 A1 2/2014 Kim
2014/0057610 A1 2/2014 Olincy et al.
2014/0058732 A1 2/2014 Labsky et al.
2014/0059030 A1 2/2014 Hakkani-Tur et al.
2014/0059423 A1 2/2014 Gorga et al.
2014/0067361 A1 3/2014 Nikoulina et al.
2014/0067371 A1 3/2014 Liensberger
2014/0067402 A1 3/2014 Kim
2014/0067649 A1 3/2014 Kannan et al.
2014/0067738 A1 3/2014 Kingsbury
2014/0067740 A1 3/2014 Solari
2014/0068751 A1 3/2014 Last
2014/0071069 A1 3/2014 Anderson et al.
2014/0071241 A1 3/2014 Yang et al.
2014/0074454 A1 3/2014 Brown et al.
2014/0074466 A1 3/2014 Sharifi et al.
2014/0074470 A1 3/2014 Jansche et al.
2014/0074472 A1 3/2014 Lin et al.
2014/0074482 A1 3/2014 Ohno
2014/0074483 A1 3/2014 Van Os
2014/0074589 A1 3/2014 Nielsen et al.
2014/0074815 A1 3/2014 Plimton
2014/0074846 A1 3/2014 Moss et al.
2014/0075453 A1 3/2014 Bellessort et al.
2014/0078065 A1 3/2014 Akkok
2014/0079195 A1 3/2014 Srivastava et al.
2014/0080410 A1 3/2014 Jung et al.
2014/0080428 A1 3/2014 Rhoads et al.
2014/0081619 A1 3/2014 Solntseva et al.
2014/0081633 A1 3/2014 Badaskar
2014/0081635 A1 3/2014 Yanagihara
2014/0081829 A1 3/2014 Milne
2014/0081941 A1 3/2014 Bai et al.
2014/0082500 A1 3/2014 Wilensky et al.
2014/0082501 A1 3/2014 Bae et al.
2014/0082545 A1 3/2014 Zhai et al.
2014/0082569 A1 3/2014 Borgman
2014/0082715 A1 3/2014 Grajek et al.
2014/0086458 A1 3/2014 Rogers
2014/0087711 A1 3/2014 Geyer et al.
2014/0088952 A1 3/2014 Fife et al.
2014/0088961 A1 3/2014 Woodward et al.
2014/0088964 A1 3/2014 Bellegarda
2014/0088970 A1 3/2014 Kang
2014/0088989 A1 3/2014 Krishnapuram et al.
2014/0092007 A1 4/2014 Kim et al.
2014/0095171 A1 4/2014 Lynch et al.
2014/0095172 A1 4/2014 Cabaco et al.
2014/0095173 A1 4/2014 Lynch et al.
2014/0095432 A1 4/2014 Trumbull et al.
2014/0095601 A1 4/2014 Abuelsaad et al.
2014/0095965 A1 4/2014 Li
2014/0096077 A1 4/2014 Jacob et al.
2014/0096209 A1 4/2014 Saraf et al.
2014/0098247 A1 4/2014 Rao et al.
2014/0100847 A1 4/2014 Ishii et al.
2014/0101127 A1 4/2014 Simhon et al.
2014/0104175 A1 4/2014 Ouyang et al.
2014/0108010 A1 4/2014 Maltseff et al.
2014/0108017 A1 4/2014 Mason et al.
2014/0108357 A1 4/2014 Procops et al.
2014/0108391 A1 4/2014 Volkert
2014/0108792 A1 4/2014 Borzycki et al.
2014/0112556 A1 4/2014 Kalinli-Akbacak
2014/0114554 A1 4/2014 Lagassey
2014/0115062 A1 4/2014 Liu et al.
2014/0115114 A1 4/2014 Garmark et al.
2014/0118155 A1 5/2014 Bowers et al.
2014/0118624 A1 5/2014 Jang et al.
2014/0120961 A1 5/2014 Buck
2014/0122057 A1 5/2014 Chelba et al.
2014/0122059 A1 5/2014 Patel et al.
2014/0122085 A1 5/2014 Piety et al.
2014/0122086 A1 5/2014 Kapur et al.
2014/0122136 A1 5/2014 Jayanthi
2014/0122153 A1 5/2014 Truitt
2014/0122589 A1 5/2014 Fyke et al.
2014/0123022 A1 5/2014 Lee et al.
2014/0128021 A1 5/2014 Walker et al.
2014/0129006 A1 5/2014 Chen et al.
2014/0129226 A1 5/2014 Lee et al.
2014/0132935 A1 5/2014 Kim et al.
2014/0134983 A1 5/2014 Jung et al.
2014/0135036 A1 5/2014 Bonanni et al.
2014/0136013 A1 5/2014 Wolverton et al.
2014/0136187 A1 5/2014 Wolverton et al.
2014/0136195 A1 5/2014 Abdossalami et al.
2014/0136212 A1 5/2014 Kwon et al.
2014/0136946 A1 5/2014 Matas
2014/0136987 A1 5/2014 Rodriguez
2014/0142922 A1 5/2014 Liang et al.
2014/0142923 A1 5/2014 Jones et al.
2014/0142934 A1 5/2014 Kim
2014/0142935 A1 5/2014 Lindahl et al.
2014/0142953 A1 5/2014 Kim et al.
2014/0143550 A1 5/2014 Ganong, III et al.
2014/0143721 A1 5/2014 Suzuki et al.
2014/0143784 A1 5/2014 Mistry et al.
2014/0145914 A1 5/2014 Latta et al.
2014/0146200 A1 5/2014 Scott et al.
2014/0148209 A1 5/2014 Weng et al.
2014/0149118 A1 5/2014 Lee et al.
2014/0152577 A1 6/2014 Yuen et al.
2014/0153709 A1 6/2014 Byrd et al.
2014/0155031 A1 6/2014 Lee et al.
2014/0155123 A1 6/2014 Lee et al.
2014/0156262 A1 6/2014 Yuen et al.
2014/0156268 A1 6/2014 Arizmendi et al.
2014/0156269 A1 6/2014 Lee et al.
2014/0156279 A1 6/2014 Okamoto et al.
2014/0156564 A1 6/2014 Knight et al.
2014/0157319 A1 6/2014 Kimura et al.
2014/0157422 A1 6/2014 Livshits et al.
2014/0160032 A1 6/2014 Che et al.
2014/0160157 A1 6/2014 Poulos et al.
2014/0163751 A1 6/2014 Davis et al.
2014/0163951 A1 6/2014 Nikoulina et al.
2014/0163953 A1 6/2014 Parikh
2014/0163954 A1 6/2014 Joshi et al.
2014/0163962 A1 6/2014 Castelli et al.
2014/0163976 A1 6/2014 Park et al.
2014/0163977 A1 6/2014 Hoffmeister et al.
2014/0163978 A1 6/2014 Basye et al.
2014/0163981 A1 6/2014 Cook et al.
2014/0163995 A1 6/2014 Burns et al.
2014/0164305 A1 6/2014 Lynch et al.
2014/0164312 A1 6/2014 Lynch et al.
2014/0164476 A1 6/2014 Thomson
2014/0164508 A1 6/2014 Lynch et al.
2014/0164532 A1 6/2014 Lynch et al.
2014/0164533 A1 6/2014 Lynch et al.
2014/0164953 A1 6/2014 Lynch et al.
2014/0165006 A1 6/2014 Chaudhri et al.
2014/0165187 A1 6/2014 Daesung et al.
2014/0168344 A1 6/2014 Shoemake et al.
2014/0169795 A1 6/2014 Clough
2014/0171064 A1 6/2014 Das

(56) References Cited

U.S. PATENT DOCUMENTS

2014/0171156 A1 6/2014 Pattikonda et al.
2014/0172412 A1 6/2014 Viegas et al.
2014/0172878 A1 6/2014 Clark et al.
2014/0173445 A1 6/2014 Grassiotto
2014/0173460 A1 6/2014 Kim
2014/0176814 A1 6/2014 Ahn
2014/0179295 A1 6/2014 Luebbers et al.
2014/0180499 A1 6/2014 Cooper et al.
2014/0180689 A1 6/2014 Kim
2014/0180697 A1 6/2014 Torok et al.
2014/0181123 A1 6/2014 Blaise et al.
2014/0181703 A1 6/2014 Sullivan et al.
2014/0181715 A1 6/2014 Axelrod et al.
2014/0181741 A1 6/2014 Apacible et al.
2014/0181865 A1 6/2014 Koganei
2014/0184542 A1 7/2014 Mao et al.
2014/0188335 A1 7/2014 Madhok et al.
2014/0188460 A1 7/2014 Ouyang et al.
2014/0188477 A1 7/2014 Zhang
2014/0188478 A1 7/2014 Zhang
2014/0188485 A1 7/2014 Kim et al.
2014/0188835 A1 7/2014 Zhang et al.
2014/0195226 A1 7/2014 Yun et al.
2014/0195230 A1 7/2014 Han et al.
2014/0195233 A1 7/2014 Bapat et al.
2014/0195244 A1 7/2014 Cha et al.
2014/0195251 A1 7/2014 Zeinstra et al.
2014/0195252 A1 7/2014 Gruber et al.
2014/0198048 A1 7/2014 Unruh et al.
2014/0200891 A1 7/2014 Larcheveque et al.
2014/0201655 A1 7/2014 Mahaffey et al.
2014/0203939 A1 7/2014 Harrington et al.
2014/0205076 A1 7/2014 Kumar et al.
2014/0207439 A1 7/2014 Venkatapathy et al.
2014/0207446 A1 7/2014 Klein et al.
2014/0207447 A1 7/2014 Jiang et al.
2014/0207466 A1 7/2014 Smadi
2014/0207468 A1 7/2014 Bartnik
2014/0207582 A1 7/2014 Flinn et al.
2014/0211944 A1 7/2014 Hayward et al.
2014/0214429 A1 7/2014 Pantel
2014/0214537 A1 7/2014 Yoo et al.
2014/0215367 A1 7/2014 Kim et al.
2014/0215513 A1 7/2014 Ramer et al.
2014/0218372 A1 8/2014 Missig et al.
2014/0222422 A1 8/2014 Sarikaya et al.
2014/0222435 A1 8/2014 Li et al.
2014/0222436 A1 8/2014 Binder et al.
2014/0222678 A1 8/2014 Sheets et al.
2014/0222967 A1 8/2014 Harrang et al.
2014/0223377 A1 8/2014 Shaw et al.
2014/0223481 A1 8/2014 Fundament
2014/0223586 A1 8/2014 Berger et al.
2014/0226503 A1 8/2014 Cooper et al.
2014/0229158 A1 8/2014 Zweig et al.
2014/0229184 A1 8/2014 Shires
2014/0229847 A1 8/2014 Park
2014/0230055 A1 8/2014 Boehl
2014/0232570 A1 8/2014 Skinder et al.
2014/0232656 A1 8/2014 Pasquero et al.
2014/0236595 A1 8/2014 Gray
2014/0236986 A1 8/2014 Guzman
2014/0237042 A1 8/2014 Ahmed et al.
2014/0237366 A1 8/2014 Poulos et al.
2014/0240122 A1 8/2014 Roberts et al.
2014/0244248 A1 8/2014 Arisoy et al.
2014/0244249 A1 8/2014 Mohamed et al.
2014/0244254 A1 8/2014 Ju et al.
2014/0244257 A1 8/2014 Colibro et al.
2014/0244258 A1 8/2014 Song et al.
2014/0244263 A1 8/2014 Pontual et al.
2014/0244266 A1 8/2014 Brown et al.
2014/0244268 A1 8/2014 Abdelsamie et al.
2014/0244270 A1 8/2014 Han et al.
2014/0244271 A1 8/2014 Lindahl
2014/0244712 A1 8/2014 Walters et al.
2014/0245140 A1 8/2014 Brown et al.
2014/0247383 A1 9/2014 Dave et al.
2014/0247926 A1 9/2014 Gainsboro et al.
2014/0249812 A1 9/2014 Bou-Ghazale et al.
2014/0249816 A1 9/2014 Pickering et al.
2014/0249817 A1 9/2014 Hart et al.
2014/0249820 A1 9/2014 Hsu et al.
2014/0249821 A1 9/2014 Kennewick et al.
2014/0250046 A1 9/2014 Winn et al.
2014/0253455 A1 9/2014 Mauro et al.
2014/0257809 A1 9/2014 Goel et al.
2014/0257815 A1 9/2014 Zhao et al.
2014/0257902 A1 9/2014 Moore et al.
2014/0258324 A1 9/2014 Mauro et al.
2014/0258357 A1 9/2014 Singh et al.
2014/0258857 A1 9/2014 Dykstra-Erickson et al.
2014/0258905 A1 9/2014 Lee et al.
2014/0267022 A1 9/2014 Kim
2014/0267599 A1 9/2014 Drouin et al.
2014/0267933 A1 9/2014 Young
2014/0272821 A1 9/2014 Pitschel et al.
2014/0273974 A1 9/2014 Varghese et al.
2014/0273979 A1 9/2014 Van Os et al.
2014/0274005 A1 9/2014 Luna et al.
2014/0274203 A1 9/2014 Ganong, III et al.
2014/0274211 A1 9/2014 Sejnoha et al.
2014/0278051 A1 9/2014 McGavran et al.
2014/0278343 A1 9/2014 Tran
2014/0278349 A1 9/2014 Grieves et al.
2014/0278379 A1 9/2014 Coccaro et al.
2014/0278390 A1 9/2014 Kingsbury et al.
2014/0278391 A1 9/2014 Braho et al.
2014/0278394 A1 9/2014 Bastyr et al.
2014/0278406 A1 9/2014 Tsumura et al.
2014/0278413 A1 9/2014 Pitschel et al.
2014/0278419 A1 9/2014 Bishop et al.
2014/0278426 A1 9/2014 Jost et al.
2014/0278429 A1 9/2014 Ganong, III
2014/0278435 A1 9/2014 Ganong, III et al.
2014/0278436 A1 9/2014 Khanna et al.
2014/0278438 A1 9/2014 Hart et al.
2014/0278443 A1 9/2014 Gunn et al.
2014/0278444 A1 9/2014 Larson et al.
2014/0278513 A1 9/2014 Prakash et al.
2014/0279622 A1 9/2014 Lamoureux et al.
2014/0279739 A1 9/2014 Elkington et al.
2014/0279787 A1 9/2014 Cheng et al.
2014/0280072 A1 9/2014 Coleman
2014/0280107 A1 9/2014 Heymans et al.
2014/0280138 A1 9/2014 Li et al.
2014/0280292 A1 9/2014 Skinder
2014/0280353 A1 9/2014 Delaney et al.
2014/0280450 A1 9/2014 Luna
2014/0280757 A1 9/2014 Tran
2014/0281944 A1 9/2014 Winer
2014/0281983 A1 9/2014 Xian et al.
2014/0281997 A1 9/2014 Fleizach et al.
2014/0282003 A1 9/2014 Gruber et al.
2014/0282007 A1 9/2014 Fleizach
2014/0282016 A1 9/2014 Hosier, Jr.
2014/0282045 A1 9/2014 Ayanam et al.
2014/0282178 A1 9/2014 Borzello et al.
2014/0282201 A1 9/2014 Pasquero et al.
2014/0282203 A1 9/2014 Pasquero et al.
2014/0282559 A1 9/2014 Verduzco et al.
2014/0282586 A1 9/2014 Shear et al.
2014/0282743 A1 9/2014 Howard et al.
2014/0283111 A1 9/2014 Dolph et al.
2014/0288990 A1 9/2014 Moore et al.
2014/0289508 A1 9/2014 Wang
2014/0297267 A1 10/2014 Spencer et al.
2014/0297281 A1 10/2014 Togawa et al.
2014/0297284 A1 10/2014 Gruber et al.
2014/0297288 A1 10/2014 Yu et al.
2014/0297296 A1 10/2014 Koppens et al.
2014/0297348 A1 10/2014 Ellis
2014/0298200 A1 10/2014 Cierniak
2014/0298395 A1 10/2014 Yang et al.

(56) References Cited

U.S. PATENT DOCUMENTS

2014/0304086 A1 10/2014 Dasdan et al.
2014/0304605 A1 10/2014 Ohmura et al.
2014/0309990 A1 10/2014 Gandrabur et al.
2014/0309996 A1 10/2014 Zhang
2014/0310001 A1 10/2014 Kalns et al.
2014/0310002 A1 10/2014 Nitz et al.
2014/0310348 A1 10/2014 Keskitalo et al.
2014/0310365 A1 10/2014 Sample et al.
2014/0310595 A1 10/2014 Acharya et al.
2014/0313007 A1 10/2014 Harding
2014/0315492 A1 10/2014 Woods
2014/0316585 A1 10/2014 Boesveld et al.
2014/0316764 A1 10/2014 Ayan et al.
2014/0317030 A1 10/2014 Shen et al.
2014/0317502 A1 10/2014 Brown et al.
2014/0317578 A1 10/2014 Chaudhri
2014/0320398 A1 10/2014 Papstein
2014/0324429 A1 10/2014 Weilhammer et al.
2014/0324884 A1 10/2014 Lindahl et al.
2014/0330560 A1 11/2014 Venkatesha et al.
2014/0330569 A1 11/2014 Kolavennu et al.
2014/0330951 A1 11/2014 Sukoff et al.
2014/0335823 A1 11/2014 Heredia et al.
2014/0337037 A1 11/2014 Chi
2014/0337048 A1 11/2014 Brown et al.
2014/0337266 A1 11/2014 Wolverton et al.
2014/0337370 A1 11/2014 Aravamudan et al.
2014/0337371 A1 11/2014 Li
2014/0337438 A1 11/2014 Govande et al.
2014/0337621 A1 11/2014 Nakhimov
2014/0337751 A1 11/2014 Lim et al.
2014/0337814 A1 11/2014 Kalns et al.
2014/0341217 A1 11/2014 Eisner et al.
2014/0342762 A1 11/2014 Hajdu et al.
2014/0343834 A1 11/2014 Demerchant et al.
2014/0343943 A1 11/2014 Al-Telmissani
2014/0343946 A1 11/2014 Torok et al.
2014/0343950 A1 11/2014 Simpson et al.
2014/0344205 A1 11/2014 Luna et al.
2014/0344627 A1 11/2014 Schaub et al.
2014/0344687 A1 11/2014 Durham et al.
2014/0344727 A1 11/2014 Chaudhry
2014/0347181 A1 11/2014 Luna et al.
2014/0350847 A1 11/2014 Ichinokawa
2014/0350924 A1 11/2014 Zurek et al.
2014/0350933 A1 11/2014 Bak et al.
2014/0351268 A1 11/2014 Weskamp et al.
2014/0351741 A1 11/2014 Medlock et al.
2014/0351760 A1 11/2014 Skory et al.
2014/0354527 A1 12/2014 Chen et al.
2014/0358519 A1 12/2014 Mirkin et al.
2014/0358521 A1 12/2014 Mikutel et al.
2014/0358523 A1 12/2014 Sheth et al.
2014/0358549 A1 12/2014 O'Connor et al.
2014/0359456 A1 12/2014 Thiele et al.
2014/0359637 A1 12/2014 Yan
2014/0359709 A1 12/2014 Nassar et al.
2014/0361973 A1 12/2014 Raux et al.
2014/0363074 A1 12/2014 Dolfing et al.
2014/0364149 A1 12/2014 Marti et al.
2014/0364171 A1 12/2014 Heiman et al.
2014/0365209 A1 12/2014 Evermann
2014/0365214 A1 12/2014 Bayley
2014/0365216 A1 12/2014 Gruber et al.
2014/0365218 A1 12/2014 Chang et al.
2014/0365226 A1 12/2014 Sinha
2014/0365227 A1 12/2014 Cash et al.
2014/0365407 A1 12/2014 Brown et al.
2014/0365505 A1 12/2014 Clark et al.
2014/0365878 A1 12/2014 Dai et al.
2014/0365880 A1 12/2014 Bellegarda
2014/0365885 A1 12/2014 Carson et al.
2014/0365895 A1 12/2014 Magahern et al.
2014/0365912 A1 12/2014 Karunamuni et al.
2014/0365922 A1 12/2014 Yang
2014/0365945 A1 12/2014 Karunamuni et al.
2014/0370817 A1 12/2014 Luna
2014/0370841 A1 12/2014 Roberts et al.
2014/0372112 A1 12/2014 Xue et al.
2014/0372356 A1 12/2014 Bilal et al.
2014/0372468 A1 12/2014 Collins et al.
2014/0372931 A1 12/2014 Zhai et al.
2014/0375683 A1 12/2014 Salter et al.
2014/0379326 A1 12/2014 Sarikaya et al.
2014/0379334 A1 12/2014 Fry
2014/0379338 A1 12/2014 Fry
2014/0379341 A1 12/2014 Seo et al.
2014/0379798 A1 12/2014 Bunner et al.
2014/0380187 A1 12/2014 Gardenfors et al.
2014/0380214 A1 12/2014 Huang et al.
2014/0380285 A1 12/2014 Gabel et al.
2015/0001850 A1 1/2015 Jaw et al.
2015/0003797 A1 1/2015 Schmidt
2015/0004958 A1 1/2015 Wang et al.
2015/0005009 A1 1/2015 Tomkins et al.
2015/0006147 A1 1/2015 Schmidt
2015/0006148 A1 1/2015 Goldszmit et al.
2015/0006157 A1 1/2015 Silva et al.
2015/0006167 A1 1/2015 Kato et al.
2015/0006176 A1 1/2015 Pogue et al.
2015/0006178 A1 1/2015 Peng et al.
2015/0006182 A1 1/2015 Schmidt
2015/0006184 A1 1/2015 Marti et al.
2015/0006199 A1 1/2015 Snider et al.
2015/0006290 A1 1/2015 Tomkins et al.
2015/0006564 A1 1/2015 Tomkins et al.
2015/0012260 A1 1/2015 Chakladar
2015/0012271 A1 1/2015 Peng et al.
2015/0012862 A1 1/2015 Ikeda et al.
2015/0019219 A1 1/2015 Tzirkel-Hancock et al.
2015/0019220 A1 1/2015 Talhami et al.
2015/0019221 A1 1/2015 Lee et al.
2015/0019445 A1 1/2015 Glass et al.
2015/0019944 A1 1/2015 Kalgi
2015/0019954 A1 1/2015 Dalal et al.
2015/0019974 A1 1/2015 Doi et al.
2015/0025405 A1 1/2015 Vairavan et al.
2015/0025890 A1 1/2015 Jagatheesan et al.
2015/0026620 A1 1/2015 Kwon et al.
2015/0027178 A1 1/2015 Scalisi
2015/0031416 A1 1/2015 Labowicz et al.
2015/0032443 A1 1/2015 Karov et al.
2015/0032457 A1 1/2015 Koo et al.
2015/0033130 A1 1/2015 Scheessele
2015/0033219 A1 1/2015 Breiner et al.
2015/0033275 A1 1/2015 Natani et al.
2015/0034855 A1 2/2015 Shen
2015/0038161 A1 2/2015 Jakobson et al.
2015/0039292 A1 2/2015 Suleman et al.
2015/0039295 A1 2/2015 Soschen
2015/0039299 A1 2/2015 Weinstein et al.
2015/0039305 A1 2/2015 Huang
2015/0039606 A1 2/2015 Salaka et al.
2015/0040012 A1 2/2015 Faaborg et al.
2015/0042640 A1 2/2015 Algreatly
2015/0045003 A1 2/2015 Vora et al.
2015/0045007 A1 2/2015 Cash
2015/0045068 A1 2/2015 Soffer et al.
2015/0046375 A1 2/2015 Mandel et al.
2015/0046434 A1 2/2015 Lim et al.
2015/0046537 A1 2/2015 Rakib
2015/0046828 A1 2/2015 Desai et al.
2015/0049884 A1 2/2015 Ye
2015/0050633 A1 2/2015 Christmas et al.
2015/0050923 A1 2/2015 Tu et al.
2015/0051754 A1 2/2015 Kwon et al.
2015/0051901 A1 2/2015 Stonehouse et al.
2015/0052128 A1 2/2015 Sharifi
2015/0053779 A1 2/2015 Adamek et al.
2015/0053781 A1 2/2015 Nelson et al.
2015/0055879 A1 2/2015 Yang
2015/0058013 A1 2/2015 Pakhomov et al.
2015/0058018 A1 2/2015 Georges et al.
2015/0058720 A1 2/2015 Smadja et al.

(56) References Cited

U.S. PATENT DOCUMENTS

| | | | |
|---|---|---|---|
| 2015/0058785 | A1 | 2/2015 | Ookawara |
| 2015/0062043 | A1 | 3/2015 | Kim et al. |
| 2015/0065149 | A1 | 3/2015 | Russell et al. |
| 2015/0065200 | A1 | 3/2015 | Namgung et al. |
| 2015/0066473 | A1 | 3/2015 | Jeong et al. |
| 2015/0066479 | A1 | 3/2015 | Pasupalak et al. |
| 2015/0066494 | A1 | 3/2015 | Salvador et al. |
| 2015/0066496 | A1 | 3/2015 | Deoras et al. |
| 2015/0066506 | A1 | 3/2015 | Romano et al. |
| 2015/0066516 | A1 | 3/2015 | Nishikawa et al. |
| 2015/0066817 | A1 | 3/2015 | Slayton et al. |
| 2015/0067485 | A1 | 3/2015 | Kim et al. |
| 2015/0067521 | A1 | 3/2015 | Heo et al. |
| 2015/0067811 | A1 | 3/2015 | Agnew et al. |
| 2015/0067819 | A1 | 3/2015 | Shribman et al. |
| 2015/0067822 | A1 | 3/2015 | Randall |
| 2015/0068069 | A1 | 3/2015 | Tran et al. |
| 2015/0070148 | A1 | 3/2015 | Cruz-Hernandez et al. |
| 2015/0070163 | A1 | 3/2015 | Bennett et al. |
| 2015/0071121 | A1 | 3/2015 | Patil et al. |
| 2015/0073788 | A1 | 3/2015 | Sak et al. |
| 2015/0073804 | A1 | 3/2015 | Senior et al. |
| 2015/0074524 | A1 | 3/2015 | Nicholson et al. |
| 2015/0074615 | A1 | 3/2015 | Han et al. |
| 2015/0081295 | A1 | 3/2015 | Yun et al. |
| 2015/0082180 | A1 | 3/2015 | Ames et al. |
| 2015/0082229 | A1 | 3/2015 | Ouyang et al. |
| 2015/0086174 | A1 | 3/2015 | Abecassis et al. |
| 2015/0088511 | A1 | 3/2015 | Bharadwaj et al. |
| 2015/0088514 | A1 | 3/2015 | Typrin |
| 2015/0088518 | A1 | 3/2015 | Kim et al. |
| 2015/0088522 | A1 | 3/2015 | Hendrickson et al. |
| 2015/0088523 | A1 | 3/2015 | Schuster |
| 2015/0088998 | A1 | 3/2015 | Isensee et al. |
| 2015/0092520 | A1 | 4/2015 | Robison et al. |
| 2015/0094834 | A1 | 4/2015 | Vega et al. |
| 2015/0095026 | A1 | 4/2015 | Bisani et al. |
| 2015/0095031 | A1 | 4/2015 | Conkie et al. |
| 2015/0095159 | A1 | 4/2015 | Kennewick et al. |
| 2015/0095268 | A1 | 4/2015 | Greenzeiger et al. |
| 2015/0095278 | A1 | 4/2015 | Flinn et al. |
| 2015/0095310 | A1 | 4/2015 | Beaurepaire |
| 2015/0097795 | A1 | 4/2015 | Lisseman et al. |
| 2015/0099480 | A1 | 4/2015 | Reiter |
| 2015/0100144 | A1 | 4/2015 | Lee et al. |
| 2015/0100313 | A1 | 4/2015 | Sharma |
| 2015/0100316 | A1 | 4/2015 | Williams et al. |
| 2015/0100537 | A1 | 4/2015 | Grieves et al. |
| 2015/0100983 | A1 | 4/2015 | Pan |
| 2015/0106061 | A1 | 4/2015 | Yang et al. |
| 2015/0106085 | A1 | 4/2015 | Lindahl |
| 2015/0106093 | A1 | 4/2015 | Weeks et al. |
| 2015/0106096 | A1 | 4/2015 | Toopran et al. |
| 2015/0106737 | A1 | 4/2015 | Montoy-Wilson et al. |
| 2015/0109191 | A1 | 4/2015 | Johnson et al. |
| 2015/0112684 | A1 | 4/2015 | Scheffer et al. |
| 2015/0113407 | A1 | 4/2015 | Hoffert et al. |
| 2015/0113435 | A1 | 4/2015 | Phillips |
| 2015/0113454 | A1 | 4/2015 | McLaughlin |
| 2015/0120296 | A1 | 4/2015 | Stern et al. |
| 2015/0120641 | A1 | 4/2015 | Soon-Shiong et al. |
| 2015/0120723 | A1 | 4/2015 | Deshmukh et al. |
| 2015/0121216 | A1 | 4/2015 | Brown et al. |
| 2015/0121227 | A1 | 4/2015 | Peng |
| 2015/0121305 | A1 | 4/2015 | Saund et al. |
| 2015/0123898 | A1 | 5/2015 | Kim et al. |
| 2015/0127336 | A1 | 5/2015 | Lei et al. |
| 2015/0127337 | A1 | 5/2015 | Heigold et al. |
| 2015/0127348 | A1 | 5/2015 | Follis |
| 2015/0127350 | A1 | 5/2015 | Agiomyrgiannakis |
| 2015/0128058 | A1 | 5/2015 | Anajwala |
| 2015/0130716 | A1 | 5/2015 | Sridharan et al. |
| 2015/0133049 | A1 | 5/2015 | Lee et al. |
| 2015/0133109 | A1 | 5/2015 | Freeman et al. |
| 2015/0134318 | A1 | 5/2015 | Cuthbert et al. |
| 2015/0134322 | A1 | 5/2015 | Cuthbert et al. |
| 2015/0134323 | A1 | 5/2015 | Cuthbert et al. |
| 2015/0134334 | A1 | 5/2015 | Sachidanandam et al. |
| 2015/0135085 | A1 | 5/2015 | Shoham et al. |
| 2015/0135123 | A1 | 5/2015 | Carr et al. |
| 2015/0140934 | A1 | 5/2015 | Abdurrahman et al. |
| 2015/0140990 | A1 | 5/2015 | Kim et al. |
| 2015/0141150 | A1 | 5/2015 | Zha |
| 2015/0142420 | A1 | 5/2015 | Sarikaya et al. |
| 2015/0142438 | A1 | 5/2015 | Dai et al. |
| 2015/0142440 | A1 | 5/2015 | Parkinson et al. |
| 2015/0142447 | A1 | 5/2015 | Kennewick et al. |
| 2015/0142851 | A1 | 5/2015 | Gupta et al. |
| 2015/0143281 | A1 | 5/2015 | Mehta et al. |
| 2015/0143419 | A1 | 5/2015 | Bhagwat et al. |
| 2015/0148013 | A1 | 5/2015 | Baldwin et al. |
| 2015/0149146 | A1 | 5/2015 | Abramovitz et al. |
| 2015/0149177 | A1 | 5/2015 | Kalns et al. |
| 2015/0149182 | A1 | 5/2015 | Kalns et al. |
| 2015/0149354 | A1 | 5/2015 | McCoy |
| 2015/0149469 | A1 | 5/2015 | Xu et al. |
| 2015/0149899 | A1 | 5/2015 | Bernstein et al. |
| 2015/0149964 | A1 | 5/2015 | Bernstein et al. |
| 2015/0154001 | A1 | 6/2015 | Knox et al. |
| 2015/0154134 | A1 | 6/2015 | Beaumont et al. |
| 2015/0154185 | A1 | 6/2015 | Waibel |
| 2015/0154291 | A1 | 6/2015 | Shepherd et al. |
| 2015/0154976 | A1 | 6/2015 | Mutagi |
| 2015/0160635 | A1 | 6/2015 | Schofield et al. |
| 2015/0160855 | A1 | 6/2015 | Bi |
| 2015/0161108 | A1 | 6/2015 | Back |
| 2015/0161291 | A1 | 6/2015 | Nadav et al. |
| 2015/0161370 | A1 | 6/2015 | North et al. |
| 2015/0161521 | A1 | 6/2015 | Shah et al. |
| 2015/0161989 | A1 | 6/2015 | Hsu et al. |
| 2015/0161997 | A1 | 6/2015 | Wetsel et al. |
| 2015/0162000 | A1 | 6/2015 | Di Censo et al. |
| 2015/0162001 | A1 | 6/2015 | Kar et al. |
| 2015/0162006 | A1 | 6/2015 | Kummer |
| 2015/0163558 | A1 | 6/2015 | Wheatley |
| 2015/0163610 | A1 | 6/2015 | Sampat et al. |
| 2015/0169053 | A1 | 6/2015 | Bozarth et al. |
| 2015/0169081 | A1 | 6/2015 | Neels et al. |
| 2015/0169195 | A1 | 6/2015 | Choi |
| 2015/0169284 | A1 | 6/2015 | Quast et al. |
| 2015/0169336 | A1 | 6/2015 | Harper et al. |
| 2015/0169696 | A1 | 6/2015 | Krishnappa et al. |
| 2015/0170073 | A1 | 6/2015 | Baker |
| 2015/0170657 | A1 | 6/2015 | Thompson et al. |
| 2015/0170664 | A1 | 6/2015 | Doherty et al. |
| 2015/0172262 | A1 | 6/2015 | Ortiz, Jr. et al. |
| 2015/0172463 | A1 | 6/2015 | Quast et al. |
| 2015/0177945 | A1 | 6/2015 | Sengupta et al. |
| 2015/0178388 | A1 | 6/2015 | Winnemoeller et al. |
| 2015/0178785 | A1 | 6/2015 | Salonen |
| 2015/0179168 | A1 | 6/2015 | Hakkani-Tur et al. |
| 2015/0179176 | A1 | 6/2015 | Ryu et al. |
| 2015/0181285 | A1 | 6/2015 | Zhang et al. |
| 2015/0185718 | A1 | 7/2015 | Tappan et al. |
| 2015/0185964 | A1 | 7/2015 | Stout |
| 2015/0185993 | A1 | 7/2015 | Wheatley et al. |
| 2015/0185996 | A1 | 7/2015 | Brown et al. |
| 2015/0186012 | A1 | 7/2015 | Coleman et al. |
| 2015/0186110 | A1 | 7/2015 | Kannan |
| 2015/0186154 | A1 | 7/2015 | Brown et al. |
| 2015/0186155 | A1 | 7/2015 | Brown et al. |
| 2015/0186156 | A1 | 7/2015 | Brown et al. |
| 2015/0186351 | A1 | 7/2015 | Hicks et al. |
| 2015/0186538 | A1 | 7/2015 | Yan et al. |
| 2015/0186783 | A1 | 7/2015 | Byrne et al. |
| 2015/0186892 | A1 | 7/2015 | Zhang et al. |
| 2015/0187355 | A1 | 7/2015 | Parkinson et al. |
| 2015/0187369 | A1 | 7/2015 | Dadu et al. |
| 2015/0189362 | A1 | 7/2015 | Lee et al. |
| 2015/0189425 | A1 | 7/2015 | Pang |
| 2015/0193005 | A1 | 7/2015 | Di et al. |
| 2015/0193018 | A1 | 7/2015 | Venable et al. |
| 2015/0193379 | A1 | 7/2015 | Mehta |
| 2015/0193391 | A1 | 7/2015 | Khvostichenko et al. |

(56) References Cited

U.S. PATENT DOCUMENTS

| | | | |
|---|---|---|---|
| 2015/0193392 | A1 | 7/2015 | Greenblatt et al. |
| 2015/0194152 | A1 | 7/2015 | Katuri et al. |
| 2015/0194165 | A1 | 7/2015 | Faaborg et al. |
| 2015/0194187 | A1 | 7/2015 | Cleven et al. |
| 2015/0195208 | A1 | 7/2015 | Ozawa |
| 2015/0195379 | A1 | 7/2015 | Zhang et al. |
| 2015/0195606 | A1 | 7/2015 | McDevitt |
| 2015/0199077 | A1 | 7/2015 | Zuger et al. |
| 2015/0199960 | A1 | 7/2015 | Huo et al. |
| 2015/0199965 | A1 | 7/2015 | Leak et al. |
| 2015/0199967 | A1 | 7/2015 | Reddy et al. |
| 2015/0200879 | A1 | 7/2015 | Wu et al. |
| 2015/0201064 | A1 | 7/2015 | Bells et al. |
| 2015/0201077 | A1 | 7/2015 | Konig et al. |
| 2015/0205425 | A1 | 7/2015 | Kuscher et al. |
| 2015/0205568 | A1 | 7/2015 | Matsuoka |
| 2015/0205632 | A1 | 7/2015 | Gaster |
| 2015/0205858 | A1 | 7/2015 | Xie et al. |
| 2015/0206529 | A1 | 7/2015 | Kwon et al. |
| 2015/0208226 | A1 | 7/2015 | Kuusilinna et al. |
| 2015/0212791 | A1 | 7/2015 | Kumar et al. |
| 2015/0213140 | A1 | 7/2015 | Volkert |
| 2015/0213796 | A1 | 7/2015 | Waltermann et al. |
| 2015/0215258 | A1 | 7/2015 | Nowakowski et al. |
| 2015/0215350 | A1 | 7/2015 | Slayton et al. |
| 2015/0217870 | A1 | 8/2015 | McCullough et al. |
| 2015/0220264 | A1 | 8/2015 | Lewis et al. |
| 2015/0220507 | A1 | 8/2015 | Mohajer et al. |
| 2015/0220715 | A1 | 8/2015 | Kim et al. |
| 2015/0220972 | A1 | 8/2015 | Subramanya et al. |
| 2015/0221302 | A1 | 8/2015 | Han et al. |
| 2015/0221304 | A1 | 8/2015 | Stewart |
| 2015/0221307 | A1 | 8/2015 | Shah et al. |
| 2015/0222586 | A1 | 8/2015 | Ebersman et al. |
| 2015/0224848 | A1 | 8/2015 | Eisenhour |
| 2015/0227505 | A1 | 8/2015 | Morimoto |
| 2015/0227633 | A1 | 8/2015 | Shapira |
| 2015/0228274 | A1 | 8/2015 | Leppanen et al. |
| 2015/0228275 | A1 | 8/2015 | Watanabe et al. |
| 2015/0228279 | A1 | 8/2015 | Biadsy et al. |
| 2015/0228281 | A1 | 8/2015 | Raniere |
| 2015/0228282 | A1 | 8/2015 | Evrard |
| 2015/0228283 | A1 | 8/2015 | Ehsani et al. |
| 2015/0228292 | A1 | 8/2015 | Goldstein et al. |
| 2015/0230022 | A1 | 8/2015 | Sakai et al. |
| 2015/0230095 | A1 | 8/2015 | Smith et al. |
| 2015/0234556 | A1 | 8/2015 | Shaofeng et al. |
| 2015/0234636 | A1 | 8/2015 | Barnes, Jr. |
| 2015/0234800 | A1 | 8/2015 | Patrick et al. |
| 2015/0235434 | A1 | 8/2015 | Miller et al. |
| 2015/0235540 | A1 | 8/2015 | Verna et al. |
| 2015/0237301 | A1 | 8/2015 | Shi et al. |
| 2015/0242088 | A1 | 8/2015 | Hasumi |
| 2015/0242091 | A1 | 8/2015 | Lu et al. |
| 2015/0242385 | A1 | 8/2015 | Bao et al. |
| 2015/0243278 | A1 | 8/2015 | Kibre et al. |
| 2015/0243279 | A1 | 8/2015 | Morse et al. |
| 2015/0243283 | A1 | 8/2015 | Halash et al. |
| 2015/0244665 | A1 | 8/2015 | Choi et al. |
| 2015/0245154 | A1 | 8/2015 | Dadu et al. |
| 2015/0248494 | A1 | 9/2015 | Mital |
| 2015/0248651 | A1 | 9/2015 | Akutagawa et al. |
| 2015/0248886 | A1 | 9/2015 | Sarikaya et al. |
| 2015/0249664 | A1 | 9/2015 | Talhami et al. |
| 2015/0249715 | A1 | 9/2015 | Helvik et al. |
| 2015/0253146 | A1 | 9/2015 | Annapureddy et al. |
| 2015/0253885 | A1 | 9/2015 | Kagan et al. |
| 2015/0254057 | A1 | 9/2015 | Klein et al. |
| 2015/0254058 | A1 | 9/2015 | Klein et al. |
| 2015/0254333 | A1 | 9/2015 | Fife et al. |
| 2015/0255068 | A1 | 9/2015 | Kim et al. |
| 2015/0255071 | A1 | 9/2015 | Chiba |
| 2015/0256873 | A1 | 9/2015 | Klein et al. |
| 2015/0261298 | A1 | 9/2015 | Li |
| 2015/0261496 | A1 | 9/2015 | Faaborg et al. |
| 2015/0261758 | A1 | 9/2015 | Sharp et al. |
| 2015/0261850 | A1 | 9/2015 | Mittal |
| 2015/0261944 | A1 | 9/2015 | Hosom et al. |
| 2015/0262443 | A1 | 9/2015 | Chong |
| 2015/0262458 | A1 | 9/2015 | Faaborg et al. |
| 2015/0262573 | A1 | 9/2015 | Brooks et al. |
| 2015/0262583 | A1 | 9/2015 | Kanda et al. |
| 2015/0268719 | A1 | 9/2015 | Li |
| 2015/0269139 | A1 | 9/2015 | McAteer et al. |
| 2015/0269420 | A1 | 9/2015 | Kim et al. |
| 2015/0269617 | A1 | 9/2015 | Mikurak |
| 2015/0269677 | A1 | 9/2015 | Milne |
| 2015/0269943 | A1 | 9/2015 | VanBlon et al. |
| 2015/0277574 | A1 | 10/2015 | Jain et al. |
| 2015/0278192 | A1 | 10/2015 | Bretter et al. |
| 2015/0278199 | A1 | 10/2015 | Hazen et al. |
| 2015/0278348 | A1 | 10/2015 | Paruchuri et al. |
| 2015/0278370 | A1 | 10/2015 | Stratvert et al. |
| 2015/0278737 | A1 | 10/2015 | Huebscher et al. |
| 2015/0279354 | A1 | 10/2015 | Gruenstein et al. |
| 2015/0279358 | A1 | 10/2015 | Kingsbury et al. |
| 2015/0279360 | A1 | 10/2015 | Mengibar et al. |
| 2015/0279366 | A1 | 10/2015 | Krestnikov et al. |
| 2015/0281380 | A1 | 10/2015 | Wang et al. |
| 2015/0281401 | A1 | 10/2015 | Le et al. |
| 2015/0286627 | A1 | 10/2015 | Chang et al. |
| 2015/0286710 | A1 | 10/2015 | Chang et al. |
| 2015/0286716 | A1 | 10/2015 | Snibbe et al. |
| 2015/0286937 | A1 | 10/2015 | Hildebrand |
| 2015/0287401 | A1 | 10/2015 | Lee et al. |
| 2015/0287408 | A1 | 10/2015 | Svendsen et al. |
| 2015/0287409 | A1 | 10/2015 | Jang |
| 2015/0287411 | A1 | 10/2015 | Kojima et al. |
| 2015/0288629 | A1 | 10/2015 | Choi et al. |
| 2015/0293602 | A1 | 10/2015 | Kay et al. |
| 2015/0294086 | A1 | 10/2015 | Kare et al. |
| 2015/0294377 | A1 | 10/2015 | Chow |
| 2015/0294516 | A1 | 10/2015 | Chiang |
| 2015/0294670 | A1 | 10/2015 | Roblek et al. |
| 2015/0295915 | A1 | 10/2015 | Xiu |
| 2015/0296065 | A1 | 10/2015 | Narita et al. |
| 2015/0300832 | A1 | 10/2015 | Moore et al. |
| 2015/0301796 | A1 | 10/2015 | Visser et al. |
| 2015/0302316 | A1 | 10/2015 | Buryak et al. |
| 2015/0302334 | A1 | 10/2015 | Thomas et al. |
| 2015/0302855 | A1 | 10/2015 | Kim et al. |
| 2015/0302856 | A1 | 10/2015 | Kim et al. |
| 2015/0302857 | A1 | 10/2015 | Yamada |
| 2015/0302870 | A1 | 10/2015 | Burke et al. |
| 2015/0308470 | A1 | 10/2015 | Graham et al. |
| 2015/0309691 | A1 | 10/2015 | Seo et al. |
| 2015/0309997 | A1 | 10/2015 | Lee et al. |
| 2015/0310114 | A1 | 10/2015 | Ryger et al. |
| 2015/0310852 | A1 | 10/2015 | Spizzo et al. |
| 2015/0310858 | A1 | 10/2015 | Li et al. |
| 2015/0310862 | A1 | 10/2015 | Dauphin et al. |
| 2015/0310879 | A1 | 10/2015 | Buchanan et al. |
| 2015/0310888 | A1 | 10/2015 | Chen |
| 2015/0312182 | A1 | 10/2015 | Langholz |
| 2015/0312409 | A1 | 10/2015 | Czarnecki et al. |
| 2015/0312523 | A1 | 10/2015 | Li et al. |
| 2015/0314454 | A1 | 11/2015 | Breazeal et al. |
| 2015/0317069 | A1 | 11/2015 | Clements et al. |
| 2015/0317310 | A1 | 11/2015 | Eiche et al. |
| 2015/0317831 | A1 | 11/2015 | Ebstyne et al. |
| 2015/0317832 | A1 | 11/2015 | Ebstyne et al. |
| 2015/0319264 | A1 | 11/2015 | Allen et al. |
| 2015/0319411 | A1 | 11/2015 | Kasmir et al. |
| 2015/0324041 | A1 | 11/2015 | Varley et al. |
| 2015/0324334 | A1 | 11/2015 | Lee et al. |
| 2015/0324362 | A1 | 11/2015 | Glass et al. |
| 2015/0325235 | A1 | 11/2015 | Levit et al. |
| 2015/0331664 | A1 | 11/2015 | Osawa et al. |
| 2015/0331711 | A1 | 11/2015 | Huang et al. |
| 2015/0331728 | A1 | 11/2015 | Kim et al. |
| 2015/0332667 | A1 | 11/2015 | Mason |
| 2015/0334346 | A1 | 11/2015 | Cheatham, III et al. |
| 2015/0339049 | A1 | 11/2015 | Kasemset et al. |
| 2015/0339391 | A1 | 11/2015 | Kang et al. |

(56) References Cited

U.S. PATENT DOCUMENTS

| | | | |
|---|---|---|---|
| 2015/0340033 | A1 | 11/2015 | Di Fabbrizio et al. |
| 2015/0340034 | A1 | 11/2015 | Schalkwyk et al. |
| 2015/0340040 | A1 | 11/2015 | Mun et al. |
| 2015/0340042 | A1 | 11/2015 | Sejnoha et al. |
| 2015/0341717 | A1 | 11/2015 | Song et al. |
| 2015/0346845 | A1 | 12/2015 | Di Censo et al. |
| 2015/0347086 | A1 | 12/2015 | Liedholm et al. |
| 2015/0347381 | A1 | 12/2015 | Bellegarda |
| 2015/0347382 | A1 | 12/2015 | Dolfing et al. |
| 2015/0347383 | A1 | 12/2015 | Willmore et al. |
| 2015/0347385 | A1 | 12/2015 | Flor et al. |
| 2015/0347393 | A1 | 12/2015 | Futrell et al. |
| 2015/0347552 | A1 | 12/2015 | Habouzit et al. |
| 2015/0347733 | A1 | 12/2015 | Tsou et al. |
| 2015/0347985 | A1 | 12/2015 | Gross et al. |
| 2015/0348533 | A1 | 12/2015 | Saddler et al. |
| 2015/0348547 | A1 | 12/2015 | Paulik et al. |
| 2015/0348548 | A1 | 12/2015 | Piernot et al. |
| 2015/0348549 | A1 | 12/2015 | Giuli et al. |
| 2015/0348551 | A1 | 12/2015 | Gruber et al. |
| 2015/0348554 | A1 | 12/2015 | Orr et al. |
| 2015/0348555 | A1 | 12/2015 | Sugita |
| 2015/0348565 | A1 | 12/2015 | Rhoten et al. |
| 2015/0349934 | A1 | 12/2015 | Pollack et al. |
| 2015/0350031 | A1 | 12/2015 | Burks et al. |
| 2015/0350147 | A1 | 12/2015 | Shepherd et al. |
| 2015/0350342 | A1 | 12/2015 | Thorpe et al. |
| 2015/0350594 | A1 | 12/2015 | Mate et al. |
| 2015/0350771 | A1 | 12/2015 | Konchitsky |
| 2015/0352999 | A1 | 12/2015 | Bando et al. |
| 2015/0355879 | A1 | 12/2015 | Beckhardt et al. |
| 2015/0356410 | A1 | 12/2015 | Faith et al. |
| 2015/0363587 | A1 | 12/2015 | Ahn et al. |
| 2015/0364128 | A1 | 12/2015 | Zhao et al. |
| 2015/0364140 | A1 | 12/2015 | Thorn |
| 2015/0365251 | A1 | 12/2015 | Kinoshita et al. |
| 2015/0365448 | A1 | 12/2015 | Stifelman et al. |
| 2015/0370455 | A1 | 12/2015 | Van Os et al. |
| 2015/0370531 | A1 | 12/2015 | Faaborg |
| 2015/0370780 | A1 | 12/2015 | Wang et al. |
| 2015/0370787 | A1 | 12/2015 | Akbacak et al. |
| 2015/0370884 | A1 | 12/2015 | Hurley et al. |
| 2015/0371215 | A1 | 12/2015 | Zhou et al. |
| 2015/0371529 | A1 | 12/2015 | Dolecki |
| 2015/0371639 | A1 | 12/2015 | Foerster et al. |
| 2015/0371663 | A1 | 12/2015 | Gustafson et al. |
| 2015/0371664 | A1 | 12/2015 | Bar-Or et al. |
| 2015/0371665 | A1 | 12/2015 | Naik et al. |
| 2015/0373183 | A1 | 12/2015 | Woolsey et al. |
| 2015/0373428 | A1 | 12/2015 | Trollope et al. |
| 2015/0379118 | A1 | 12/2015 | Wickenkamp et al. |
| 2015/0379414 | A1 | 12/2015 | Yeh et al. |
| 2015/0379423 | A1 | 12/2015 | Dirac et al. |
| 2015/0379993 | A1 | 12/2015 | Subhojit et al. |
| 2015/0381923 | A1 | 12/2015 | Wickenkamp et al. |
| 2015/0382047 | A1 | 12/2015 | Van Os et al. |
| 2015/0382079 | A1 | 12/2015 | Lister et al. |
| 2015/0382147 | A1 | 12/2015 | Clark et al. |
| 2015/0382164 | A1 | 12/2015 | Chung et al. |
| 2015/0382322 | A1 | 12/2015 | Migicovsky et al. |
| 2016/0004499 | A1 | 1/2016 | Kim et al. |
| 2016/0004690 | A1 | 1/2016 | Bangalore et al. |
| 2016/0005320 | A1 | 1/2016 | DeCharms et al. |
| 2016/0006795 | A1 | 1/2016 | Yunten |
| 2016/0012038 | A1 | 1/2016 | Edwards et al. |
| 2016/0014476 | A1 | 1/2016 | Caliendo, Jr. et al. |
| 2016/0018872 | A1 | 1/2016 | Tu et al. |
| 2016/0018899 | A1 | 1/2016 | Tu et al. |
| 2016/0018900 | A1 | 1/2016 | Tu et al. |
| 2016/0018959 | A1 | 1/2016 | Yamashita et al. |
| 2016/0019886 | A1 | 1/2016 | Hong |
| 2016/0019896 | A1 | 1/2016 | Guevara et al. |
| 2016/0021168 | A1 | 1/2016 | Chaudhri et al. |
| 2016/0021414 | A1 | 1/2016 | Padi et al. |
| 2016/0026242 | A1 | 1/2016 | Burns et al. |
| 2016/0026258 | A1 | 1/2016 | Ou et al. |
| 2016/0027431 | A1 | 1/2016 | Kurzweil et al. |
| 2016/0027439 | A1 | 1/2016 | Sharifi |
| 2016/0028666 | A1 | 1/2016 | Li |
| 2016/0028802 | A1 | 1/2016 | Balasingh et al. |
| 2016/0029316 | A1 | 1/2016 | Mohan et al. |
| 2016/0034042 | A1 | 2/2016 | Joo |
| 2016/0034253 | A1 | 2/2016 | Bang et al. |
| 2016/0034447 | A1 | 2/2016 | Shin et al. |
| 2016/0034811 | A1 | 2/2016 | Paulik et al. |
| 2016/0036750 | A1 | 2/2016 | Yuan et al. |
| 2016/0036953 | A1 | 2/2016 | Lee et al. |
| 2016/0036996 | A1 | 2/2016 | Midholt et al. |
| 2016/0041597 | A1 | 2/2016 | Graham et al. |
| 2016/0041733 | A1 | 2/2016 | Qian et al. |
| 2016/0041809 | A1 | 2/2016 | Clayton et al. |
| 2016/0042735 | A1 | 2/2016 | Vibbert et al. |
| 2016/0042748 | A1 | 2/2016 | Jain et al. |
| 2016/0043905 | A1 | 2/2016 | Fiedler |
| 2016/0048666 | A1 | 2/2016 | Dey et al. |
| 2016/0050254 | A1 | 2/2016 | Rao et al. |
| 2016/0055422 | A1 | 2/2016 | Li |
| 2016/0057203 | A1 | 2/2016 | Gardenfors et al. |
| 2016/0057475 | A1 | 2/2016 | Liu |
| 2016/0061623 | A1 | 3/2016 | Pahwa et al. |
| 2016/0062459 | A1 | 3/2016 | Publicover et al. |
| 2016/0062605 | A1 | 3/2016 | Agarwal et al. |
| 2016/0063094 | A1 | 3/2016 | Udupa et al. |
| 2016/0063095 | A1 | 3/2016 | Nassar et al. |
| 2016/0063998 | A1 | 3/2016 | Krishnamoorthy et al. |
| 2016/0065155 | A1 | 3/2016 | Bharj et al. |
| 2016/0065626 | A1 | 3/2016 | Jain et al. |
| 2016/0066020 | A1 | 3/2016 | Mountain |
| 2016/0066277 | A1 | 3/2016 | Yang et al. |
| 2016/0066360 | A1 | 3/2016 | Vinegrad et al. |
| 2016/0070581 | A1 | 3/2016 | Soon-Shiong |
| 2016/0071510 | A1 | 3/2016 | Li et al. |
| 2016/0071516 | A1 | 3/2016 | Lee et al. |
| 2016/0071517 | A1 | 3/2016 | Beaver et al. |
| 2016/0071520 | A1 | 3/2016 | Hayakawa |
| 2016/0071521 | A1 | 3/2016 | Haughay |
| 2016/0072940 | A1 | 3/2016 | Cronin |
| 2016/0077794 | A1 | 3/2016 | Kim et al. |
| 2016/0078359 | A1 | 3/2016 | Csurka et al. |
| 2016/0078860 | A1 | 3/2016 | Paulik et al. |
| 2016/0080165 | A1 | 3/2016 | Ehsani et al. |
| 2016/0080475 | A1 | 3/2016 | Singh et al. |
| 2016/0080552 | A1 | 3/2016 | Keating et al. |
| 2016/0085295 | A1 | 3/2016 | Shimy et al. |
| 2016/0085827 | A1 | 3/2016 | Chadha et al. |
| 2016/0086116 | A1 | 3/2016 | Rao et al. |
| 2016/0086599 | A1 | 3/2016 | Kurata et al. |
| 2016/0088335 | A1 | 3/2016 | Zucchetta |
| 2016/0091871 | A1 | 3/2016 | Marti et al. |
| 2016/0091967 | A1 | 3/2016 | Prokofieva et al. |
| 2016/0092046 | A1 | 3/2016 | Hong et al. |
| 2016/0092074 | A1 | 3/2016 | Raux et al. |
| 2016/0092434 | A1 | 3/2016 | Bellegarda |
| 2016/0092447 | A1 | 3/2016 | Pathurudeen et al. |
| 2016/0092766 | A1 | 3/2016 | Sainath et al. |
| 2016/0093291 | A1 | 3/2016 | Kim |
| 2016/0093298 | A1 | 3/2016 | Naik et al. |
| 2016/0093301 | A1 | 3/2016 | Bellegarda et al. |
| 2016/0093304 | A1 | 3/2016 | Kim et al. |
| 2016/0094700 | A1 | 3/2016 | Lee et al. |
| 2016/0094889 | A1 | 3/2016 | Venkataraman et al. |
| 2016/0094979 | A1 | 3/2016 | Naik et al. |
| 2016/0098991 | A1 | 4/2016 | Luo et al. |
| 2016/0098992 | A1 | 4/2016 | Renard et al. |
| 2016/0099892 | A1 | 4/2016 | Palakovich et al. |
| 2016/0099984 | A1 | 4/2016 | Karagiannis et al. |
| 2016/0103830 | A1 | 4/2016 | Cheong et al. |
| 2016/0104480 | A1 | 4/2016 | Sharifi |
| 2016/0104486 | A1 | 4/2016 | Penilla et al. |
| 2016/0105308 | A1 | 4/2016 | Dutt |
| 2016/0111091 | A1 | 4/2016 | Bakish |
| 2016/0112746 | A1 | 4/2016 | Zhang et al. |
| 2016/0112792 | A1 | 4/2016 | Lee et al. |
| 2016/0116980 | A1 | 4/2016 | George-Svahn et al. |

(56) References Cited

U.S. PATENT DOCUMENTS

| | | | |
|---|---|---|---|
| 2016/0117386 | A1 | 4/2016 | Ajmera et al. |
| 2016/0118048 | A1 | 4/2016 | Heide |
| 2016/0119338 | A1 | 4/2016 | Cheyer |
| 2016/0125048 | A1 | 5/2016 | Hamada |
| 2016/0125071 | A1 | 5/2016 | Gabbai |
| 2016/0132046 | A1 | 5/2016 | Beoughter et al. |
| 2016/0132290 | A1 | 5/2016 | Raux |
| 2016/0132484 | A1 | 5/2016 | Nauze et al. |
| 2016/0132488 | A1 | 5/2016 | Clark et al. |
| 2016/0133254 | A1 | 5/2016 | Vogel et al. |
| 2016/0139662 | A1 | 5/2016 | Dabhade |
| 2016/0139720 | A1 | 5/2016 | Kritt et al. |
| 2016/0140113 | A1 | 5/2016 | Shen |
| 2016/0140951 | A1 | 5/2016 | Agiomyrgiannakis et al. |
| 2016/0140962 | A1 | 5/2016 | Sharifi |
| 2016/0147725 | A1 | 5/2016 | Patten et al. |
| 2016/0147739 | A1 | 5/2016 | Lim et al. |
| 2016/0148610 | A1 | 5/2016 | Kennewick, Jr. et al. |
| 2016/0148612 | A1 | 5/2016 | Guo et al. |
| 2016/0148613 | A1 | 5/2016 | Kwon et al. |
| 2016/0149966 | A1 | 5/2016 | Remash et al. |
| 2016/0150020 | A1 | 5/2016 | Farmer et al. |
| 2016/0151668 | A1 | 6/2016 | Barnes et al. |
| 2016/0154624 | A1 | 6/2016 | Son et al. |
| 2016/0154792 | A1 | 6/2016 | Sarikaya et al. |
| 2016/0154880 | A1 | 6/2016 | Hoarty |
| 2016/0155442 | A1 | 6/2016 | Kannan et al. |
| 2016/0155443 | A1 | 6/2016 | Khan et al. |
| 2016/0156574 | A1 | 6/2016 | Hum et al. |
| 2016/0156990 | A1 | 6/2016 | Miccoy et al. |
| 2016/0162456 | A1 | 6/2016 | Munro et al. |
| 2016/0163311 | A1 | 6/2016 | Crook et al. |
| 2016/0163312 | A1 | 6/2016 | Naik et al. |
| 2016/0165296 | A1 | 6/2016 | Hamon |
| 2016/0169267 | A1 | 6/2016 | Pool |
| 2016/0170507 | A1 | 6/2016 | Miller et al. |
| 2016/0170710 | A1 | 6/2016 | Kim et al. |
| 2016/0170966 | A1 | 6/2016 | Kolo |
| 2016/0171980 | A1 | 6/2016 | Liddell et al. |
| 2016/0173578 | A1 | 6/2016 | Sharma et al. |
| 2016/0173617 | A1 | 6/2016 | Allinson |
| 2016/0173929 | A1 | 6/2016 | Klappert |
| 2016/0173960 | A1 | 6/2016 | Snibbe et al. |
| 2016/0179462 | A1 | 6/2016 | Bjorkengren |
| 2016/0179464 | A1 | 6/2016 | Reddy et al. |
| 2016/0179787 | A1 | 6/2016 | Deleeuw |
| 2016/0180840 | A1 | 6/2016 | Siddiq et al. |
| 2016/0180844 | A1 | 6/2016 | Vanblon et al. |
| 2016/0182410 | A1 | 6/2016 | Janakiraman et al. |
| 2016/0182709 | A1 | 6/2016 | Kim et al. |
| 2016/0188181 | A1 | 6/2016 | Smith |
| 2016/0188738 | A1 | 6/2016 | Gruber et al. |
| 2016/0189198 | A1 | 6/2016 | Daniel et al. |
| 2016/0189706 | A1 | 6/2016 | Zopf et al. |
| 2016/0189715 | A1 | 6/2016 | Nishikawa |
| 2016/0189717 | A1 | 6/2016 | Kannan et al. |
| 2016/0195924 | A1 | 7/2016 | Weber et al. |
| 2016/0196110 | A1 | 7/2016 | Yehoshua et al. |
| 2016/0198319 | A1 | 7/2016 | Huang et al. |
| 2016/0202957 | A1 | 7/2016 | Siddall et al. |
| 2016/0203002 | A1 | 7/2016 | Kannan et al. |
| 2016/0203193 | A1 | 7/2016 | Kevin et al. |
| 2016/0210115 | A1 | 7/2016 | Lee |
| 2016/0210551 | A1 | 7/2016 | Lee et al. |
| 2016/0210981 | A1 | 7/2016 | Lee |
| 2016/0212206 | A1 | 7/2016 | Wu et al. |
| 2016/0212208 | A1 | 7/2016 | Kulkarni et al. |
| 2016/0212488 | A1 | 7/2016 | Os et al. |
| 2016/0217784 | A1 | 7/2016 | Gelfenbeyn et al. |
| 2016/0217794 | A1 | 7/2016 | Imoto et al. |
| 2016/0224524 | A1 | 8/2016 | Kay et al. |
| 2016/0224540 | A1 | 8/2016 | Stewart et al. |
| 2016/0224559 | A1 | 8/2016 | Hicks et al. |
| 2016/0224774 | A1 | 8/2016 | Pender |
| 2016/0225372 | A1 | 8/2016 | Cheung et al. |
| 2016/0226713 | A1 | 8/2016 | Pitschel et al. |
| 2016/0226956 | A1 | 8/2016 | Hong et al. |
| 2016/0227107 | A1 | 8/2016 | Beaumont |
| 2016/0227633 | A1 | 8/2016 | Sun et al. |
| 2016/0232500 | A1 | 8/2016 | Wang et al. |
| 2016/0234206 | A1 | 8/2016 | Tunnell et al. |
| 2016/0234553 | A1 | 8/2016 | Hampson et al. |
| 2016/0239480 | A1 | 8/2016 | Larcheveque et al. |
| 2016/0239568 | A1 | 8/2016 | Packer et al. |
| 2016/0239645 | A1 | 8/2016 | Heo et al. |
| 2016/0239848 | A1 | 8/2016 | Chang et al. |
| 2016/0240187 | A1 | 8/2016 | Fleizach et al. |
| 2016/0240189 | A1 | 8/2016 | Lee et al. |
| 2016/0240192 | A1 | 8/2016 | Raghuvir |
| 2016/0242148 | A1 | 8/2016 | Reed |
| 2016/0246776 | A1 | 8/2016 | Zhao et al. |
| 2016/0247061 | A1 | 8/2016 | Trask et al. |
| 2016/0247110 | A1 | 8/2016 | Sinha |
| 2016/0249319 | A1 | 8/2016 | Dotan-Cohen et al. |
| 2016/0252972 | A1 | 9/2016 | Kim et al. |
| 2016/0253312 | A1 | 9/2016 | Rhodes |
| 2016/0253528 | A1 | 9/2016 | Gao et al. |
| 2016/0255549 | A1 | 9/2016 | Lakhdhar et al. |
| 2016/0259623 | A1 | 9/2016 | Sumner et al. |
| 2016/0259656 | A1 | 9/2016 | Sumner et al. |
| 2016/0259779 | A1 | 9/2016 | Labsky et al. |
| 2016/0260130 | A1 | 9/2016 | Chand et al. |
| 2016/0260431 | A1 | 9/2016 | Newendorp et al. |
| 2016/0260433 | A1 | 9/2016 | Sumner et al. |
| 2016/0260434 | A1 | 9/2016 | Gelfenbeyn et al. |
| 2016/0260436 | A1 | 9/2016 | Lemay et al. |
| 2016/0262442 | A1 | 9/2016 | Davila et al. |
| 2016/0266653 | A1 | 9/2016 | Liu et al. |
| 2016/0266871 | A1 | 9/2016 | Schmid et al. |
| 2016/0267904 | A1 | 9/2016 | Biadsy et al. |
| 2016/0269540 | A1 | 9/2016 | Butcher et al. |
| 2016/0274938 | A1 | 9/2016 | Strinati et al. |
| 2016/0275941 | A1 | 9/2016 | Bellegarda et al. |
| 2016/0275947 | A1 | 9/2016 | Li et al. |
| 2016/0282824 | A1 | 9/2016 | Smallwood et al. |
| 2016/0282956 | A1 | 9/2016 | Ouyang et al. |
| 2016/0283055 | A1 | 9/2016 | Haghighat et al. |
| 2016/0283185 | A1 | 9/2016 | McLaren et al. |
| 2016/0283455 | A1 | 9/2016 | Mardanbegi et al. |
| 2016/0283463 | A1 | 9/2016 | Sumesh et al. |
| 2016/0284005 | A1 | 9/2016 | Daniel et al. |
| 2016/0284199 | A1 | 9/2016 | Dotan-Cohen et al. |
| 2016/0284340 | A1 | 9/2016 | Li et al. |
| 2016/0284350 | A1 | 9/2016 | Yun et al. |
| 2016/0285808 | A1 | 9/2016 | Franklin et al. |
| 2016/0286045 | A1 | 9/2016 | Shaltiel et al. |
| 2016/0291831 | A1 | 10/2016 | Baek |
| 2016/0292603 | A1 | 10/2016 | Prajapati et al. |
| 2016/0293157 | A1 | 10/2016 | Chen et al. |
| 2016/0293167 | A1 | 10/2016 | Chen et al. |
| 2016/0293168 | A1 | 10/2016 | Chen |
| 2016/0294755 | A1 | 10/2016 | Prabhu |
| 2016/0294813 | A1 | 10/2016 | Zou |
| 2016/0299685 | A1 | 10/2016 | Zhai et al. |
| 2016/0299882 | A1 | 10/2016 | Hegerty et al. |
| 2016/0299883 | A1 | 10/2016 | Zhu et al. |
| 2016/0299977 | A1 | 10/2016 | Hreha |
| 2016/0300571 | A1 | 10/2016 | Foerster et al. |
| 2016/0301639 | A1 | 10/2016 | Liu et al. |
| 2016/0306683 | A1 | 10/2016 | Standley et al. |
| 2016/0306800 | A1 | 10/2016 | Son et al. |
| 2016/0307562 | A1 | 10/2016 | Zhao et al. |
| 2016/0307566 | A1 | 10/2016 | Bellegarda |
| 2016/0308794 | A1 | 10/2016 | Kim et al. |
| 2016/0308799 | A1 | 10/2016 | Schubert et al. |
| 2016/0309035 | A1 | 10/2016 | Li |
| 2016/0313906 | A1 | 10/2016 | Kilchenko et al. |
| 2016/0313958 | A1 | 10/2016 | Guadarrama et al. |
| 2016/0314341 | A1 | 10/2016 | Maranzana et al. |
| 2016/0314788 | A1 | 10/2016 | Jitkoff et al. |
| 2016/0314789 | A1 | 10/2016 | Marcheret et al. |
| 2016/0314792 | A1 | 10/2016 | Alvarez et al. |
| 2016/0315996 | A1 | 10/2016 | Ha et al. |
| 2016/0316349 | A1 | 10/2016 | Lee et al. |

(56) References Cited

U.S. PATENT DOCUMENTS

2016/0317924 A1 11/2016 Tanaka et al.
2016/0320838 A1 11/2016 Teller et al.
2016/0320849 A1 11/2016 Koo
2016/0321239 A1 11/2016 Iso-Sipila et al.
2016/0321243 A1 11/2016 Walia et al.
2016/0321261 A1 11/2016 Spasojevic et al.
2016/0321358 A1 11/2016 Kanani et al.
2016/0322043 A1 11/2016 Bellegarda
2016/0322044 A1 11/2016 Jung et al.
2016/0322045 A1 11/2016 Hatfield et al.
2016/0322048 A1 11/2016 Amano et al.
2016/0322050 A1 11/2016 Wang et al.
2016/0322055 A1 11/2016 Sainath et al.
2016/0328134 A1 11/2016 Xu
2016/0328147 A1 11/2016 Zhang et al.
2016/0328205 A1 11/2016 Agrawal et al.
2016/0328667 A1 11/2016 Macciola et al.
2016/0328893 A1 11/2016 Cordova et al.
2016/0329060 A1 11/2016 Ito et al.
2016/0334973 A1 11/2016 Reckhow et al.
2016/0335138 A1 11/2016 Surti et al.
2016/0335139 A1 11/2016 Hurley et al.
2016/0335532 A1 11/2016 Sanghavi et al.
2016/0336006 A1 11/2016 Levit et al.
2016/0336007 A1 11/2016 Hanazawa et al.
2016/0336010 A1 11/2016 Lindahl
2016/0336011 A1 11/2016 Koll et al.
2016/0336024 A1 11/2016 Choi et al.
2016/0337299 A1 11/2016 Lane et al.
2016/0337301 A1 11/2016 Rollins et al.
2016/0342317 A1 11/2016 Lim et al.
2016/0342685 A1 11/2016 Basu et al.
2016/0342781 A1 11/2016 Jeon
2016/0342803 A1 11/2016 Goodridge et al.
2016/0350070 A1 12/2016 Sung et al.
2016/0350650 A1 12/2016 Leeman-Munk et al.
2016/0350812 A1 12/2016 Priness et al.
2016/0351190 A1 12/2016 Piernot et al.
2016/0352567 A1 12/2016 Robbins et al.
2016/0352924 A1 12/2016 Senarath et al.
2016/0357304 A1 12/2016 Hatori et al.
2016/0357362 A1 12/2016 Gauci et al.
2016/0357507 A1 12/2016 Decker et al.
2016/0357509 A1 12/2016 Alsina et al.
2016/0357728 A1 12/2016 Bellegarda et al.
2016/0357790 A1 12/2016 Elkington et al.
2016/0357861 A1 12/2016 Carlhian et al.
2016/0357870 A1 12/2016 Hentschel et al.
2016/0358180 A1 12/2016 Van Os et al.
2016/0358598 A1 12/2016 Williams et al.
2016/0358600 A1 12/2016 Nallasamy et al.
2016/0358603 A1 12/2016 Azam et al.
2016/0358605 A1 12/2016 Ganong et al.
2016/0358609 A1 12/2016 Connell et al.
2016/0358619 A1 12/2016 Ramprashad et al.
2016/0359771 A1 12/2016 Sridhar
2016/0360039 A1 12/2016 Sanghavi et al.
2016/0360336 A1 12/2016 Gross et al.
2016/0360382 A1 12/2016 Gross et al.
2016/0364378 A1 12/2016 Futrell et al.
2016/0364382 A1 12/2016 Sarikaya
2016/0365101 A1 12/2016 Foy et al.
2016/0371054 A1 12/2016 Beaumont et al.
2016/0371250 A1 12/2016 Rhodes
2016/0372112 A1 12/2016 Miller et al.
2016/0372119 A1 12/2016 Sak et al.
2016/0373571 A1 12/2016 Woolsey et al.
2016/0378080 A1 12/2016 Uppala et al.
2016/0378210 A1 12/2016 Shi
2016/0378747 A1 12/2016 Orr et al.
2016/0379091 A1 12/2016 Lin et al.
2016/0379105 A1 12/2016 Moore, Jr.
2016/0379626 A1 12/2016 Deisher et al.
2016/0379632 A1 12/2016 Hoffmeister et al.
2016/0379633 A1 12/2016 Lehman et al.
2016/0379639 A1 12/2016 Weinstein et al.
2016/0379641 A1 12/2016 Liu et al.
2017/0000348 A1 1/2017 Karsten et al.
2017/0003931 A1 1/2017 Dvortsov et al.
2017/0004209 A1 1/2017 Johl et al.
2017/0004409 A1 1/2017 Chu et al.
2017/0004824 A1 1/2017 Yoo et al.
2017/0005818 A1 1/2017 Gould
2017/0006329 A1 1/2017 Jang et al.
2017/0011091 A1 1/2017 Chehreghani
2017/0011279 A1 1/2017 Soldevila et al.
2017/0011303 A1 1/2017 Annapureddy et al.
2017/0011742 A1 1/2017 Jing et al.
2017/0013124 A1 1/2017 Havelka et al.
2017/0013331 A1 1/2017 Watanabe et al.
2017/0018271 A1 1/2017 Khan et al.
2017/0019987 A1 1/2017 Dragone et al.
2017/0023963 A1 1/2017 Davis et al.
2017/0024398 A1 1/2017 Tomkins et al.
2017/0025124 A1 1/2017 Mixter et al.
2017/0026318 A1 1/2017 Daniel et al.
2017/0026509 A1 1/2017 Rand
2017/0026705 A1 1/2017 Yeh et al.
2017/0027522 A1 2/2017 Van Hasselt et al.
2017/0031576 A1 2/2017 Saoji et al.
2017/0031711 A1 2/2017 Wu et al.
2017/0032022 A1 2/2017 Srinivasan et al.
2017/0032440 A1 2/2017 Paton
2017/0032783 A1 2/2017 Lord et al.
2017/0032787 A1 2/2017 Dayal
2017/0032791 A1 2/2017 Elson et al.
2017/0034087 A1 2/2017 Borenstein et al.
2017/0039283 A1 2/2017 Bennett et al.
2017/0039475 A1 2/2017 Cheyer et al.
2017/0040002 A1 2/2017 Basson et al.
2017/0041388 A1 2/2017 Tal et al.
2017/0041858 A1 2/2017 Tong et al.
2017/0046025 A1 2/2017 Dascola et al.
2017/0046330 A1 2/2017 Si et al.
2017/0047063 A1 2/2017 Ohmura et al.
2017/0052760 A1 2/2017 Johnson et al.
2017/0053652 A1 2/2017 Choi et al.
2017/0055895 A1 3/2017 Jardins et al.
2017/0060385 A1 3/2017 Goldsmith et al.
2017/0060853 A1 3/2017 Lee et al.
2017/0061423 A1 3/2017 Bryant et al.
2017/0068423 A1 3/2017 Napolitano et al.
2017/0068513 A1 3/2017 Stasior et al.
2017/0068550 A1 3/2017 Zeitlin
2017/0068670 A1 3/2017 Orr et al.
2017/0069308 A1 3/2017 Aleksic et al.
2017/0069321 A1 3/2017 Toiyama
2017/0069327 A1 3/2017 Heigold et al.
2017/0075653 A1 3/2017 Dawidowsky et al.
2017/0075879 A1 3/2017 Sakamoto et al.
2017/0076518 A1 3/2017 Patterson et al.
2017/0076720 A1 3/2017 Gopalan et al.
2017/0076721 A1 3/2017 Bargetzi et al.
2017/0078490 A1 3/2017 Kaminsky et al.
2017/0083179 A1 3/2017 Gruber et al.
2017/0083202 A1 3/2017 Yang et al.
2017/0083285 A1 3/2017 Meyers et al.
2017/0083504 A1 3/2017 Huang
2017/0083506 A1 3/2017 Liu et al.
2017/0084277 A1 3/2017 Sharifi
2017/0085547 A1 3/2017 De Aguiar et al.
2017/0085696 A1 3/2017 Abkairov
2017/0090428 A1 3/2017 Oohara
2017/0090569 A1 3/2017 Levesque
2017/0090864 A1 3/2017 Jorgovanovic
2017/0091168 A1 3/2017 Bellegarda et al.
2017/0091169 A1 3/2017 Bellegarda et al.
2017/0091612 A1 3/2017 Gruber et al.
2017/0092259 A1 3/2017 Jeon
2017/0092270 A1 3/2017 Newendorp et al.
2017/0092278 A1 3/2017 Evermann et al.
2017/0093356 A1 3/2017 Cudak et al.
2017/0097743 A1 4/2017 Hameed et al.
2017/0102837 A1 4/2017 Toumpelis

(56) References Cited

U.S. PATENT DOCUMENTS

| | | | |
|---|---|---|---|
| 2017/0102915 | A1 | 4/2017 | Kuscher et al. |
| 2017/0103749 | A1 | 4/2017 | Zhao et al. |
| 2017/0103752 | A1 | 4/2017 | Senior et al. |
| 2017/0105190 | A1 | 4/2017 | Logan et al. |
| 2017/0108236 | A1 | 4/2017 | Guan et al. |
| 2017/0110117 | A1 | 4/2017 | Chakladar et al. |
| 2017/0110125 | A1 | 4/2017 | Xu et al. |
| 2017/0116177 | A1 | 4/2017 | Walia |
| 2017/0116982 | A1 | 4/2017 | Gelfenbeyn et al. |
| 2017/0116985 | A1 | 4/2017 | Mathias et al. |
| 2017/0116987 | A1 | 4/2017 | Kang et al. |
| 2017/0116989 | A1 | 4/2017 | Yadgar et al. |
| 2017/0124190 | A1 | 5/2017 | Wang et al. |
| 2017/0124311 | A1 | 5/2017 | Li et al. |
| 2017/0124531 | A1 | 5/2017 | McCormack |
| 2017/0125016 | A1 | 5/2017 | Wang |
| 2017/0127124 | A9 | 5/2017 | Wilson et al. |
| 2017/0131778 | A1 | 5/2017 | Iyer |
| 2017/0132019 | A1 | 5/2017 | Karashchuk et al. |
| 2017/0132199 | A1 | 5/2017 | Vescovi et al. |
| 2017/0133007 | A1 | 5/2017 | Drewes |
| 2017/0133009 | A1 | 5/2017 | Cho et al. |
| 2017/0134807 | A1 | 5/2017 | Shaw et al. |
| 2017/0139471 | A1 | 5/2017 | Bury et al. |
| 2017/0140041 | A1 | 5/2017 | Dotan-Cohen et al. |
| 2017/0140052 | A1 | 5/2017 | Bufe, III et al. |
| 2017/0140644 | A1 | 5/2017 | Hwang et al. |
| 2017/0140760 | A1 | 5/2017 | Sachdev |
| 2017/0147722 | A1 | 5/2017 | Greenwood |
| 2017/0147841 | A1 | 5/2017 | Stagg et al. |
| 2017/0148044 | A1 | 5/2017 | Fukuda et al. |
| 2017/0148307 | A1 | 5/2017 | Yeom et al. |
| 2017/0154033 | A1 | 6/2017 | Lee |
| 2017/0154055 | A1 | 6/2017 | Dimson et al. |
| 2017/0154176 | A1 | 6/2017 | Yun et al. |
| 2017/0154628 | A1 | 6/2017 | Mohajer et al. |
| 2017/0155940 | A1 | 6/2017 | Jin et al. |
| 2017/0155965 | A1 | 6/2017 | Ward |
| 2017/0161018 | A1 | 6/2017 | Lemay et al. |
| 2017/0161268 | A1 | 6/2017 | Badaskar |
| 2017/0161293 | A1 | 6/2017 | Ionescu et al. |
| 2017/0161393 | A1 | 6/2017 | Oh et al. |
| 2017/0161439 | A1 | 6/2017 | Raduchel et al. |
| 2017/0161500 | A1 | 6/2017 | Yang |
| 2017/0162191 | A1 | 6/2017 | Grost et al. |
| 2017/0162202 | A1 | 6/2017 | Anthony et al. |
| 2017/0162203 | A1 | 6/2017 | Huang et al. |
| 2017/0169506 | A1 | 6/2017 | Wishne et al. |
| 2017/0169818 | A1 | 6/2017 | Vanblon et al. |
| 2017/0169819 | A1 | 6/2017 | Mese et al. |
| 2017/0171139 | A1 | 6/2017 | Marra et al. |
| 2017/0171261 | A1 | 6/2017 | Smus |
| 2017/0171387 | A1 | 6/2017 | Vendrow |
| 2017/0177080 | A1 | 6/2017 | Deleeuw |
| 2017/0177547 | A1 | 6/2017 | Ciereszko et al. |
| 2017/0177738 | A1 | 6/2017 | Goldman |
| 2017/0178619 | A1 | 6/2017 | Naik et al. |
| 2017/0178620 | A1 | 6/2017 | Fleizach et al. |
| 2017/0178626 | A1 | 6/2017 | Gruber et al. |
| 2017/0178666 | A1 | 6/2017 | Yu |
| 2017/0180499 | A1 | 6/2017 | Gelfenbeyn et al. |
| 2017/0185375 | A1 | 6/2017 | Martel et al. |
| 2017/0185581 | A1 | 6/2017 | Bojja et al. |
| 2017/0186429 | A1 | 6/2017 | Giuli et al. |
| 2017/0186432 | A1 | 6/2017 | Aleksic et al. |
| 2017/0186446 | A1 | 6/2017 | Wosk et al. |
| 2017/0187711 | A1 | 6/2017 | Joo et al. |
| 2017/0193083 | A1 | 7/2017 | Bhatt et al. |
| 2017/0195493 | A1 | 7/2017 | Sudarsan et al. |
| 2017/0195495 | A1 | 7/2017 | Deora et al. |
| 2017/0195636 | A1 | 7/2017 | Child et al. |
| 2017/0195856 | A1 | 7/2017 | Snyder et al. |
| 2017/0199870 | A1 | 7/2017 | Zheng et al. |
| 2017/0199874 | A1 | 7/2017 | Patel et al. |
| 2017/0200066 | A1 | 7/2017 | Wang et al. |
| 2017/0201609 | A1 | 7/2017 | Salmenkaita et al. |
| 2017/0201613 | A1 | 7/2017 | Engelke et al. |
| 2017/0201846 | A1 | 7/2017 | Katayama et al. |
| 2017/0206002 | A1 | 7/2017 | Badger et al. |
| 2017/0206797 | A1 | 7/2017 | Solomon et al. |
| 2017/0206899 | A1 | 7/2017 | Bryant et al. |
| 2017/0215052 | A1 | 7/2017 | Koum et al. |
| 2017/0220212 | A1 | 8/2017 | Yang et al. |
| 2017/0221486 | A1 | 8/2017 | Kurata et al. |
| 2017/0222961 | A1 | 8/2017 | Beach et al. |
| 2017/0223189 | A1 | 8/2017 | Meredith et al. |
| 2017/0227935 | A1 | 8/2017 | Su et al. |
| 2017/0228367 | A1 | 8/2017 | Pasupalak et al. |
| 2017/0228382 | A1 | 8/2017 | Haviv et al. |
| 2017/0229121 | A1 | 8/2017 | Taki et al. |
| 2017/0230429 | A1 | 8/2017 | Garmark et al. |
| 2017/0230497 | A1 | 8/2017 | Kim et al. |
| 2017/0230709 | A1 | 8/2017 | Van Os et al. |
| 2017/0235360 | A1 | 8/2017 | George-Svahn |
| 2017/0235361 | A1 | 8/2017 | Rigazio et al. |
| 2017/0235618 | A1 | 8/2017 | Lin et al. |
| 2017/0235721 | A1 | 8/2017 | Almosallam et al. |
| 2017/0236512 | A1 | 8/2017 | Williams et al. |
| 2017/0236514 | A1 | 8/2017 | Nelson |
| 2017/0236517 | A1 | 8/2017 | Yu et al. |
| 2017/0238039 | A1 | 8/2017 | Sabattini |
| 2017/0242478 | A1 | 8/2017 | Ma |
| 2017/0242653 | A1 | 8/2017 | Lang et al. |
| 2017/0242657 | A1 | 8/2017 | Jarvis et al. |
| 2017/0242840 | A1 | 8/2017 | Lu et al. |
| 2017/0242920 | A1 | 8/2017 | Neland |
| 2017/0243468 | A1 | 8/2017 | Dotan-Cohen et al. |
| 2017/0243576 | A1 | 8/2017 | Millington et al. |
| 2017/0243583 | A1 | 8/2017 | Raichelgauz et al. |
| 2017/0243586 | A1 | 8/2017 | Civelli et al. |
| 2017/0243600 | A1 | 8/2017 | Teshima |
| 2017/0249291 | A1 | 8/2017 | Patel |
| 2017/0249309 | A1 | 8/2017 | Sarikaya |
| 2017/0256256 | A1 | 9/2017 | Wang et al. |
| 2017/0257723 | A1 | 9/2017 | Morishita et al. |
| 2017/0262051 | A1 | 9/2017 | Tall et al. |
| 2017/0262432 | A1 | 9/2017 | Sarikaya et al. |
| 2017/0262544 | A1 | 9/2017 | Brette et al. |
| 2017/0263058 | A1 | 9/2017 | Muta |
| 2017/0263247 | A1 | 9/2017 | Kang et al. |
| 2017/0263248 | A1 | 9/2017 | Gruber et al. |
| 2017/0263249 | A1 | 9/2017 | Akbacak et al. |
| 2017/0263254 | A1 | 9/2017 | Dewan et al. |
| 2017/0264451 | A1 | 9/2017 | Yu et al. |
| 2017/0264711 | A1 | 9/2017 | Natarajan et al. |
| 2017/0270092 | A1 | 9/2017 | He et al. |
| 2017/0270715 | A1 | 9/2017 | Lindsay et al. |
| 2017/0270822 | A1 | 9/2017 | Cohen |
| 2017/0270912 | A1 | 9/2017 | Levit et al. |
| 2017/0270919 | A1 | 9/2017 | Parthasarathi et al. |
| 2017/0273044 | A1 | 9/2017 | Alsina et al. |
| 2017/0277424 | A1 | 9/2017 | Witkowski et al. |
| 2017/0277691 | A1 | 9/2017 | Agarwal |
| 2017/0278513 | A1 | 9/2017 | Li et al. |
| 2017/0278514 | A1 | 9/2017 | Mathias et al. |
| 2017/0279795 | A1 | 9/2017 | Redberg |
| 2017/0285915 | A1 | 10/2017 | Napolitano et al. |
| 2017/0286397 | A1 | 10/2017 | Gonzalez |
| 2017/0286407 | A1 | 10/2017 | Chochowski et al. |
| 2017/0287218 | A1 | 10/2017 | Nuernberger et al. |
| 2017/0287472 | A1 | 10/2017 | Ogawa et al. |
| 2017/0289305 | A1 | 10/2017 | Liensberger et al. |
| 2017/0295446 | A1 | 10/2017 | Shivappa |
| 2017/0301348 | A1 | 10/2017 | Chen et al. |
| 2017/0301353 | A1 | 10/2017 | Mozer et al. |
| 2017/0308552 | A1 | 10/2017 | Soni et al. |
| 2017/0308589 | A1 | 10/2017 | Liu et al. |
| 2017/0308609 | A1 | 10/2017 | Berkhin et al. |
| 2017/0311005 | A1 | 10/2017 | Lin |
| 2017/0316775 | A1 | 11/2017 | Le et al. |
| 2017/0316779 | A1 | 11/2017 | Mohapatra et al. |
| 2017/0316782 | A1 | 11/2017 | Haughay |
| 2017/0319123 | A1 | 11/2017 | Voss et al. |
| 2017/0323637 | A1 | 11/2017 | Naik |

(56) References Cited

U.S. PATENT DOCUMENTS

2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0330567 A1 11/2017 Van Wissen et al.
2017/0336920 A1 11/2017 Chan et al.
2017/0337035 A1 11/2017 Choudhary et al.
2017/0337287 A1 11/2017 Gill
2017/0337478 A1 11/2017 Sarikaya et al.
2017/0337540 A1 11/2017 Buckman et al.
2017/0344931 A1 11/2017 Shenk et al.
2017/0345411 A1 11/2017 Raitio et al.
2017/0345420 A1 11/2017 Barnett, Jr.
2017/0345429 A1 11/2017 Hardee et al.
2017/0346949 A1 11/2017 Sanghavi et al.
2017/0347180 A1 11/2017 Petrank
2017/0347222 A1 11/2017 Kanter
2017/0351487 A1 12/2017 Aviles-Casco et al.
2017/0352346 A1 12/2017 Paulik et al.
2017/0352350 A1 12/2017 Booker et al.
2017/0357478 A1 12/2017 Piersol et al.
2017/0357529 A1 12/2017 Venkatraman et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0358317 A1 12/2017 James
2017/0359680 A1 12/2017 Ledvina et al.
2017/0359707 A1 12/2017 Diaconu et al.
2017/0365102 A1 12/2017 Huston et al.
2017/0365251 A1 12/2017 Park et al.
2017/0366909 A1 12/2017 Mickelsen et al.
2017/0366924 A1 12/2017 Thoen
2017/0371509 A1 12/2017 Jung et al.
2017/0371865 A1 12/2017 Eck et al.
2017/0371866 A1 12/2017 Eck
2017/0371885 A1 12/2017 Aggarwal et al.
2017/0372592 A1 12/2017 Neravati et al.
2017/0372703 A1 12/2017 Sung et al.
2017/0372719 A1 12/2017 Li et al.
2017/0374093 A1 12/2017 Dhar et al.
2017/0374176 A1 12/2017 Agrawal et al.
2018/0004372 A1 1/2018 Zurek et al.
2018/0004396 A1 1/2018 Ying
2018/0005112 A1 1/2018 Iso-Sipila et al.
2018/0007060 A1 1/2018 Leblang et al.
2018/0007096 A1 1/2018 Levin et al.
2018/0007210 A1 1/2018 Todasco
2018/0007538 A1 1/2018 Naik et al.
2018/0012596 A1 1/2018 Piernot et al.
2018/0018248 A1 1/2018 Bhargava et al.
2018/0018331 A1 1/2018 Kesamreddy
2018/0018590 A1 1/2018 Szeto et al.
2018/0018814 A1 1/2018 Patrik et al.
2018/0018959 A1 1/2018 Jardins et al.
2018/0018973 A1 1/2018 Moreno et al.
2018/0020093 A1 1/2018 Bentitou et al.
2018/0024985 A1 1/2018 Asano
2018/0025124 A1 1/2018 Mohr et al.
2018/0025287 A1 1/2018 Mathew et al.
2018/0028918 A1 2/2018 Tang et al.
2018/0032884 A1 2/2018 Murugeshan et al.
2018/0033431 A1 2/2018 Newendorp et al.
2018/0033435 A1 2/2018 Jacobs, II
2018/0033436 A1 2/2018 Zhou
2018/0034867 A1 2/2018 Zahn et al.
2018/0034961 A1 2/2018 Engelke et al.
2018/0035155 A1 2/2018 Garner et al.
2018/0039239 A1 2/2018 Burchard
2018/0039990 A1 2/2018 Lindemann
2018/0040020 A1 2/2018 Kurian et al.
2018/0041571 A1 2/2018 Rogers et al.
2018/0045963 A1 2/2018 Hoover et al.
2018/0046340 A1 2/2018 Mall
2018/0046851 A1 2/2018 Kienzle et al.
2018/0047201 A1 2/2018 Filev et al.
2018/0047288 A1 2/2018 Cordell et al.
2018/0047391 A1 2/2018 Baik et al.
2018/0047393 A1 2/2018 Tian et al.
2018/0047406 A1 2/2018 Park
2018/0052885 A1 2/2018 Gaskill et al.
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0060555 A1 3/2018 Boesen
2018/0061400 A1 3/2018 Carbune et al.
2018/0061401 A1 3/2018 Sarikaya et al.
2018/0061402 A1 3/2018 Devaraj et al.
2018/0061403 A1 3/2018 Devaraj et al.
2018/0061408 A1 3/2018 Andreas et al.
2018/0062691 A1 3/2018 Barnett, Jr.
2018/0063276 A1 3/2018 Foged
2018/0063308 A1 3/2018 Crystal et al.
2018/0063324 A1 3/2018 Van Meter, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0067929 A1 3/2018 Ahn
2018/0068074 A1 3/2018 Shen
2018/0068194 A1 3/2018 Matsuda
2018/0068660 A1 3/2018 Kawahara et al.
2018/0069743 A1 3/2018 Bakken et al.
2018/0069815 A1 3/2018 Fontana et al.
2018/0074661 A1 3/2018 Zhao et al.
2018/0075659 A1 3/2018 Browy et al.
2018/0075847 A1 3/2018 Lee et al.
2018/0075849 A1 3/2018 Khoury et al.
2018/0077095 A1 3/2018 Deyle et al.
2018/0077648 A1 3/2018 Nguyen
2018/0081739 A1 3/2018 Gravenites et al.
2018/0081884 A1 3/2018 Tan
2018/0081886 A1 3/2018 Tomkins et al.
2018/0082692 A1 3/2018 Khoury et al.
2018/0083898 A1 3/2018 Pham
2018/0088788 A1 3/2018 Cheung et al.
2018/0088896 A1 3/2018 Olson
2018/0088902 A1 3/2018 Mese et al.
2018/0088969 A1 3/2018 Vanblon et al.
2018/0089166 A1 3/2018 Meyer et al.
2018/0089588 A1 3/2018 Ravi et al.
2018/0090143 A1 3/2018 Saddler et al.
2018/0091604 A1 3/2018 Yamashita et al.
2018/0091732 A1 3/2018 Wilson et al.
2018/0091847 A1 3/2018 Wu et al.
2018/0096683 A1 4/2018 James et al.
2018/0096690 A1 4/2018 Mixter et al.
2018/0097812 A1 4/2018 Gillett et al.
2018/0101599 A1 4/2018 Kenneth et al.
2018/0101925 A1 4/2018 Brinig et al.
2018/0102914 A1 4/2018 Kawachi et al.
2018/0103209 A1 4/2018 Fischler et al.
2018/0107917 A1 4/2018 Hewavitharana et al.
2018/0107945 A1 4/2018 Gao et al.
2018/0108346 A1 4/2018 Paulik et al.
2018/0108351 A1 4/2018 Beckhardt et al.
2018/0108356 A1 4/2018 Mizumoto et al.
2018/0108357 A1 4/2018 Liu
2018/0109920 A1 4/2018 Aggarwal et al.
2018/0113673 A1 4/2018 Sheynblat
2018/0114198 A1 4/2018 Ghotbi et al.
2018/0114591 A1 4/2018 Pribanic et al.
2018/0121430 A1 5/2018 Kagoshima et al.
2018/0121432 A1 5/2018 Parson et al.
2018/0122376 A1 5/2018 Kojima

(56) References Cited

U.S. PATENT DOCUMENTS

2018/0122378 A1 5/2018 Mixter et al.
2018/0124458 A1 5/2018 Knox
2018/0126260 A1 5/2018 Chansoriya et al.
2018/0129492 A1 5/2018 Singh et al.
2018/0129967 A1 5/2018 Herreshoff
2018/0130470 A1 5/2018 Lemay et al.
2018/0130471 A1 5/2018 Trufinescu et al.
2018/0137097 A1 5/2018 Lim et al.
2018/0137404 A1 5/2018 Fauceglia et al.
2018/0137856 A1 5/2018 Gilbert
2018/0137857 A1 5/2018 Zhou et al.
2018/0137862 A1 5/2018 Park et al.
2018/0137865 A1 5/2018 Ling
2018/0143857 A1 5/2018 Anbazhagan et al.
2018/0143967 A1 5/2018 Anbazhagan et al.
2018/0144465 A1 5/2018 Hsieh et al.
2018/0144590 A1 5/2018 Mixter et al.
2018/0144615 A1 5/2018 Kinney et al.
2018/0144746 A1 5/2018 Mishra et al.
2018/0144748 A1 5/2018 Leong
2018/0146089 A1 5/2018 Rauenbuehler et al.
2018/0150744 A1 5/2018 Orr et al.
2018/0152557 A1 5/2018 White et al.
2018/0152558 A1 5/2018 Chan et al.
2018/0152803 A1 5/2018 Seefeldt et al.
2018/0157372 A1 6/2018 Kurabayashi
2018/0157398 A1 6/2018 Kaehler et al.
2018/0157408 A1 6/2018 Yu et al.
2018/0157992 A1 6/2018 Susskind et al.
2018/0158548 A1 6/2018 Taheri et al.
2018/0158552 A1 6/2018 Liu et al.
2018/0165278 A1 6/2018 He et al.
2018/0165801 A1 6/2018 Kim et al.
2018/0165857 A1 6/2018 Lee et al.
2018/0166076 A1 6/2018 Higuchi et al.
2018/0167884 A1 6/2018 Dawid et al.
2018/0173403 A1 6/2018 Carbune et al.
2018/0173542 A1 6/2018 Chan et al.
2018/0174363 A1 6/2018 Vanblon et al.
2018/0174406 A1 6/2018 Arashi et al.
2018/0174576 A1 6/2018 Soltau et al.
2018/0174597 A1 6/2018 Lee et al.
2018/0181185 A1 6/2018 Graham et al.
2018/0181370 A1 6/2018 Parkinson
2018/0182376 A1 6/2018 Gysel et al.
2018/0188840 A1 7/2018 Tamura et al.
2018/0188948 A1 7/2018 Ouyang et al.
2018/0189267 A1 7/2018 Takiel
2018/0190263 A1 7/2018 Calef, III
2018/0190264 A1 7/2018 Mixter et al.
2018/0190273 A1 7/2018 Karimli et al.
2018/0190274 A1 7/2018 Kirazci et al.
2018/0190279 A1 7/2018 Anderson et al.
2018/0191670 A1 7/2018 Suyama
2018/0196683 A1 7/2018 Radebaugh et al.
2018/0205675 A1 7/2018 Koo et al.
2018/0205983 A1 7/2018 Lee et al.
2018/0210874 A1 7/2018 Fuxman et al.
2018/0211005 A1 7/2018 Allen
2018/0213448 A1 7/2018 Segal et al.
2018/0214061 A1 8/2018 Knoth et al.
2018/0217810 A1 8/2018 Agrawal
2018/0218735 A1 8/2018 Hunt et al.
2018/0221783 A1 8/2018 Gamero
2018/0224231 A1 8/2018 Weinberg
2018/0225131 A1 8/2018 Tommy et al.
2018/0225274 A1 8/2018 Tommy et al.
2018/0225875 A1 8/2018 Yasrebi
2018/0232110 A1 8/2018 Cheung et al.
2018/0232203 A1 8/2018 Gelfenbeyn et al.
2018/0232608 A1 8/2018 Pradeep et al.
2018/0232688 A1 8/2018 Pike et al.
2018/0233132 A1 8/2018 Herold et al.
2018/0233139 A1 8/2018 Finkelstein et al.
2018/0233140 A1 8/2018 Koishida et al.
2018/0233142 A1 8/2018 Koishida et al.
2018/0246569 A1 8/2018 Arakawa et al.
2018/0247065 A1 8/2018 Rhee et al.
2018/0253209 A1 9/2018 Jaygarl et al.
2018/0253652 A1 9/2018 Palzer et al.
2018/0260680 A1 9/2018 Finkelstein et al.
2018/0267952 A1 9/2018 Osborne et al.
2018/0268023 A1 9/2018 Korpusik et al.
2018/0268106 A1 9/2018 Velaga
2018/0268337 A1 9/2018 Miller et al.
2018/0270343 A1 9/2018 Rout et al.
2018/0275839 A1 9/2018 Kocienda et al.
2018/0276197 A1 9/2018 Nell et al.
2018/0277113 A1 9/2018 Hartung et al.
2018/0278740 A1 9/2018 Choi et al.
2018/0285056 A1 10/2018 Cutler et al.
2018/0285063 A1 10/2018 Huynh et al.
2018/0288104 A1 10/2018 Padilla et al.
2018/0293086 A1 10/2018 Laird-McConnell et al.
2018/0293984 A1 10/2018 Lindahl
2018/0293988 A1 10/2018 Huang et al.
2018/0293989 A1 10/2018 De et al.
2018/0299878 A1 10/2018 Cella et al.
2018/0300317 A1 10/2018 Bradbury
2018/0300400 A1 10/2018 Paulus
2018/0300608 A1 10/2018 Sevrens et al.
2018/0300952 A1 10/2018 Evans et al.
2018/0307216 A1 10/2018 Ypma et al.
2018/0307603 A1 10/2018 Che
2018/0308470 A1 10/2018 Park et al.
2018/0308473 A1 10/2018 Scholar
2018/0308477 A1 10/2018 Nagasaka
2018/0308480 A1 10/2018 Jang et al.
2018/0308485 A1 10/2018 Kudurshian et al.
2018/0308486 A1 10/2018 Saddler et al.
2018/0308491 A1 10/2018 Oktem et al.
2018/0314362 A1 11/2018 Kim et al.
2018/0314552 A1 11/2018 Kim et al.
2018/0314689 A1 11/2018 Wang et al.
2018/0314981 A1 11/2018 Chen
2018/0315415 A1 11/2018 Mosley et al.
2018/0315416 A1 11/2018 Berthelsen et al.
2018/0322112 A1 11/2018 Bellegarda et al.
2018/0322881 A1 11/2018 Min et al.
2018/0324518 A1 11/2018 Dusan et al.
2018/0329508 A1 11/2018 Klein et al.
2018/0329512 A1 11/2018 Liao et al.
2018/0329677 A1 11/2018 Gruber et al.
2018/0329957 A1 11/2018 Frazzingaro et al.
2018/0329982 A1 11/2018 Patel et al.
2018/0329998 A1 11/2018 Thomson et al.
2018/0330714 A1 11/2018 Paulik et al.
2018/0330721 A1 11/2018 Thomson et al.
2018/0330722 A1 11/2018 Newendorp et al.
2018/0330723 A1 11/2018 Acero et al.
2018/0330729 A1 11/2018 Golipour et al.
2018/0330730 A1 11/2018 Garg et al.
2018/0330731 A1 11/2018 Zeitlin et al.
2018/0330733 A1 11/2018 Orr et al.
2018/0330737 A1 11/2018 Paulik et al.
2018/0332118 A1 11/2018 Phipps et al.
2018/0332389 A1 11/2018 Ekkizogloy et al.
2018/0335903 A1 11/2018 Coffman et al.
2018/0336006 A1 11/2018 Chakraborty et al.
2018/0336049 A1 11/2018 Mukherjee et al.
2018/0336184 A1 11/2018 Bellegarda et al.
2018/0336197 A1 11/2018 Skilling et al.
2018/0336275 A1 11/2018 Graham et al.
2018/0336439 A1 11/2018 Kliger et al.
2018/0336449 A1 11/2018 Adan et al.
2018/0336880 A1 11/2018 Arik et al.
2018/0336885 A1 11/2018 Mukherjee et al.
2018/0336892 A1 11/2018 Kim et al.
2018/0336893 A1 11/2018 Robinson et al.
2018/0336894 A1 11/2018 Graham et al.
2018/0336904 A1 11/2018 Piercy et al.
2018/0336905 A1 11/2018 Kim et al.
2018/0336911 A1 11/2018 Dahl et al.
2018/0336920 A1 11/2018 Bastian et al.

(56) References Cited

U.S. PATENT DOCUMENTS

| | | | |
|---|---|---|---|
| 2018/0338191 | A1 | 11/2018 | Van Scheltinga et al. |
| 2018/0341643 | A1 | 11/2018 | Alders et al. |
| 2018/0342243 | A1 | 11/2018 | Vanblon et al. |
| 2018/0343557 | A1 | 11/2018 | Naik et al. |
| 2018/0349084 | A1 | 12/2018 | Nagasaka et al. |
| 2018/0349346 | A1 | 12/2018 | Hatori et al. |
| 2018/0349349 | A1 | 12/2018 | Bellegarda et al. |
| 2018/0349447 | A1 | 12/2018 | Maccartney et al. |
| 2018/0349472 | A1 | 12/2018 | Kohlschuetter et al. |
| 2018/0349728 | A1 | 12/2018 | Wang et al. |
| 2018/0350345 | A1 | 12/2018 | Naik |
| 2018/0350353 | A1 | 12/2018 | Gruber et al. |
| 2018/0357073 | A1 | 12/2018 | Johnson et al. |
| 2018/0357308 | A1 | 12/2018 | Cheyer |
| 2018/0358015 | A1 | 12/2018 | Cash et al. |
| 2018/0358019 | A1 | 12/2018 | Mont-Reynaud |
| 2018/0364810 | A1 | 12/2018 | Parshionikar |
| 2018/0365091 | A1 | 12/2018 | Donaldson et al. |
| 2018/0365653 | A1 | 12/2018 | Cleaver et al. |
| 2018/0366105 | A1 | 12/2018 | Kim |
| 2018/0366110 | A1 | 12/2018 | Hashem et al. |
| 2018/0366116 | A1 | 12/2018 | Nicholson et al. |
| 2018/0366118 | A1 | 12/2018 | Lovitt et al. |
| 2018/0373398 | A1 | 12/2018 | Seixeiro et al. |
| 2018/0373487 | A1 | 12/2018 | Gruber et al. |
| 2018/0373493 | A1 | 12/2018 | Watson et al. |
| 2018/0373796 | A1 | 12/2018 | Rathod |
| 2018/0374480 | A1 | 12/2018 | Wang et al. |
| 2018/0374484 | A1 | 12/2018 | Huang et al. |
| 2019/0005024 | A1 | 1/2019 | Somech et al. |
| 2019/0007228 | A1 | 1/2019 | Vuskovic et al. |
| 2019/0012141 | A1 | 1/2019 | Piersol et al. |
| 2019/0012198 | A1 | 1/2019 | Ni et al. |
| 2019/0012445 | A1 | 1/2019 | Lesso et al. |
| 2019/0012449 | A1 | 1/2019 | Cheyer |
| 2019/0012599 | A1 | 1/2019 | El Kaliouby et al. |
| 2019/0013018 | A1 | 1/2019 | Rekstad |
| 2019/0013025 | A1 | 1/2019 | Alcorn et al. |
| 2019/0014450 | A1 | 1/2019 | Gruber et al. |
| 2019/0019077 | A1 | 1/2019 | Griffin et al. |
| 2019/0019508 | A1 | 1/2019 | Rochford et al. |
| 2019/0020482 | A1 | 1/2019 | Gupta et al. |
| 2019/0025906 | A1 | 1/2019 | Strong et al. |
| 2019/0027135 | A1 | 1/2019 | Kim et al. |
| 2019/0027152 | A1 | 1/2019 | Huang et al. |
| 2019/0034040 | A1 | 1/2019 | Shah et al. |
| 2019/0034826 | A1 | 1/2019 | Ahmad et al. |
| 2019/0034849 | A1 | 1/2019 | Romaine et al. |
| 2019/0035385 | A1 | 1/2019 | Lawson et al. |
| 2019/0035405 | A1 | 1/2019 | Haughay |
| 2019/0037258 | A1 | 1/2019 | Justin et al. |
| 2019/0042059 | A1 | 2/2019 | Baer |
| 2019/0042560 | A1 | 2/2019 | Kakirwar et al. |
| 2019/0042561 | A1 | 2/2019 | Kakirwar et al. |
| 2019/0042627 | A1 | 2/2019 | Osotio et al. |
| 2019/0043507 | A1 | 2/2019 | Huang et al. |
| 2019/0044854 | A1 | 2/2019 | Yang et al. |
| 2019/0045040 | A1 | 2/2019 | Lee et al. |
| 2019/0050450 | A1 | 2/2019 | Uszkoreit |
| 2019/0051306 | A1 | 2/2019 | Torama et al. |
| 2019/0051309 | A1 | 2/2019 | Kim et al. |
| 2019/0056840 | A1 | 2/2019 | Mamaril et al. |
| 2019/0057533 | A1 | 2/2019 | Habra |
| 2019/0057697 | A1 | 2/2019 | Giuli et al. |
| 2019/0065027 | A1 | 2/2019 | Hauenstein et al. |
| 2019/0065144 | A1 | 2/2019 | Sumner et al. |
| 2019/0065993 | A1 | 2/2019 | Srinivasan et al. |
| 2019/0066674 | A1 | 2/2019 | Jaygarl et al. |
| 2019/0068810 | A1 | 2/2019 | Okamoto et al. |
| 2019/0073607 | A1 | 3/2019 | Jia et al. |
| 2019/0073998 | A1 | 3/2019 | Leblang et al. |
| 2019/0074009 | A1 | 3/2019 | Kim et al. |
| 2019/0074015 | A1 | 3/2019 | Orr et al. |
| 2019/0074016 | A1 | 3/2019 | Orr et al. |
| 2019/0079476 | A1 | 3/2019 | Funes |
| 2019/0079662 | A1 | 3/2019 | Wan et al. |
| 2019/0079724 | A1 | 3/2019 | Feuz et al. |
| 2019/0080685 | A1 | 3/2019 | Johnson, Jr. |
| 2019/0080698 | A1 | 3/2019 | Miller |
| 2019/0082044 | A1 | 3/2019 | Olivia et al. |
| 2019/0087205 | A1 | 3/2019 | Guday |
| 2019/0087412 | A1 | 3/2019 | Ibrahim et al. |
| 2019/0087455 | A1 | 3/2019 | He et al. |
| 2019/0088255 | A1 | 3/2019 | Talwar et al. |
| 2019/0090812 | A1 | 3/2019 | Martin et al. |
| 2019/0095050 | A1 | 3/2019 | Gruber et al. |
| 2019/0095069 | A1 | 3/2019 | Proctor et al. |
| 2019/0095171 | A1 | 3/2019 | Carson et al. |
| 2019/0095522 | A1 | 3/2019 | Galitsky |
| 2019/0095535 | A1 | 3/2019 | Miller et al. |
| 2019/0096134 | A1 | 3/2019 | Amacker et al. |
| 2019/0102145 | A1 | 4/2019 | Wilberding et al. |
| 2019/0102378 | A1 | 4/2019 | Piernot et al. |
| 2019/0102381 | A1 | 4/2019 | Futrell et al. |
| 2019/0103103 | A1 | 4/2019 | Ni et al. |
| 2019/0103112 | A1 | 4/2019 | Walker et al. |
| 2019/0108834 | A1 | 4/2019 | Nelson et al. |
| 2019/0114320 | A1 | 4/2019 | Patwardhan et al. |
| 2019/0116264 | A1 | 4/2019 | Sanghavi et al. |
| 2019/0122666 | A1 | 4/2019 | Raitio et al. |
| 2019/0122692 | A1 | 4/2019 | Binder et al. |
| 2019/0124019 | A1 | 4/2019 | Leon et al. |
| 2019/0129499 | A1 | 5/2019 | Li |
| 2019/0129615 | A1 | 5/2019 | Sundar et al. |
| 2019/0129749 | A1 | 5/2019 | White et al. |
| 2019/0130901 | A1 | 5/2019 | Kato et al. |
| 2019/0132654 | A1 | 5/2019 | Hu et al. |
| 2019/0132694 | A1 | 5/2019 | Hanes et al. |
| 2019/0134501 | A1 | 5/2019 | Feder et al. |
| 2019/0138268 | A1 | 5/2019 | Andersen et al. |
| 2019/0138661 | A1 | 5/2019 | Paltanavicius et al. |
| 2019/0138704 | A1 | 5/2019 | Shrivastava et al. |
| 2019/0139058 | A1 | 5/2019 | Clark et al. |
| 2019/0139541 | A1 | 5/2019 | Andersen et al. |
| 2019/0139563 | A1 | 5/2019 | Chen et al. |
| 2019/0141494 | A1 | 5/2019 | Gross et al. |
| 2019/0146219 | A1 | 5/2019 | Rodriguez, II |
| 2019/0147052 | A1 | 5/2019 | Lu et al. |
| 2019/0147369 | A1 | 5/2019 | Gupta et al. |
| 2019/0147869 | A1 | 5/2019 | Wang |
| 2019/0147880 | A1 | 5/2019 | Booker et al. |
| 2019/0147883 | A1 | 5/2019 | Mellenthin et al. |
| 2019/0149972 | A1 | 5/2019 | Parks et al. |
| 2019/0156830 | A1 | 5/2019 | Devaraj et al. |
| 2019/0158645 | A1 | 5/2019 | Yang et al. |
| 2019/0158994 | A1 | 5/2019 | Gross et al. |
| 2019/0163667 | A1 | 5/2019 | Feuz et al. |
| 2019/0164546 | A1 | 5/2019 | Piernot et al. |
| 2019/0172243 | A1 | 6/2019 | Mishra et al. |
| 2019/0172458 | A1 | 6/2019 | Mishra et al. |
| 2019/0172465 | A1 | 6/2019 | Lee et al. |
| 2019/0172467 | A1 | 6/2019 | Kim et al. |
| 2019/0173996 | A1 | 6/2019 | Butcher et al. |
| 2019/0179607 | A1 | 6/2019 | Thangarathnam et al. |
| 2019/0179890 | A1 | 6/2019 | Evermann |
| 2019/0180749 | A1 | 6/2019 | Carey et al. |
| 2019/0180750 | A1 | 6/2019 | Renard et al. |
| 2019/0180770 | A1 | 6/2019 | Kothari et al. |
| 2019/0182176 | A1 | 6/2019 | Niewczas |
| 2019/0182631 | A1 | 6/2019 | Park |
| 2019/0187787 | A1 | 6/2019 | White et al. |
| 2019/0187790 | A1 | 6/2019 | Woo et al. |
| 2019/0188326 | A1 | 6/2019 | Daianu et al. |
| 2019/0188328 | A1 | 6/2019 | Oyenan et al. |
| 2019/0188895 | A1 | 6/2019 | Miller et al. |
| 2019/0189118 | A1 | 6/2019 | Piernot et al. |
| 2019/0189125 | A1 | 6/2019 | Van Os et al. |
| 2019/0190898 | A1 | 6/2019 | Cui |
| 2019/0196666 | A1 | 6/2019 | Kurzweil et al. |
| 2019/0197053 | A1 | 6/2019 | Graham et al. |
| 2019/0197119 | A1 | 6/2019 | Zhang et al. |
| 2019/0199657 | A1 | 6/2019 | Fawcett et al. |
| 2019/0205366 | A1 | 7/2019 | Matsumoto et al. |
| 2019/0206397 | A1 | 7/2019 | Zhou |

(56) References Cited

U.S. PATENT DOCUMENTS

2019/0212815 A1 7/2019 Zhang et al.
2019/0213498 A1 7/2019 Adjaoute
2019/0213601 A1 7/2019 Hackman et al.
2019/0213774 A1 7/2019 Jiao et al.
2019/0213999 A1 7/2019 Grupen et al.
2019/0214024 A1 7/2019 Gruber et al.
2019/0215343 A1 7/2019 Rykowski et al.
2019/0220245 A1 7/2019 Martel et al.
2019/0220246 A1 7/2019 Orr et al.
2019/0220247 A1 7/2019 Lemay et al.
2019/0220704 A1 7/2019 Schulz-Trieglaff et al.
2019/0220727 A1 7/2019 Dohrmann et al.
2019/0221208 A1 7/2019 Chen et al.
2019/0222684 A1 7/2019 Li et al.
2019/0224049 A1 7/2019 Creasy et al.
2019/0228179 A1 7/2019 Rakshit et al.
2019/0228581 A1 7/2019 Dascola et al.
2019/0230215 A1 7/2019 Zhu et al.
2019/0230426 A1 7/2019 Chun
2019/0235887 A1 8/2019 Hemaraj et al.
2019/0236130 A1 8/2019 Li et al.
2019/0236459 A1 8/2019 Cheyer et al.
2019/0237061 A1 8/2019 Rusak et al.
2019/0243902 A1 8/2019 Saeki et al.
2019/0244604 A1 8/2019 Masataki et al.
2019/0244618 A1 8/2019 Newendorp et al.
2019/0244619 A1 8/2019 Kwon et al.
2019/0251167 A1 8/2019 Subbaraya et al.
2019/0251339 A1 8/2019 Hawker
2019/0251960 A1 8/2019 Maker et al.
2019/0251972 A1 8/2019 Li
2019/0258852 A1 8/2019 Shimauchi et al.
2019/0259290 A1 8/2019 Lynch
2019/0259386 A1 8/2019 Kudurshian et al.
2019/0260836 A1 8/2019 Zahl et al.
2019/0265886 A1 8/2019 Moon et al.
2019/0266246 A1 8/2019 Wang et al.
2019/0272318 A1 9/2019 Suzuki et al.
2019/0272818 A1 9/2019 Fernandez et al.
2019/0272825 A1 9/2019 O'Malley et al.
2019/0272831 A1 9/2019 Kajarekar
2019/0273963 A1 9/2019 Jobanputra et al.
2019/0278841 A1 9/2019 Pusateri et al.
2019/0279618 A1 9/2019 Yadav et al.
2019/0279622 A1 9/2019 Liu et al.
2019/0281387 A1 9/2019 Woo et al.
2019/0287012 A1 9/2019 Asli et al.
2019/0287522 A1 9/2019 Lambourne et al.
2019/0290965 A1 9/2019 Oren
2019/0294252 A1 9/2019 Li
2019/0294769 A1 9/2019 Lesso
2019/0294962 A1 9/2019 Vezer et al.
2019/0295529 A1 9/2019 Tomita
2019/0295540 A1 9/2019 Grima
2019/0295542 A1 9/2019 Huang et al.
2019/0295544 A1 9/2019 Garcia et al.
2019/0297471 A1 9/2019 Baer et al.
2019/0303442 A1 10/2019 Peitz et al.
2019/0303504 A1 10/2019 Pasumarthy
2019/0304438 A1 10/2019 Qian et al.
2019/0306093 A1 10/2019 Schilling et al.
2019/0310765 A1 10/2019 Napolitano et al.
2019/0311031 A1 10/2019 Powell et al.
2019/0311708 A1 10/2019 Bengio et al.
2019/0311720 A1 10/2019 Pasko
2019/0318219 A1 10/2019 Arora et al.
2019/0318722 A1 10/2019 Bromand
2019/0318724 A1 10/2019 Chao et al.
2019/0318725 A1 10/2019 Le Roux et al.
2019/0318732 A1 10/2019 Huang et al.
2019/0318735 A1 10/2019 Chao et al.
2019/0318739 A1 10/2019 Garg et al.
2019/0324533 A1 10/2019 Itkowitz et al.
2019/0324780 A1 10/2019 Zhu et al.
2019/0324925 A1 10/2019 Toyoda et al.
2019/0325081 A1 10/2019 Liu et al.
2019/0325600 A1 10/2019 Balan et al.
2019/0325866 A1 10/2019 Bromand et al.
2019/0333523 A1 10/2019 Kim et al.
2019/0335567 A1 10/2019 Boudreau et al.
2019/0339784 A1 11/2019 Lemay et al.
2019/0340252 A1 11/2019 Huyghe et al.
2019/0340419 A1 11/2019 Milman et al.
2019/0341027 A1 11/2019 Vescovi et al.
2019/0341056 A1 11/2019 Paulik et al.
2019/0347063 A1 11/2019 Liu et al.
2019/0347525 A1 11/2019 Liem et al.
2019/0348022 A1 11/2019 Park et al.
2019/0349333 A1 11/2019 Pickover et al.
2019/0349622 A1 11/2019 Kim et al.
2019/0354252 A1 11/2019 Badr
2019/0354256 A1 11/2019 Karunamuni et al.
2019/0354548 A1 11/2019 Orr et al.
2019/0354675 A1 11/2019 Gan et al.
2019/0355346 A1 11/2019 Bellegarda
2019/0355384 A1 11/2019 Sereshki et al.
2019/0361729 A1 11/2019 Gruber et al.
2019/0361978 A1 11/2019 Ray et al.
2019/0362252 A1 11/2019 Miller et al.
2019/0362557 A1 11/2019 Lacey et al.
2019/0369748 A1 12/2019 Hindi et al.
2019/0369842 A1 12/2019 Dolbakian et al.
2019/0369868 A1 12/2019 Jin et al.
2019/0370292 A1 12/2019 Irani et al.
2019/0370323 A1 12/2019 Davidson et al.
2019/0370443 A1 12/2019 Lesso
2019/0371315 A1 12/2019 Newendorp et al.
2019/0371316 A1 12/2019 Weinstein et al.
2019/0371317 A1 12/2019 Irani et al.
2019/0371331 A1 12/2019 Schramm et al.
2019/0372902 A1 12/2019 Piersol
2019/0373102 A1 12/2019 Weinstein et al.
2019/0377425 A1 12/2019 Ryu et al.
2019/0377897 A1 12/2019 Griffin et al.
2019/0377955 A1 12/2019 Swaminathan et al.
2019/0378493 A1 12/2019 Kim et al.
2019/0385043 A1 12/2019 Choudhary et al.
2019/0385418 A1 12/2019 Mixter et al.
2019/0387352 A1 12/2019 Jot et al.
2019/0391726 A1 12/2019 Iskandar et al.
2019/0394547 A1 12/2019 Lemons et al.
2020/0005779 A1 1/2020 Liao et al.
2020/0012718 A1 1/2020 Kung et al.
2020/0019609 A1 1/2020 Yu et al.
2020/0020326 A1 1/2020 Srinivasan et al.
2020/0027455 A1 1/2020 Sugiyama et al.
2020/0034162 A1 1/2020 Takiya et al.
2020/0034421 A1 1/2020 Ferrucci et al.
2020/0035224 A1 1/2020 Ward et al.
2020/0042334 A1 2/2020 Radebaugh et al.
2020/0043467 A1 2/2020 Qian et al.
2020/0043471 A1 2/2020 Ma et al.
2020/0043482 A1 2/2020 Gruber et al.
2020/0043485 A1 2/2020 Tonetti et al.
2020/0043489 A1 2/2020 Bradley et al.
2020/0044485 A1 2/2020 Smith et al.
2020/0045164 A1 2/2020 Kwatra et al.
2020/0051554 A1 2/2020 Kim et al.
2020/0051565 A1 2/2020 Singh
2020/0051583 A1 2/2020 Wu et al.
2020/0053218 A1 2/2020 Gray
2020/0058299 A1 2/2020 Lee et al.
2020/0065601 A1 2/2020 Andreassen
2020/0066236 A1 2/2020 Giusti et al.
2020/0073629 A1 3/2020 Lee et al.
2020/0074993 A1 3/2020 Lee et al.
2020/0075018 A1 3/2020 Chen
2020/0075040 A1 3/2020 Provost et al.
2020/0076538 A1 3/2020 Soultan et al.
2020/0076939 A1 3/2020 Lambourne et al.
2020/0081615 A1 3/2020 Lu et al.
2020/0082807 A1 3/2020 Kim et al.
2020/0084572 A1 3/2020 Jadav et al.
2020/0090393 A1 3/2020 Shin et al.

(56) References Cited

U.S. PATENT DOCUMENTS

| | | | |
|---|---|---|---|
| 2020/0090653 | A1 | 3/2020 | Luo |
| 2020/0090658 | A1 | 3/2020 | Shin et al. |
| 2020/0091958 | A1 | 3/2020 | Curtis et al. |
| 2020/0092625 | A1 | 3/2020 | Raffle |
| 2020/0098346 | A1 | 3/2020 | Kemmerer et al. |
| 2020/0098352 | A1 | 3/2020 | Feinstein et al. |
| 2020/0098362 | A1 | 3/2020 | Piernot et al. |
| 2020/0098368 | A1 | 3/2020 | Lemay et al. |
| 2020/0103963 | A1 | 4/2020 | Kelly et al. |
| 2020/0104194 | A1 | 4/2020 | Chalmers et al. |
| 2020/0104357 | A1 | 4/2020 | Bellegarda et al. |
| 2020/0104362 | A1 | 4/2020 | Yang et al. |
| 2020/0104369 | A1 | 4/2020 | Bellegarda |
| 2020/0104668 | A1 | 4/2020 | Sanghavi et al. |
| 2020/0105260 | A1 | 4/2020 | Piernot et al. |
| 2020/0112454 | A1 | 4/2020 | Brown et al. |
| 2020/0117717 | A1 | 4/2020 | Ramamurti et al. |
| 2020/0118566 | A1 | 4/2020 | Zhou |
| 2020/0118568 | A1 | 4/2020 | Kudurshian et al. |
| 2020/0125820 | A1 | 4/2020 | Kim et al. |
| 2020/0126547 | A1 | 4/2020 | Truong et al. |
| 2020/0127988 | A1 | 4/2020 | Bradley et al. |
| 2020/0134316 | A1 | 4/2020 | Krishnamurthy et al. |
| 2020/0135180 | A1 | 4/2020 | Mukherjee et al. |
| 2020/0135209 | A1 | 4/2020 | Delfarah et al. |
| 2020/0135212 | A1 | 4/2020 | Cho et al. |
| 2020/0135213 | A1 | 4/2020 | Kim et al. |
| 2020/0135226 | A1 | 4/2020 | Mittal et al. |
| 2020/0137230 | A1 | 4/2020 | Spohrer |
| 2020/0142505 | A1 | 5/2020 | Choi et al. |
| 2020/0142554 | A1 | 5/2020 | Lin et al. |
| 2020/0143330 | A1 | 5/2020 | Perumalla et al. |
| 2020/0143812 | A1 | 5/2020 | Walker, II et al. |
| 2020/0143819 | A1 | 5/2020 | Delcroix et al. |
| 2020/0152186 | A1 | 5/2020 | Koh et al. |
| 2020/0152187 | A1 | 5/2020 | Kline et al. |
| 2020/0159579 | A1 | 5/2020 | Shear et al. |
| 2020/0159609 | A1 | 5/2020 | Korotaev et al. |
| 2020/0159651 | A1 | 5/2020 | Myers |
| 2020/0159801 | A1 | 5/2020 | Sekine |
| 2020/0159838 | A1 | 5/2020 | Kikin-Gil et al. |
| 2020/0160179 | A1 | 5/2020 | Chien et al. |
| 2020/0160838 | A1 | 5/2020 | Lee |
| 2020/0168120 | A1 | 5/2020 | Bravo |
| 2020/0168220 | A1 | 5/2020 | Magielse et al. |
| 2020/0169637 | A1 | 5/2020 | Sanghavi et al. |
| 2020/0175566 | A1 | 6/2020 | Bender et al. |
| 2020/0175961 | A1 | 6/2020 | Thomson et al. |
| 2020/0175975 | A1 | 6/2020 | Kong et al. |
| 2020/0176004 | A1 | 6/2020 | Kleijn et al. |
| 2020/0176018 | A1 | 6/2020 | Feinauer et al. |
| 2020/0184057 | A1 | 6/2020 | Mukund |
| 2020/0184964 | A1 | 6/2020 | Myers et al. |
| 2020/0184966 | A1 | 6/2020 | Yavagal |
| 2020/0193997 | A1 | 6/2020 | Piernot et al. |
| 2020/0194000 | A1 | 6/2020 | Xian et al. |
| 2020/0210142 | A1 | 7/2020 | Mu et al. |
| 2020/0211546 | A1 | 7/2020 | Schairer et al. |
| 2020/0211566 | A1 | 7/2020 | Kang et al. |
| 2020/0218074 | A1 | 7/2020 | Hoover et al. |
| 2020/0218780 | A1 | 7/2020 | Jun et al. |
| 2020/0218805 | A1 | 7/2020 | Liu et al. |
| 2020/0219501 | A1 | 7/2020 | Cartwright et al. |
| 2020/0219517 | A1 | 7/2020 | Wang et al. |
| 2020/0220914 | A1 | 7/2020 | Carrigan et al. |
| 2020/0221155 | A1 | 7/2020 | Hansen et al. |
| 2020/0226481 | A1 | 7/2020 | Sim et al. |
| 2020/0226554 | A1 | 7/2020 | Luna |
| 2020/0226823 | A1 | 7/2020 | Stachniak et al. |
| 2020/0227034 | A1 | 7/2020 | Summa et al. |
| 2020/0227044 | A1 | 7/2020 | Lindahl |
| 2020/0228774 | A1 | 7/2020 | Kar et al. |
| 2020/0236214 | A1 | 7/2020 | Mehta et al. |
| 2020/0242648 | A1 | 7/2020 | Glazier et al. |
| 2020/0243069 | A1 | 7/2020 | Amores et al. |
| 2020/0243094 | A1 | 7/2020 | Thomson et al. |
| 2020/0249985 | A1 | 8/2020 | Zeitlin |
| 2020/0251111 | A1 | 8/2020 | Temkin et al. |
| 2020/0252508 | A1 | 8/2020 | Gray |
| 2020/0258508 | A1 | 8/2020 | Aggarwal et al. |
| 2020/0258512 | A1 | 8/2020 | Smith et al. |
| 2020/0258513 | A1 | 8/2020 | Smith et al. |
| 2020/0259951 | A1 | 8/2020 | Arshad |
| 2020/0264741 | A1 | 8/2020 | Kreiner et al. |
| 2020/0267222 | A1 | 8/2020 | Phipps et al. |
| 2020/0267427 | A1 | 8/2020 | Rogers et al. |
| 2020/0267503 | A1 | 8/2020 | Watkins et al. |
| 2020/0272485 | A1 | 8/2020 | Karashchuk et al. |
| 2020/0273448 | A1 | 8/2020 | Min et al. |
| 2020/0275216 | A1 | 8/2020 | McKinney et al. |
| 2020/0279556 | A1 | 9/2020 | Gruber et al. |
| 2020/0279576 | A1 | 9/2020 | Binder et al. |
| 2020/0279627 | A1 | 9/2020 | Nida et al. |
| 2020/0285327 | A1 | 9/2020 | Hindi et al. |
| 2020/0286472 | A1 | 9/2020 | Newendorp et al. |
| 2020/0286493 | A1 | 9/2020 | Orr et al. |
| 2020/0294487 | A1 | 9/2020 | Donohoe et al. |
| 2020/0294494 | A1 | 9/2020 | Suyama et al. |
| 2020/0294508 | A1 | 9/2020 | Kwasiborski et al. |
| 2020/0298394 | A1 | 9/2020 | Han et al. |
| 2020/0301950 | A1 | 9/2020 | Theo et al. |
| 2020/0302112 | A1 | 9/2020 | Helmbro et al. |
| 2020/0302356 | A1 | 9/2020 | Gruber et al. |
| 2020/0302919 | A1 | 9/2020 | Greborio et al. |
| 2020/0302925 | A1 | 9/2020 | Shah et al. |
| 2020/0302930 | A1 | 9/2020 | Chen et al. |
| 2020/0302932 | A1 | 9/2020 | Schramm et al. |
| 2020/0304955 | A1 | 9/2020 | Gross et al. |
| 2020/0304972 | A1 | 9/2020 | Gross et al. |
| 2020/0305084 | A1 | 9/2020 | Freeman et al. |
| 2020/0310513 | A1 | 10/2020 | Nicholson et al. |
| 2020/0312315 | A1 | 10/2020 | Li et al. |
| 2020/0312317 | A1 | 10/2020 | Kothari et al. |
| 2020/0312318 | A1 | 10/2020 | Olson et al. |
| 2020/0314191 | A1 | 10/2020 | Madhavan et al. |
| 2020/0314565 | A1 | 10/2020 | Sigwanz et al. |
| 2020/0319850 | A1 | 10/2020 | Stasior et al. |
| 2020/0320592 | A1 | 10/2020 | Soule et al. |
| 2020/0320988 | A1 | 10/2020 | Rastogi et al. |
| 2020/0322571 | A1 | 10/2020 | Awai |
| 2020/0327895 | A1 | 10/2020 | Gruber et al. |
| 2020/0333875 | A1 | 10/2020 | Bansal et al. |
| 2020/0334068 | A1 | 10/2020 | Krishnamurthy et al. |
| 2020/0334492 | A1 | 10/2020 | Zheng et al. |
| 2020/0334524 | A1 | 10/2020 | Sprague et al. |
| 2020/0335121 | A1 | 10/2020 | Mosseri et al. |
| 2020/0335128 | A1 | 10/2020 | Sheeder et al. |
| 2020/0341546 | A1 | 10/2020 | Yuan et al. |
| 2020/0342082 | A1 | 10/2020 | Sapozhnykov et al. |
| 2020/0342182 | A1 | 10/2020 | Premkumar et al. |
| 2020/0342849 | A1 | 10/2020 | Yu et al. |
| 2020/0342858 | A1 | 10/2020 | Gupta et al. |
| 2020/0342862 | A1 | 10/2020 | Gao et al. |
| 2020/0342863 | A1 | 10/2020 | Aggarwal et al. |
| 2020/0348807 | A1 | 11/2020 | Garcia et al. |
| 2020/0348813 | A1 | 11/2020 | Sharifi et al. |
| 2020/0349415 | A1 | 11/2020 | Raju |
| 2020/0349966 | A1 | 11/2020 | Konzelmann et al. |
| 2020/0356243 | A1 | 11/2020 | Meyer et al. |
| 2020/0356585 | A1 | 11/2020 | Tomkins et al. |
| 2020/0356589 | A1 | 11/2020 | Rekik et al. |
| 2020/0356610 | A1 | 11/2020 | Coimbra et al. |
| 2020/0356634 | A1 | 11/2020 | Srinivasan et al. |
| 2020/0356928 | A1 | 11/2020 | Lee et al. |
| 2020/0357387 | A1 | 11/2020 | Prabhavalkar et al. |
| 2020/0357391 | A1 | 11/2020 | Ghoshal et al. |
| 2020/0357406 | A1 | 11/2020 | York et al. |
| 2020/0357409 | A1 | 11/2020 | Sun et al. |
| 2020/0364411 | A1 | 11/2020 | Evermann |
| 2020/0364858 | A1 | 11/2020 | Kaethner et al. |
| 2020/0365134 | A1 | 11/2020 | Tu et al. |
| 2020/0365155 | A1 | 11/2020 | Milden |
| 2020/0367006 | A1 | 11/2020 | Beckhardt |
| 2020/0371577 | A1 | 11/2020 | Graham et al. |

(56) References Cited

U.S. PATENT DOCUMENTS

| | | | |
|---|---|---|---|
| 2020/0372633 | A1 | 11/2020 | Lee, II et al. |
| 2020/0372719 | A1 | 11/2020 | Andjelic et al. |
| 2020/0372904 | A1 | 11/2020 | Vescovi et al. |
| 2020/0372905 | A1 | 11/2020 | Wang et al. |
| 2020/0374243 | A1 | 11/2020 | Jina et al. |
| 2020/0379610 | A1 | 12/2020 | Ford et al. |
| 2020/0379640 | A1 | 12/2020 | Bellegarda et al. |
| 2020/0379726 | A1 | 12/2020 | Blatz et al. |
| 2020/0379727 | A1 | 12/2020 | Blatz et al. |
| 2020/0379728 | A1 | 12/2020 | Gada et al. |
| 2020/0380053 | A1 | 12/2020 | Boukari |
| 2020/0380389 | A1 | 12/2020 | Eldeeb et al. |
| 2020/0380956 | A1 | 12/2020 | Rossi et al. |
| 2020/0380963 | A1 | 12/2020 | Chappidi et al. |
| 2020/0380966 | A1 | 12/2020 | Acero et al. |
| 2020/0380973 | A1 | 12/2020 | Novitchenko et al. |
| 2020/0380974 | A1 | 12/2020 | Gallagher et al. |
| 2020/0380980 | A1 | 12/2020 | Shum et al. |
| 2020/0380984 | A1 | 12/2020 | Venkatraman et al. |
| 2020/0380985 | A1 | 12/2020 | Gada et al. |
| 2020/0382568 | A1 | 12/2020 | Krochmal et al. |
| 2020/0382616 | A1 | 12/2020 | Vaishampayan et al. |
| 2020/0382635 | A1 | 12/2020 | Vora et al. |
| 2020/0394436 | A1 | 12/2020 | Rakshit et al. |
| 2020/0411002 | A1 | 12/2020 | Lee et al. |
| 2021/0004146 | A1 | 1/2021 | Linville et al. |
| 2021/0006943 | A1 | 1/2021 | Gross et al. |
| 2021/0011557 | A1 | 1/2021 | Lemay et al. |
| 2021/0012113 | A1 | 1/2021 | Petill et al. |
| 2021/0012775 | A1 | 1/2021 | Kang et al. |
| 2021/0012776 | A1 | 1/2021 | Peterson et al. |
| 2021/0026896 | A1 | 1/2021 | Easton et al. |
| 2021/0027785 | A1 | 1/2021 | Kahan et al. |
| 2021/0035429 | A1 | 2/2021 | Daoura et al. |
| 2021/0035556 | A1 | 2/2021 | Shen et al. |
| 2021/0035567 | A1 | 2/2021 | Newendorp et al. |
| 2021/0043190 | A1 | 2/2021 | Wang et al. |
| 2021/0044870 | A1 | 2/2021 | Li et al. |
| 2021/0049237 | A1 | 2/2021 | Demme et al. |
| 2021/0065698 | A1 | 3/2021 | Topcu et al. |
| 2021/0067470 | A1 | 3/2021 | Freed et al. |
| 2021/0067631 | A1 | 3/2021 | Van Os et al. |
| 2021/0072953 | A1 | 3/2021 | Amarilio et al. |
| 2021/0073254 | A1 | 3/2021 | Ghafourifar et al. |
| 2021/0073293 | A1 | 3/2021 | Fenton et al. |
| 2021/0073713 | A1 | 3/2021 | Balasubramanian et al. |
| 2021/0074264 | A1 | 3/2021 | Liang et al. |
| 2021/0074295 | A1 | 3/2021 | Moreno et al. |
| 2021/0081749 | A1 | 3/2021 | Claire |
| 2021/0082400 | A1 | 3/2021 | Vishnoi et al. |
| 2021/0082420 | A1 | 3/2021 | Kraljic et al. |
| 2021/0089124 | A1 | 3/2021 | Manjunath et al. |
| 2021/0089724 | A1 | 3/2021 | Luong et al. |
| 2021/0090314 | A1 | 3/2021 | Hussen et al. |
| 2021/0090575 | A1 | 3/2021 | Mahmood et al. |
| 2021/0092128 | A1 | 3/2021 | Leblang |
| 2021/0097134 | A1 | 4/2021 | Livshits et al. |
| 2021/0097315 | A1 | 4/2021 | Carruthers et al. |
| 2021/0097776 | A1 | 4/2021 | Faulkner et al. |
| 2021/0097998 | A1 | 4/2021 | Kim et al. |
| 2021/0099317 | A1 | 4/2021 | Hilleli et al. |
| 2021/0104232 | A1 | 4/2021 | Lee et al. |
| 2021/0104236 | A1 | 4/2021 | Doggett et al. |
| 2021/0105528 | A1 | 4/2021 | Van Os et al. |
| 2021/0110106 | A1 | 4/2021 | Vescovi et al. |
| 2021/0110115 | A1 | 4/2021 | Moritz et al. |
| 2021/0110254 | A1 | 4/2021 | Duy et al. |
| 2021/0117214 | A1 | 4/2021 | Presant et al. |
| 2021/0117479 | A1 | 4/2021 | Liu et al. |
| 2021/0124417 | A1 | 4/2021 | Ma |
| 2021/0124597 | A1 | 4/2021 | Ramakrishnan et al. |
| 2021/0125602 | A1 | 4/2021 | Hakata et al. |
| 2021/0127031 | A1 | 4/2021 | Kanemoto |
| 2021/0127220 | A1 | 4/2021 | Mathieu et al. |
| 2021/0134318 | A1 | 5/2021 | Harvey et al. |
| 2021/0141437 | A1 | 5/2021 | Graham et al. |
| 2021/0141839 | A1 | 5/2021 | Tang et al. |
| 2021/0142782 | A1 | 5/2021 | Wolf et al. |
| 2021/0143987 | A1 | 5/2021 | Xu et al. |
| 2021/0144251 | A1 | 5/2021 | Chen |
| 2021/0149629 | A1 | 5/2021 | Martel et al. |
| 2021/0149996 | A1 | 5/2021 | Bellegarda |
| 2021/0150151 | A1 | 5/2021 | Jiaming et al. |
| 2021/0151041 | A1 | 5/2021 | Gruber et al. |
| 2021/0151053 | A1 | 5/2021 | Takahashi et al. |
| 2021/0151070 | A1 | 5/2021 | Binder et al. |
| 2021/0152684 | A1 | 5/2021 | Weinstein et al. |
| 2021/0158814 | A1 | 5/2021 | Hussain et al. |
| 2021/0165826 | A1 | 6/2021 | Graham et al. |
| 2021/0173555 | A1 | 6/2021 | Raja et al. |
| 2021/0174020 | A1 | 6/2021 | Sohn et al. |
| 2021/0174022 | A1 | 6/2021 | Ishikawa et al. |
| 2021/0174403 | A1 | 6/2021 | Bellini et al. |
| 2021/0176521 | A1 | 6/2021 | Matthews |
| 2021/0182324 | A1 | 6/2021 | Raju |
| 2021/0182716 | A1 | 6/2021 | Muramoto et al. |
| 2021/0191603 | A1 | 6/2021 | Napolitano et al. |
| 2021/0191968 | A1 | 6/2021 | Orr et al. |
| 2021/0208752 | A1 | 7/2021 | Hwang |
| 2021/0208841 | A1 | 7/2021 | Wilberding |
| 2021/0209304 | A1 | 7/2021 | Yang et al. |
| 2021/0210089 | A1 | 7/2021 | Ma et al. |
| 2021/0210100 | A1 | 7/2021 | Wang et al. |
| 2021/0216134 | A1 | 7/2021 | Fukunaga et al. |
| 2021/0216760 | A1 | 7/2021 | Dominic et al. |
| 2021/0224032 | A1 | 7/2021 | Ryan et al. |
| 2021/0224474 | A1 | 7/2021 | Jerome et al. |
| 2021/0233532 | A1 | 7/2021 | Aram et al. |
| 2021/0241099 | A1 | 8/2021 | Li et al. |
| 2021/0241468 | A1 | 8/2021 | Zhang |
| 2021/0247959 | A1 | 8/2021 | Agarwal et al. |
| 2021/0248804 | A1 | 8/2021 | Abdelaziz et al. |
| 2021/0249009 | A1 | 8/2021 | Manjunath et al. |
| 2021/0249018 | A1 | 8/2021 | Shin et al. |
| 2021/0256031 | A1 | 8/2021 | Krogh et al. |
| 2021/0256980 | A1 | 8/2021 | George-Svahn et al. |
| 2021/0258554 | A1 | 8/2021 | Bruls et al. |
| 2021/0258881 | A1 | 8/2021 | Freeman et al. |
| 2021/0264913 | A1 | 8/2021 | Schramm et al. |
| 2021/0264916 | A1 | 8/2021 | Kim et al. |
| 2021/0266725 | A1 | 8/2021 | Gray |
| 2021/0271333 | A1 | 9/2021 | Hindi et al. |
| 2021/0273894 | A1 | 9/2021 | Tian et al. |
| 2021/0278956 | A1 | 9/2021 | Dolbakian et al. |
| 2021/0279548 | A1 | 9/2021 | Adan et al. |
| 2021/0280180 | A1 | 9/2021 | Skobeltsyn et al. |
| 2021/0281965 | A1 | 9/2021 | Malik et al. |
| 2021/0287080 | A1 | 9/2021 | Moloney |
| 2021/0294569 | A1 | 9/2021 | Piersol et al. |
| 2021/0294571 | A1 | 9/2021 | Carson et al. |
| 2021/0295602 | A1 | 9/2021 | Scapel et al. |
| 2021/0303116 | A1 | 9/2021 | Barlow |
| 2021/0303342 | A1 | 9/2021 | Dunn et al. |
| 2021/0303798 | A1 | 9/2021 | Duong et al. |
| 2021/0304075 | A1 | 9/2021 | Duong et al. |
| 2021/0306812 | A1 | 9/2021 | Gross et al. |
| 2021/0312138 | A1 | 10/2021 | Kaplan |
| 2021/0312917 | A1 | 10/2021 | Weksler et al. |
| 2021/0312930 | A1 | 10/2021 | Sugaya |
| 2021/0312931 | A1 | 10/2021 | Paulik et al. |
| 2021/0313019 | A1 | 10/2021 | Pribanic et al. |
| 2021/0314440 | A1 | 10/2021 | Matias et al. |
| 2021/0318901 | A1 | 10/2021 | Gruber et al. |
| 2021/0319178 | A1 | 10/2021 | Zhang |
| 2021/0327409 | A1 | 10/2021 | Naik |
| 2021/0327410 | A1 | 10/2021 | Beaufays et al. |
| 2021/0334306 | A1 | 10/2021 | Bo et al. |
| 2021/0334528 | A1 | 10/2021 | Bray et al. |
| 2021/0335342 | A1 | 10/2021 | Yuan et al. |
| 2021/0342050 | A1 | 11/2021 | Wang |
| 2021/0342212 | A1 | 11/2021 | Neumann |
| 2021/0349605 | A1 | 11/2021 | Nonaka et al. |
| 2021/0349608 | A1 | 11/2021 | Blatz et al. |
| 2021/0350799 | A1 | 11/2021 | Hansen et al. |

(56) References Cited

U.S. PATENT DOCUMENTS

| | | | |
|---|---|---|---|
| 2021/0350803 | A1 | 11/2021 | Hansen et al. |
| 2021/0350810 | A1 | 11/2021 | Phipps et al. |
| 2021/0352115 | A1 | 11/2021 | Hansen et al. |
| 2021/0357172 | A1 | 11/2021 | Sinesio et al. |
| 2021/0357179 | A1 | 11/2021 | Takeshita |
| 2021/0358294 | A1 | 11/2021 | Parashar et al. |
| 2021/0365161 | A1 | 11/2021 | Ellis et al. |
| 2021/0365174 | A1 | 11/2021 | Ellis et al. |
| 2021/0365641 | A1 | 11/2021 | Zhang et al. |
| 2021/0365863 | A1 | 11/2021 | Friske et al. |
| 2021/0366473 | A1 | 11/2021 | Maeng |
| 2021/0366475 | A1 | 11/2021 | Wilkosz et al. |
| 2021/0366480 | A1 | 11/2021 | Lemay et al. |
| 2021/0373851 | A1 | 12/2021 | Stasior et al. |
| 2021/0375275 | A1 | 12/2021 | Yoon et al. |
| 2021/0375290 | A1 | 12/2021 | Hu et al. |
| 2021/0377381 | A1 | 12/2021 | Aggarwal et al. |
| 2021/0377702 | A1 | 12/2021 | Devaraj et al. |
| 2021/0390259 | A1 | 12/2021 | Hildick-Smith et al. |
| 2021/0390955 | A1 | 12/2021 | Piernot et al. |
| 2021/0393168 | A1 | 12/2021 | Santarelli et al. |
| 2021/0398187 | A1 | 12/2021 | Narayanan et al. |
| 2021/0402306 | A1 | 12/2021 | Huang |
| 2021/0406260 | A1 | 12/2021 | Sharifi et al. |
| 2021/0407318 | A1 | 12/2021 | Pitschel et al. |
| 2021/0407502 | A1 | 12/2021 | Vescovi et al. |
| 2021/0407507 | A1 | 12/2021 | Zhou et al. |
| 2022/0004825 | A1 | 1/2022 | Xie et al. |
| 2022/0013106 | A1 | 1/2022 | Deng et al. |
| 2022/0019292 | A1 | 1/2022 | Lemay et al. |
| 2022/0020367 | A1 | 1/2022 | Orkin et al. |
| 2022/0021631 | A1 | 1/2022 | Jina et al. |
| 2022/0021978 | A1 | 1/2022 | Gui et al. |
| 2022/0028379 | A1 | 1/2022 | Carbune et al. |
| 2022/0028387 | A1 | 1/2022 | Walker et al. |
| 2022/0030345 | A1 | 1/2022 | Gong et al. |
| 2022/0035999 | A1 | 2/2022 | Pawelec |
| 2022/0036270 | A1 | 2/2022 | Benyo et al. |
| 2022/0040304 | A1 | 2/2022 | Kim et al. |
| 2022/0043986 | A1 | 2/2022 | Nell et al. |
| 2022/0046310 | A1 | 2/2022 | Shin et al. |
| 2022/0050661 | A1 | 2/2022 | Lange et al. |
| 2022/0050876 | A1 | 2/2022 | Kang et al. |
| 2022/0052867 | A1 | 2/2022 | Nakano et al. |
| 2022/0067283 | A1 | 3/2022 | Bellegarda et al. |
| 2022/0068274 | A1 | 3/2022 | D'Alessandro |
| 2022/0068278 | A1 | 3/2022 | York et al. |
| 2022/0083188 | A1 | 3/2022 | Lin |
| 2022/0083986 | A1 | 3/2022 | Duffy et al. |
| 2022/0084511 | A1 | 3/2022 | Nickson et al. |
| 2022/0092262 | A1 | 3/2022 | Ni et al. |
| 2022/0093088 | A1 | 3/2022 | Sridhar et al. |
| 2022/0093093 | A1 | 3/2022 | Krishnan et al. |
| 2022/0093095 | A1 | 3/2022 | Dighe et al. |
| 2022/0093098 | A1 | 3/2022 | Samal et al. |
| 2022/0093101 | A1 | 3/2022 | Krishnan et al. |
| 2022/0093109 | A1 | 3/2022 | Orr et al. |
| 2022/0093110 | A1 | 3/2022 | Kim et al. |
| 2022/0093191 | A1 | 3/2022 | Yang |
| 2022/0094765 | A1 | 3/2022 | Niewczas |
| 2022/0100772 | A1 | 3/2022 | Raghura et al. |
| 2022/0100789 | A1 | 3/2022 | Kumar et al. |
| 2022/0103491 | A1 | 3/2022 | Yang et al. |
| 2022/0107780 | A1 | 4/2022 | Gruber et al. |
| 2022/0108081 | A1 | 4/2022 | Dymetman et al. |
| 2022/0114327 | A1 | 4/2022 | Faaborg et al. |
| 2022/0115016 | A1 | 4/2022 | Whalin |
| 2022/0115020 | A1 | 4/2022 | Bradley et al. |
| 2022/0122615 | A1 | 4/2022 | Chen et al. |
| 2022/0130126 | A1 | 4/2022 | Delgado et al. |
| 2022/0139396 | A1 | 5/2022 | Gada et al. |
| 2022/0147135 | A1 | 5/2022 | Graham et al. |
| 2022/0148587 | A1 | 5/2022 | Drummie et al. |
| 2022/0155857 | A1 | 5/2022 | Lee et al. |
| 2022/0156041 | A1 | 5/2022 | Newendorp et al. |
| 2022/0157310 | A1 | 5/2022 | Newendorp et al. |
| 2022/0157315 | A1 | 5/2022 | Raux et al. |
| 2022/0157317 | A1 | 5/2022 | Burakov et al. |
| 2022/0180857 | A1 | 6/2022 | Aharoni et al. |
| 2022/0180866 | A1 | 6/2022 | Sharifi et al. |
| 2022/0180868 | A1 | 6/2022 | Sharifi et al. |
| 2022/0191577 | A1 | 6/2022 | Singhal et al. |
| 2022/0197491 | A1 | 6/2022 | Meyer et al. |
| 2022/0198025 | A1 | 6/2022 | Gupta et al. |
| 2022/0206298 | A1 | 6/2022 | Goodman |
| 2022/0214743 | A1 | 7/2022 | Dascola et al. |
| 2022/0214775 | A1 | 7/2022 | Shah et al. |
| 2022/0215159 | A1 | 7/2022 | Qian et al. |
| 2022/0222437 | A1 | 7/2022 | Lauber |
| 2022/0223154 | A1 | 7/2022 | Zhou et al. |
| 2022/0229985 | A1 | 7/2022 | Bellegarda et al. |
| 2022/0230000 | A1 | 7/2022 | Jalaluddin et al. |
| 2022/0230653 | A1 | 7/2022 | Binder et al. |
| 2022/0253969 | A1 | 8/2022 | Kamenetskaya et al. |
| 2022/0254338 | A1 | 8/2022 | Gruber et al. |
| 2022/0254339 | A1 | 8/2022 | Acero et al. |
| 2022/0254341 | A1 | 8/2022 | Naganna et al. |
| 2022/0254347 | A1 | 8/2022 | Lindahl |
| 2022/0255885 | A1 | 8/2022 | Aharoni et al. |
| 2022/0261468 | A1 | 8/2022 | Lin et al. |
| 2022/0261769 | A1 | 8/2022 | Vellanti |
| 2022/0262354 | A1 | 8/2022 | Greborio et al. |
| 2022/0264262 | A1 | 8/2022 | Gruber et al. |
| 2022/0277505 | A1 | 9/2022 | Baszucki et al. |
| 2022/0284901 | A1 | 9/2022 | Novitchenko et al. |
| 2022/0291792 | A1 | 9/2022 | Alston |
| 2022/0291816 | A1 | 9/2022 | Fan et al. |
| 2022/0292128 | A1 | 9/2022 | Sharifi et al. |
| 2022/0293124 | A1 | 9/2022 | Weinberg et al. |
| 2022/0293125 | A1 | 9/2022 | Maddika et al. |
| 2022/0295170 | A1 | 9/2022 | Ito et al. |
| 2022/0300094 | A1 | 9/2022 | Hindi et al. |
| 2022/0301232 | A1 | 9/2022 | Park et al. |
| 2022/0301549 | A1 | 9/2022 | Lee et al. |
| 2022/0301566 | A1 | 9/2022 | Van Os et al. |
| 2022/0308718 | A1 | 9/2022 | Klein et al. |
| 2022/0310056 | A1 | 9/2022 | Ramabhadran et al. |
| 2022/0318248 | A1 | 10/2022 | Liang et al. |
| 2022/0329691 | A1 | 10/2022 | Chinthakunta et al. |
| 2022/0343066 | A1 | 10/2022 | Kwong et al. |
| 2022/0366889 | A1 | 11/2022 | Yerroju et al. |
| 2022/0374109 | A1 | 11/2022 | Kramer et al. |
| 2022/0374110 | A1 | 11/2022 | Ramaswamy et al. |
| 2022/0374209 | A1 | 11/2022 | Shek et al. |
| 2022/0374597 | A1 | 11/2022 | Bellegarda et al. |
| 2022/0374727 | A1 | 11/2022 | Hansen et al. |
| 2022/0375315 | A1 | 11/2022 | Faaborg et al. |
| 2022/0375466 | A1 | 11/2022 | Hergenrader et al. |
| 2022/0375553 | A1 | 11/2022 | Lasko et al. |
| 2022/0382843 | A1 | 12/2022 | Gong et al. |
| 2022/0382994 | A1 | 12/2022 | Cox et al. |
| 2022/0383044 | A1 | 12/2022 | Bellegarda |
| 2022/0383864 | A1 | 12/2022 | Gruber et al. |
| 2022/0383872 | A1 | 12/2022 | Li et al. |
| 2022/0391585 | A1 | 12/2022 | Bellegarda et al. |
| 2022/0391603 | A1 | 12/2022 | Pham et al. |
| 2022/0392446 | A1 | 12/2022 | Webber et al. |
| 2022/0405117 | A1 | 12/2022 | Gruber et al. |
| 2022/0406301 | A1 | 12/2022 | Barros et al. |
| 2022/0406309 | A1 | 12/2022 | Piernot et al. |
| 2022/0408173 | A1 | 12/2022 | Gong et al. |
| 2023/0013615 | A1 | 1/2023 | Sanghavi et al. |
| 2023/0017115 | A1 | 1/2023 | Sanghavi et al. |
| 2023/0018457 | A1 | 1/2023 | Zeitlin |
| 2023/0026764 | A1 | 1/2023 | Karashchuk et al. |
| 2023/0029028 | A1 | 1/2023 | Aitken et al. |
| 2023/0035643 | A1 | 2/2023 | Binder et al. |
| 2023/0035941 | A1 | 2/2023 | Herman et al. |
| 2023/0036059 | A1 | 2/2023 | Blatz et al. |
| 2023/0036798 | A1 | 2/2023 | Newendorp et al. |
| 2023/0040703 | A1 | 2/2023 | Lemay et al. |
| 2023/0042224 | A1 | 2/2023 | Patel et al. |
| 2023/0048256 | A1 | 2/2023 | Gui et al. |
| 2023/0051062 | A1 | 2/2023 | Hu et al. |

(56) References Cited

U.S. PATENT DOCUMENTS

| | | | |
|---|---|---|---|
| 2023/0057442 | A1 | 2/2023 | Stasior et al. |
| 2023/0058929 | A1 | 2/2023 | Lasko et al. |
| 2023/0066552 | A1 | 3/2023 | Van Os et al. |
| 2023/0070209 | A1 | 3/2023 | Srinivasan et al. |
| 2023/0072481 | A1 | 3/2023 | Acero et al. |
| 2023/0076716 | A1 | 3/2023 | Dogrusoz et al. |
| 2023/0081605 | A1 | 3/2023 | O'Mara et al. |
| 2023/0087244 | A1 | 3/2023 | Akmal et al. |
| 2023/0094522 | A1 | 3/2023 | Stauber et al. |
| 2023/0098174 | A1 | 3/2023 | Simes et al. |
| 2023/0104583 | A1 | 4/2023 | Bekker et al. |
| 2023/0111509 | A1 | 4/2023 | Kim et al. |
| 2023/0112859 | A1 | 4/2023 | Vilhauer et al. |
| 2023/0134970 | A1 | 5/2023 | Rasipuram et al. |
| 2023/0150513 | A1 | 5/2023 | Rangarajan et al. |
| 2023/0179704 | A1 | 6/2023 | Chinthakunta et al. |
| 2023/0185397 | A1 | 6/2023 | Anzures et al. |
| 2023/0186921 | A1 | 6/2023 | Paulik et al. |
| 2023/0197063 | A1 | 6/2023 | Greborio et al. |
| 2023/0199147 | A1 | 6/2023 | Desserrey et al. |
| 2023/0215435 | A1 | 7/2023 | Manjunath et al. |
| 2023/0216963 | A1 | 7/2023 | Van Os et al. |
| 2023/0236676 | A1 | 7/2023 | Hindi et al. |
| 2023/0236717 | A1 | 7/2023 | Meyer et al. |
| 2023/0245657 | A1 | 8/2023 | Liang et al. |
| 2023/0251881 | A1 | 8/2023 | Radebaugh et al. |
| 2023/0253005 | A1 | 8/2023 | Binder et al. |
| 2023/0254448 | A1 | 8/2023 | Binder et al. |
| 2023/0259550 | A1 | 8/2023 | Graham et al. |
| 2023/0262605 | A1 | 8/2023 | Freeman et al. |
| 2023/0267422 | A1 | 8/2023 | Herman et al. |
| 2023/0290352 | A1 | 9/2023 | York et al. |
| 2023/0292027 | A1 | 9/2023 | Gong et al. |
| 2023/0298595 | A1 | 9/2023 | Orr et al. |
| 2023/0306968 | A1 | 9/2023 | Liang et al. |
| 2023/0325157 | A1 | 10/2023 | Hurley et al. |
| 2023/0335132 | A1 | 10/2023 | Garcia et al. |
| 2023/0344537 | A1 | 10/2023 | Ingebretsen et al. |
| 2023/0351149 | A1 | 11/2023 | Yu et al. |
| 2023/0352007 | A1 | 11/2023 | Castellani et al. |
| 2023/0352014 | A1 | 11/2023 | Tennant et al. |
| 2023/0352016 | A1 | 11/2023 | Kudurshian et al. |
| 2023/0352022 | A1 | 11/2023 | Milden |
| 2023/0359334 | A1 | 11/2023 | Chapman et al. |
| 2023/0359475 | A1 | 11/2023 | Karashchuk et al. |
| 2023/0367458 | A1 | 11/2023 | Burgess et al. |
| 2023/0367777 | A1 | 11/2023 | Burgess et al. |
| 2023/0367795 | A1 | 11/2023 | Burgess et al. |
| 2023/0368783 | A1 | 11/2023 | Marchi et al. |
| 2023/0368787 | A1 | 11/2023 | Sumner et al. |
| 2023/0368788 | A1 | 11/2023 | Ma et al. |
| 2023/0368791 | A1 | 11/2023 | Walker et al. |
| 2023/0368812 | A1 | 11/2023 | Marchi et al. |
| 2023/0373305 | A1 | 11/2023 | Beck et al. |
| 2023/0376690 | A1 | 11/2023 | Bellegarda et al. |
| 2023/0386460 | A1 | 11/2023 | Fish et al. |
| 2023/0386462 | A1 | 11/2023 | Piernot et al. |
| 2023/0386464 | A1 | 11/2023 | Manjunath et al. |
| 2023/0386469 | A1 | 11/2023 | Horton et al. |
| 2023/0386478 | A1 | 11/2023 | Liu et al. |
| 2023/0388409 | A1 | 11/2023 | Weinstein et al. |
| 2023/0393712 | A1 | 12/2023 | Fujita et al. |
| 2023/0393811 | A1 | 12/2023 | Piersol et al. |
| 2023/0393872 | A1 | 12/2023 | Ellis et al. |
| 2023/0394248 | A1 | 12/2023 | Bellegarda |
| 2023/0395067 | A1 | 12/2023 | Perkins et al. |
| 2023/0401795 | A1 | 12/2023 | Streja et al. |
| 2023/0401798 | A1 | 12/2023 | Bigham et al. |
| 2023/0409174 | A1 | 12/2023 | Liang et al. |
| 2023/0409179 | A1 | 12/2023 | Liang et al. |
| 2023/0409283 | A1 | 12/2023 | Gruber et al. |
| 2023/0410540 | A1 | 12/2023 | Dehghan et al. |
| 2023/0410798 | A1 | 12/2023 | Greborio et al. |
| 2023/0410805 | A1 | 12/2023 | Drummie et al. |
| 2023/0419967 | A1 | 12/2023 | Hornberger et al. |
| 2024/0029734 | A1 | 1/2024 | Lemay et al. |
| 2024/0054996 | A1 | 2/2024 | Vescovi et al. |
| 2024/0055017 | A1 | 2/2024 | Maddika et al. |
| 2024/0064370 | A1 | 2/2024 | Van Os et al. |
| 2024/0075944 | A1 | 3/2024 | Sahoo |
| 2024/0087566 | A1 | 3/2024 | Piernot et al. |
| 2024/0096321 | A1 | 3/2024 | Naik et al. |
| 2024/0104353 | A1 | 3/2024 | Leblond et al. |
| 2024/0111402 | A1 | 4/2024 | Blatz et al. |
| 2024/0118744 | A1 | 4/2024 | Vaughan et al. |
| 2024/0134506 | A1 | 4/2024 | Napolitano et al. |
| 2024/0146776 | A1 | 5/2024 | Hansen et al. |
| 2024/0176441 | A1 | 5/2024 | Yang et al. |
| 2024/0177424 | A1 | 5/2024 | Herman et al. |
| 2024/0185856 | A1 | 6/2024 | Paek et al. |
| 2024/0201946 | A1 | 6/2024 | Stasior et al. |
| 2024/0211108 | A1 | 6/2024 | Ellis et al. |
| 2024/0220292 | A1 | 7/2024 | Ellis et al. |
| 2024/0221746 | A1 | 7/2024 | Webber et al. |
| 2024/0233752 | A1 | 7/2024 | Weinberg et al. |
| 2024/0244531 | A1 | 7/2024 | Freeman et al. |
| 2024/0248678 | A1 | 7/2024 | Krivoruchko et al. |
| 2024/0265914 | A1 | 8/2024 | Perkins et al. |
| 2024/0265936 | A1 | 8/2024 | Binder et al. |
| 2024/0267453 | A1 | 8/2024 | Aggarwal et al. |
| 2024/0281206 | A1 | 8/2024 | Gruber et al. |
| 2024/0282301 | A1 | 8/2024 | Lindahl |
| 2024/0303268 | A1 | 9/2024 | Graham et al. |
| 2024/0338173 | A1 | 10/2024 | Daryanani et al. |
| 2024/0345799 | A1 | 10/2024 | Gruber et al. |
| 2024/0346282 | A1 | 10/2024 | Sanghavi et al. |
| 2024/0347041 | A1 | 10/2024 | Castellani et al. |
| 2024/0347059 | A1 | 10/2024 | Manjunath et al. |
| 2024/0363109 | A1 | 10/2024 | Hshieh et al. |
| 2024/0370100 | A1 | 11/2024 | Hindi et al. |
| 2024/0371373 | A1 | 11/2024 | Munro et al. |
| 2024/0371381 | A1 | 11/2024 | Orr et al. |
| 2024/0373198 | A1 | 11/2024 | Lalji et al. |
| 2024/0378211 | A1 | 11/2024 | Chan et al. |
| 2024/0379101 | A1 | 11/2024 | Bhuwalka et al. |
| 2024/0379102 | A1 | 11/2024 | Duffy et al. |
| 2024/0379105 | A1 | 11/2024 | Ellis et al. |
| 2024/0379110 | A1 | 11/2024 | Sinesio et al. |
| 2024/0386877 | A1 | 11/2024 | Schlakman et al. |

FOREIGN PATENT DOCUMENTS

| | | | |
|---|---|---|---|
| AU | 2015101171 | A4 | 10/2015 |
| AU | 2015271922 | A1 | 1/2016 |
| AU | 2015312369 | A1 | 3/2017 |
| AU | 2017203668 | A1 | 1/2018 |
| AU | 2018100187 | A4 | 3/2018 |
| AU | 2017222436 | A1 | 10/2018 |
| CH | 709795 | A1 | 12/2015 |
| CN | 101281745 | A | 10/2008 |
| CN | 102629246 | A | 8/2012 |
| CN | 103533143 | A | 1/2014 |
| CN | 103533154 | A | 1/2014 |
| CN | 103543902 | A | 1/2014 |
| CN | 103546453 | A | 1/2014 |
| CN | 103562863 | A | 2/2014 |
| CN | 103582896 | A | 2/2014 |
| CN | 103593054 | A | 2/2014 |
| CN | 103595869 | A | 2/2014 |
| CN | 103608859 | A | 2/2014 |
| CN | 103620605 | A | 3/2014 |
| CN | 103645876 | A | 3/2014 |
| CN | 103677261 | A | 3/2014 |
| CN | 103686723 | A | 3/2014 |
| CN | 103714816 | A | 4/2014 |
| CN | 103716454 | A | 4/2014 |
| CN | 103718568 | A | 4/2014 |
| CN | 103727948 | A | 4/2014 |
| CN | 103730120 | A | 4/2014 |
| CN | 103744761 | A | 4/2014 |
| CN | 103748531 | A | 4/2014 |
| CN | 103748609 | A | 4/2014 |
| CN | 103760984 | A | 4/2014 |
| CN | 103761104 | A | 4/2014 |

(56) References Cited

FOREIGN PATENT DOCUMENTS

| | | | |
|---|---|---|---|
| CN | 103765385 | A | 4/2014 |
| CN | 103778527 | A | 5/2014 |
| CN | 103780758 | A | 5/2014 |
| CN | 103782253 | A | 5/2014 |
| CN | 103792985 | A | 5/2014 |
| CN | 103794212 | A | 5/2014 |
| CN | 103795850 | A | 5/2014 |
| CN | 103795866 | A | 5/2014 |
| CN | 103809548 | A | 5/2014 |
| CN | 103841268 | A | 6/2014 |
| CN | 103858083 | A | 6/2014 |
| CN | 103870168 | A | 6/2014 |
| CN | 103885663 | A | 6/2014 |
| CN | 103902373 | A | 7/2014 |
| CN | 103930945 | A | 7/2014 |
| CN | 103942932 | A | 7/2014 |
| CN | 103943107 | A | 7/2014 |
| CN | 103956169 | A | 7/2014 |
| CN | 103959751 | A | 7/2014 |
| CN | 203721183 | U | 7/2014 |
| CN | 103971680 | A | 8/2014 |
| CN | 104007832 | A | 8/2014 |
| CN | 104011731 | A | 8/2014 |
| CN | 102693729 | B | 9/2014 |
| CN | 104036774 | A | 9/2014 |
| CN | 104038621 | A | 9/2014 |
| CN | 104050153 | A | 9/2014 |
| CN | 104090652 | A | 10/2014 |
| CN | 104092829 | A | 10/2014 |
| CN | 104094580 | A | 10/2014 |
| CN | 104113471 | A | 10/2014 |
| CN | 104125322 | A | 10/2014 |
| CN | 104144377 | A | 11/2014 |
| CN | 104145304 | A | 11/2014 |
| CN | 104169837 | A | 11/2014 |
| CN | 104180815 | A | 12/2014 |
| CN | 104185868 | A | 12/2014 |
| CN | 104205785 | A | 12/2014 |
| CN | 104219785 | A | 12/2014 |
| CN | 104240701 | A | 12/2014 |
| CN | 104243699 | A | 12/2014 |
| CN | 104281259 | A | 1/2015 |
| CN | 104281390 | A | 1/2015 |
| CN | 104284257 | A | 1/2015 |
| CN | 104284486 | A | 1/2015 |
| CN | 104335205 | A | 2/2015 |
| CN | 104335207 | A | 2/2015 |
| CN | 104335234 | A | 2/2015 |
| CN | 104350454 | A | 2/2015 |
| CN | 104360990 | A | 2/2015 |
| CN | 104374399 | A | 2/2015 |
| CN | 104376250 | A | 2/2015 |
| CN | 104378723 | A | 2/2015 |
| CN | 104423594 | A | 3/2015 |
| CN | 104423625 | A | 3/2015 |
| CN | 104423780 | A | 3/2015 |
| CN | 104427104 | A | 3/2015 |
| CN | 104463552 | A | 3/2015 |
| CN | 104464733 | A | 3/2015 |
| CN | 104487929 | A | 4/2015 |
| CN | 104509080 | A | 4/2015 |
| CN | 104516522 | A | 4/2015 |
| CN | 104520849 | A | 4/2015 |
| CN | 104573472 | A | 4/2015 |
| CN | 104575493 | A | 4/2015 |
| CN | 104575501 | A | 4/2015 |
| CN | 104575504 | A | 4/2015 |
| CN | 104584010 | A | 4/2015 |
| CN | 104584096 | A | 4/2015 |
| CN | 104584601 | A | 4/2015 |
| CN | 104604274 | A | 5/2015 |
| CN | 104662600 | A | 5/2015 |
| CN | 104679472 | A | 6/2015 |
| CN | 104685898 | A | 6/2015 |
| CN | 104699746 | A | 6/2015 |
| CN | 104731441 | A | 6/2015 |
| CN | 104769584 | A | 7/2015 |
| CN | 104769670 | A | 7/2015 |
| CN | 104798012 | A | 7/2015 |
| CN | 104820488 | A | 8/2015 |
| CN | 104821167 | A | 8/2015 |
| CN | 104821934 | A | 8/2015 |
| CN | 104836909 | A | 8/2015 |
| CN | 104854583 | A | 8/2015 |
| CN | 104867492 | A | 8/2015 |
| CN | 104869342 | A | 8/2015 |
| CN | 104916287 | A | 9/2015 |
| CN | 104932826 | A | 9/2015 |
| CN | 104951077 | A | 9/2015 |
| CN | 104951458 | A | 9/2015 |
| CN | 104967748 | A | 10/2015 |
| CN | 104969289 | A | 10/2015 |
| CN | 104978963 | A | 10/2015 |
| CN | 105025051 | A | 11/2015 |
| CN | 105027197 | A | 11/2015 |
| CN | 105093526 | A | 11/2015 |
| CN | 105100356 | A | 11/2015 |
| CN | 105144037 | A | 12/2015 |
| CN | 105144136 | A | 12/2015 |
| CN | 105164678 | A | 12/2015 |
| CN | 105164719 | A | 12/2015 |
| CN | 105190607 | A | 12/2015 |
| CN | 105247511 | A | 1/2016 |
| CN | 105247551 | A | 1/2016 |
| CN | 105264524 | A | 1/2016 |
| CN | 105264903 | A | 1/2016 |
| CN | 105265005 | A | 1/2016 |
| CN | 105278681 | A | 1/2016 |
| CN | 103583031 | B | 2/2016 |
| CN | 105320251 | A | 2/2016 |
| CN | 105320726 | A | 2/2016 |
| CN | 105338425 | A | 2/2016 |
| CN | 105379234 | A | 3/2016 |
| CN | 105427122 | A | 3/2016 |
| CN | 105430186 | A | 3/2016 |
| CN | 105468137 | A | 4/2016 |
| CN | 105471705 | A | 4/2016 |
| CN | 105472587 | A | 4/2016 |
| CN | 105516441 | A | 4/2016 |
| CN | 105554217 | A | 5/2016 |
| CN | 105556592 | A | 5/2016 |
| CN | 105677765 | A | 6/2016 |
| CN | 105791920 | A | 7/2016 |
| CN | 105808200 | A | 7/2016 |
| CN | 105830048 | A | 8/2016 |
| CN | 105869641 | A | 8/2016 |
| CN | 105872222 | A | 8/2016 |
| CN | 105917311 | A | 8/2016 |
| CN | 105955579 | A | 9/2016 |
| CN | 106030699 | A | 10/2016 |
| CN | 106062734 | A | 10/2016 |
| CN | 106062790 | A | 10/2016 |
| CN | 106164909 | A | 11/2016 |
| CN | 106205615 | A | 12/2016 |
| CN | 106251889 | A | 12/2016 |
| CN | 106294558 | A | 1/2017 |
| CN | 106297782 | A | 1/2017 |
| CN | 106415412 | A | 2/2017 |
| CN | 106462383 | A | 2/2017 |
| CN | 106462617 | A | 2/2017 |
| CN | 106463114 | A | 2/2017 |
| CN | 106465074 | A | 2/2017 |
| CN | 106471570 | A | 3/2017 |
| CN | 106534469 | A | 3/2017 |
| CN | 106558310 | A | 4/2017 |
| CN | 106575195 | A | 4/2017 |
| CN | 106575501 | A | 4/2017 |
| CN | 106663224 | A | 5/2017 |
| CN | 106773742 | A | 5/2017 |
| CN | 106776581 | A | 5/2017 |
| CN | 107003738 | A | 8/2017 |
| CN | 107004412 | A | 8/2017 |
| CN | 107209883 | A | 9/2017 |
| CN | 107450800 | A | 12/2017 |

(56) References Cited

FOREIGN PATENT DOCUMENTS

| | | | |
|---|---|---|---|
| CN | 107480161 | A | 12/2017 |
| CN | 107490971 | A | 12/2017 |
| CN | 107491285 | A | 12/2017 |
| CN | 107491295 | A | 12/2017 |
| CN | 107491468 | A | 12/2017 |
| CN | 107491469 | A | 12/2017 |
| CN | 107506037 | A | 12/2017 |
| CN | 107545262 | A | 1/2018 |
| CN | 107589841 | A | 1/2018 |
| CN | 107608998 | A | 1/2018 |
| CN | 107615378 | A | 1/2018 |
| CN | 107623616 | A | 1/2018 |
| CN | 107644053 | A | 1/2018 |
| CN | 107683470 | A | 2/2018 |
| CN | 107690620 | A | 2/2018 |
| CN | 107786730 | A | 3/2018 |
| CN | 107852436 | A | 3/2018 |
| CN | 107871500 | A | 4/2018 |
| CN | 107889533 | A | 4/2018 |
| CN | 107919123 | A | 4/2018 |
| CN | 107924313 | A | 4/2018 |
| CN | 107978313 | A | 5/2018 |
| CN | 108027738 | A | 5/2018 |
| CN | 108268187 | A | 7/2018 |
| CN | 108604449 | A | 9/2018 |
| CN | 108647681 | A | 10/2018 |
| CN | 109155132 | A | 1/2019 |
| CN | 109447234 | A | 3/2019 |
| CN | 109584879 | A | 4/2019 |
| CN | 109657629 | A | 4/2019 |
| CN | 109691074 | A | 4/2019 |
| CN | 110135411 | A | 8/2019 |
| CN | 110263144 | A | 9/2019 |
| CN | 105164719 | B | 11/2019 |
| CN | 110446000 | A | 11/2019 |
| CN | 110531860 | A | 12/2019 |
| CN | 110554761 | A | 12/2019 |
| CN | 110598671 | A | 12/2019 |
| CN | 110647274 | A | 1/2020 |
| CN | 110825469 | A | 2/2020 |
| CN | 110910872 | A | 3/2020 |
| CN | 110945840 | A | 3/2020 |
| CN | 111124224 | A | 5/2020 |
| CN | 107123417 | B | 6/2020 |
| CN | 111316203 | A | 6/2020 |
| CN | 111722716 | A | 9/2020 |
| CN | 111934959 | A | 11/2020 |
| CN | 112204507 | A | 1/2021 |
| CN | 105900376 | B | 2/2021 |
| DE | 202016008226 | U1 | 5/2017 |
| DK | 179570 | B1 | 2/2019 |
| DK | 180129 | B1 | 6/2020 |
| EP | 2680257 | A1 | 1/2014 |
| EP | 2683147 | A1 | 1/2014 |
| EP | 2683175 | A1 | 1/2014 |
| EP | 2672231 | A3 | 4/2014 |
| EP | 2717259 | A2 | 4/2014 |
| EP | 2725577 | A2 | 4/2014 |
| EP | 2733598 | A2 | 5/2014 |
| EP | 2733896 | A1 | 5/2014 |
| EP | 2741175 | A2 | 6/2014 |
| EP | 2741190 | A2 | 6/2014 |
| EP | 2743846 | A2 | 6/2014 |
| EP | 2752847 | A1 | 7/2014 |
| EP | 2760015 | A1 | 7/2014 |
| EP | 2779160 | A1 | 9/2014 |
| EP | 2781883 | A2 | 9/2014 |
| EP | 2787683 | A1 | 10/2014 |
| EP | 2801890 | A1 | 11/2014 |
| EP | 2801972 | A1 | 11/2014 |
| EP | 2801974 | A2 | 11/2014 |
| EP | 2824564 | A1 | 1/2015 |
| EP | 2849177 | A1 | 3/2015 |
| EP | 2879402 | A1 | 6/2015 |
| EP | 2881898 | A1 | 6/2015 |
| EP | 2881939 | A1 | 6/2015 |
| EP | 2891049 | A1 | 7/2015 |
| EP | 2915021 | A2 | 9/2015 |
| EP | 2930715 | A1 | 10/2015 |
| EP | 2938022 | A1 | 10/2015 |
| EP | 2940556 | A1 | 11/2015 |
| EP | 2947859 | A1 | 11/2015 |
| EP | 2950307 | A1 | 12/2015 |
| EP | 2957986 | A1 | 12/2015 |
| EP | 2973380 | A2 | 1/2016 |
| EP | 2985984 | A2 | 2/2016 |
| EP | 2988513 | A1 | 2/2016 |
| EP | 2891049 | A4 | 3/2016 |
| EP | 2996359 | A1 | 3/2016 |
| EP | 3032532 | A1 | 6/2016 |
| EP | 3035329 | A1 | 6/2016 |
| EP | 3036594 | A2 | 6/2016 |
| EP | 3038333 | A1 | 6/2016 |
| EP | 3076267 | A1 | 10/2016 |
| EP | 3107101 | A1 | 12/2016 |
| EP | 3115905 | A1 | 1/2017 |
| EP | 3125097 | A2 | 2/2017 |
| EP | 3132442 | A1 | 2/2017 |
| EP | 2672231 | B1 | 5/2017 |
| EP | 3161612 | A1 | 5/2017 |
| EP | 3200185 | A1 | 8/2017 |
| EP | 3201770 | A1 | 8/2017 |
| EP | 3224708 | A1 | 10/2017 |
| EP | 3227771 | A1 | 10/2017 |
| EP | 3246916 | A1 | 11/2017 |
| EP | 3270658 | A1 | 1/2018 |
| EP | 3300074 | A1 | 3/2018 |
| EP | 3336805 | A1 | 6/2018 |
| EP | 3155500 | B1 | 7/2018 |
| EP | 2973380 | B1 | 8/2018 |
| EP | 2983065 | B1 | 8/2018 |
| EP | 3382530 | A1 | 10/2018 |
| EP | 3389045 | A1 | 10/2018 |
| EP | 3392876 | A1 | 10/2018 |
| EP | 3401773 | A1 | 11/2018 |
| EP | 3485392 | A1 | 5/2019 |
| EP | 2973002 | B1 | 6/2019 |
| EP | 3506151 | A1 | 7/2019 |
| EP | 3550483 | A1 | 10/2019 |
| EP | 3567584 | A1 | 11/2019 |
| EP | 3588493 | A1 | 1/2020 |
| EP | 3588912 | A1 | 1/2020 |
| EP | 3323058 | B1 | 2/2020 |
| EP | 3321928 | B1 | 4/2020 |
| EP | 3646205 | A1 | 5/2020 |
| EP | 3674922 | A1 | 7/2020 |
| EP | 3859494 | A1 | 8/2021 |
| EP | 3913475 | A1 | 11/2021 |
| EP | 3971688 | A1 | 3/2022 |
| EP | 4131256 | A1 | 2/2023 |
| EP | 4281855 | A1 | 11/2023 |
| IN | 201917007360 | A | 5/2019 |
| JP | 59-35234 | A | 2/1984 |
| JP | 2-502149 | A | 7/1990 |
| JP | 2002-123295 | A | 4/2002 |
| JP | 2002-182679 | A | 6/2002 |
| JP | 2002-182680 | A | 6/2002 |
| JP | 2003-202897 | A | 7/2003 |
| JP | 2003-308079 | A | 10/2003 |
| JP | 2008-33198 | A | 2/2008 |
| JP | 2008-299221 | A | 12/2008 |
| JP | 2012-14394 | A | 1/2012 |
| JP | 2012-40655 | A | 3/2012 |
| JP | 2012-220959 | A | 11/2012 |
| JP | 2014-2586 | A | 1/2014 |
| JP | 2014-10688 | A | 1/2014 |
| JP | 2014-500558 | A | 1/2014 |
| JP | 2014-502445 | A | 1/2014 |
| JP | 2014-26629 | A | 2/2014 |
| JP | 2014-45449 | A | 3/2014 |
| JP | 2014-507903 | A | 3/2014 |
| JP | 2014-60600 | A | 4/2014 |
| JP | 2014-72586 | A | 4/2014 |
| JP | 2014-77969 | A | 5/2014 |

(56) References Cited

FOREIGN PATENT DOCUMENTS

| | | | |
|---|---|---|---|
| JP | 2014-89711 | A | 5/2014 |
| JP | 2014-109889 | A | 6/2014 |
| JP | 2014-513835 | A | 6/2014 |
| JP | 2014-124332 | A | 7/2014 |
| JP | 2014-126600 | A | 7/2014 |
| JP | 2014-127754 | A | 7/2014 |
| JP | 2014-135000 | A | 7/2014 |
| JP | 2014-140121 | A | 7/2014 |
| JP | 2014-518409 | A | 7/2014 |
| JP | 2014-142566 | A | 8/2014 |
| JP | 2014-145842 | A | 8/2014 |
| JP | 2014-146940 | A | 8/2014 |
| JP | 2014-150323 | A | 8/2014 |
| JP | 2014-157323 | A | 8/2014 |
| JP | 2014-519648 | A | 8/2014 |
| JP | 2014-182042 | A | 9/2014 |
| JP | 2014-524627 | A | 9/2014 |
| JP | 2014-191272 | A | 10/2014 |
| JP | 2014-219614 | A | 11/2014 |
| JP | 2014-222514 | A | 11/2014 |
| JP | 2014-235582 | A | 12/2014 |
| JP | 2015-1931 | A | 1/2015 |
| JP | 2015-4928 | A | 1/2015 |
| JP | 2015-8001 | A | 1/2015 |
| JP | 2015-10979 | A | 1/2015 |
| JP | 2015-12301 | A | 1/2015 |
| JP | 2015-18365 | A | 1/2015 |
| JP | 2015-501022 | A | 1/2015 |
| JP | 2015-501034 | A | 1/2015 |
| JP | 2015-504619 | A | 2/2015 |
| JP | 2015-41845 | A | 3/2015 |
| JP | 2015-52500 | A | 3/2015 |
| JP | 2015-60423 | A | 3/2015 |
| JP | 2015-81971 | A | 4/2015 |
| JP | 2015-83938 | A | 4/2015 |
| JP | 2015-87979 | A | 5/2015 |
| JP | 2015-94848 | A | 5/2015 |
| JP | 2015-514254 | A | 5/2015 |
| JP | 2015-519675 | A | 7/2015 |
| JP | 2015-520409 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-185023 | A | 10/2015 |
| JP | 2015-528918 | A | 10/2015 |
| JP | 2015-531909 | A | 11/2015 |
| JP | 2016-504651 | A | 2/2016 |
| JP | 2016-35614 | A | 3/2016 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2016-156845 | A | 9/2016 |
| JP | 2016-536648 | A | 11/2016 |
| JP | 2017-11608 | A | 1/2017 |
| JP | 2017-19331 | A | 1/2017 |
| JP | 2017-516153 | A | 6/2017 |
| JP | 2017-123187 | A | 7/2017 |
| JP | 2017-211608 | A | 11/2017 |
| JP | 2017-537361 | A | 12/2017 |
| JP | 2018-14086 | A | 1/2018 |
| JP | 6291147 | B1 | 2/2018 |
| JP | 2018-60550 | A | 4/2018 |
| JP | 2018-64297 | A | 4/2018 |
| JP | 2018-511095 | A | 4/2018 |
| JP | 2018-101242 | A | 6/2018 |
| JP | 2018-113035 | A | 7/2018 |
| JP | 2018-523102 | A | 8/2018 |
| JP | 2018-525653 | A | 9/2018 |
| JP | 2018-525950 | A | 9/2018 |
| JP | 2018-536889 | A | 12/2018 |
| JP | 2019-204517 | A | 11/2019 |
| JP | 7487276 | B2 | 5/2024 |
| KR | 10-2011-0043644 | A | 4/2011 |
| KR | 10-2014-0007282 | A | 1/2014 |
| KR | 10-2014-0024271 | A | 2/2014 |
| KR | 10-2014-0025996 | A | 3/2014 |
| KR | 10-2014-0031283 | A | 3/2014 |
| KR | 10-2014-0033574 | A | 3/2014 |
| KR | 10-2014-0042994 | A | 4/2014 |
| KR | 10-2014-0048779 | A | 4/2014 |
| KR | 10-2014-0055204 | A | 5/2014 |
| KR | 10-2014-0059697 | A | 5/2014 |
| KR | 10-2014-0068752 | A | 6/2014 |
| KR | 10-2014-0071208 | A | 6/2014 |
| KR | 10-2014-0088449 | A | 7/2014 |
| KR | 10-2014-0093949 | A | 7/2014 |
| KR | 10-2014-0106715 | A | 9/2014 |
| KR | 10-2014-0107253 | A | 9/2014 |
| KR | 10-2014-0147557 | A | 12/2014 |
| KR | 10-2015-0006454 | A | 1/2015 |
| KR | 10-2015-0013631 | A | 2/2015 |
| KR | 10-2015-0025059 | A | 3/2015 |
| KR | 10-1506510 | B1 | 3/2015 |
| KR | 10-2015-0038375 | A | 4/2015 |
| KR | 10-2015-0039380 | A | 4/2015 |
| KR | 10-2015-0041974 | A | 4/2015 |
| KR | 10-2015-0043512 | A | 4/2015 |
| KR | 10-1510013 | B1 | 4/2015 |
| KR | 10-2015-0062811 | A | 6/2015 |
| KR | 10-2015-0095624 | A | 8/2015 |
| KR | 10-1555742 | B1 | 9/2015 |
| KR | 10-2015-0113127 | A | 10/2015 |
| KR | 10-2015-0131262 | A | 11/2015 |
| KR | 10-2015-0138109 | A | 12/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0055839 | A | 5/2016 |
| KR | 10-2016-0065503 | A | 6/2016 |
| KR | 10-2016-0101079 | A | 8/2016 |
| KR | 10-2016-0101198 | A | 8/2016 |
| KR | 10-2016-0105847 | A | 9/2016 |
| KR | 10-2016-0121585 | A | 10/2016 |
| KR | 10-2016-0127165 | A | 11/2016 |
| KR | 10-2016-0140694 | A | 12/2016 |
| KR | 10-2016-0147854 | A | 12/2016 |
| KR | 10-2017-0004482 | A | 1/2017 |
| KR | 10-2017-0006592 | A | 1/2017 |
| KR | 10-2017-0036805 | A | 4/2017 |
| KR | 10-2017-0096774 | A | 8/2017 |
| KR | 10-2017-0104006 | A | 9/2017 |
| KR | 10-2017-0107058 | A | 9/2017 |
| KR | 10-1776673 | B1 | 9/2017 |
| KR | 10-2018-0032632 | A | 3/2018 |
| KR | 10-2018-0034637 | A | 4/2018 |
| KR | 10-2018-0122837 | A | 11/2018 |
| KR | 10-2018-0133525 | A | 12/2018 |
| KR | 10-2018-0135877 | A | 12/2018 |
| KR | 10-1959328 | B1 | 3/2019 |
| KR | 10-2019-0100512 | A | 8/2019 |
| KR | 10-2020-0007926 | A | 1/2020 |
| KR | 10-2020-0105519 | A | 9/2020 |
| KR | 10-2021-0002722 | A | 1/2021 |
| KR | 10-2677096 | B1 | 6/2024 |
| RU | 2012141604 | A | 4/2014 |
| TW | 201027515 | A | 7/2010 |
| TW | 201407184 | A | 2/2014 |
| TW | 201610982 | A | 3/2016 |
| TW | 201629750 | A | 8/2016 |
| WO | 89/03139 | A1 | 4/1989 |
| WO | 2011/088053 | A2 | 7/2011 |
| WO | 2012/092562 | A1 | 7/2012 |
| WO | 2012/145227 | A1 | 10/2012 |
| WO | 2012/166277 | A1 | 12/2012 |
| WO | 2012/167168 | A2 | 12/2012 |
| WO | 2012/173902 | A2 | 12/2012 |
| WO | 2013/048880 | A1 | 4/2013 |
| WO | 2013/057153 | A1 | 4/2013 |
| WO | 2013/122310 | A1 | 8/2013 |
| WO | 2013/173504 | A1 | 11/2013 |
| WO | 2014/003138 | A1 | 1/2014 |

(56) References Cited

FOREIGN PATENT DOCUMENTS

| | | | |
|---|---|---|---|
| WO | 2014/004544 | A2 | 1/2014 |
| WO | 2014/004584 | A2 | 1/2014 |
| WO | 2014/008461 | A1 | 1/2014 |
| WO | 2014/018580 | A1 | 1/2014 |
| WO | 2014/021967 | A1 | 2/2014 |
| WO | 2014/022148 | A1 | 2/2014 |
| WO | 2014/022306 | A2 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/040022 | A2 | 3/2014 |
| WO | 2014/046475 | A1 | 3/2014 |
| WO | 2014/047047 | A1 | 3/2014 |
| WO | 2014/048855 | A1 | 4/2014 |
| WO | 2014/066352 | A1 | 5/2014 |
| WO | 2014/070872 | A2 | 5/2014 |
| WO | 2014/073825 | A1 | 5/2014 |
| WO | 2014/078965 | A1 | 5/2014 |
| WO | 2014/093339 | A1 | 6/2014 |
| WO | 2014/093911 | A2 | 6/2014 |
| WO | 2014/096506 | A1 | 6/2014 |
| WO | 2014/120699 | A2 | 8/2014 |
| WO | 2014/124332 | A2 | 8/2014 |
| WO | 2014/137074 | A1 | 9/2014 |
| WO | 2014/138604 | A1 | 9/2014 |
| WO | 2014/143776 | A2 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/149473 | A1 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |
| WO | 2014/162570 | A1 | 10/2014 |
| WO | 2014/169269 | A1 | 10/2014 |
| WO | 2014/173189 | A1 | 10/2014 |
| WO | 2014/144949 | A3 | 11/2014 |
| WO | 2014/190297 | A1 | 11/2014 |
| WO | 2013/173504 | A8 | 12/2014 |
| WO | 2014/193161 | A1 | 12/2014 |
| WO | 2014/197336 | A1 | 12/2014 |
| WO | 2014/197339 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/200731 | A1 | 12/2014 |
| WO | 2014/203495 | A1 | 12/2014 |
| WO | 2014/204659 | A2 | 12/2014 |
| WO | 2014/209264 | A1 | 12/2014 |
| WO | 2014/210392 | A2 | 12/2014 |
| WO | 2015/001850 | A1 | 1/2015 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/036817 | A1 | 3/2015 |
| WO | 2015/041882 | A1 | 3/2015 |
| WO | 2015/041892 | A1 | 3/2015 |
| WO | 2015/047932 | A1 | 4/2015 |
| WO | 2015/053485 | A1 | 4/2015 |
| WO | 2015/054141 | A1 | 4/2015 |
| WO | 2015/080530 | A1 | 6/2015 |
| WO | 2015/084659 | A1 | 6/2015 |
| WO | 2015/085542 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/098306 | A1 | 7/2015 |
| WO | 2015/099939 | A1 | 7/2015 |
| WO | 2015/112625 | A1 | 7/2015 |
| WO | 2015/116151 | A1 | 8/2015 |
| WO | 2015/121449 | A1 | 8/2015 |
| WO | 2015/127404 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183368 | A1 | 12/2015 |
| WO | 2015/183401 | A1 | 12/2015 |
| WO | 2015/183547 | A1 | 12/2015 |
| WO | 2015/183699 | A1 | 12/2015 |
| WO | 2015/183755 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/004074 | A1 | 1/2016 |
| WO | 2016/027933 | A1 | 2/2016 |
| WO | 2016/028946 | A1 | 2/2016 |
| WO | 2016/033257 | A1 | 3/2016 |
| WO | 2016/039992 | A1 | 3/2016 |
| WO | 2016/040721 | A1 | 3/2016 |
| WO | 2016/045192 | A1 | 3/2016 |
| WO | 2016/048789 | A1 | 3/2016 |
| WO | 2016/049439 | A1 | 3/2016 |
| WO | 2016/051519 | A1 | 4/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/085776 | A1 | 6/2016 |
| WO | 2016/089029 | A1 | 6/2016 |
| WO | 2016/089638 | A1 | 6/2016 |
| WO | 2016/100139 | A1 | 6/2016 |
| WO | 2016/111881 | A1 | 7/2016 |
| WO | 2016/118344 | A1 | 7/2016 |
| WO | 2016/144840 | A1 | 9/2016 |
| WO | 2016/144982 | A1 | 9/2016 |
| WO | 2016/144983 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/191737 | A2 | 12/2016 |
| WO | 2016/209444 | A1 | 12/2016 |
| WO | 2016/209924 | A1 | 12/2016 |
| WO | 2017/044160 | A1 | 3/2017 |
| WO | 2017/044257 | A1 | 3/2017 |
| WO | 2017/044260 | A1 | 3/2017 |
| WO | 2017/044629 | A1 | 3/2017 |
| WO | 2017/053311 | A1 | 3/2017 |
| WO | 2017/058293 | A1 | 4/2017 |
| WO | 2017/059388 | A1 | 4/2017 |
| WO | 2017/071420 | A1 | 5/2017 |
| WO | 2017/078792 | A1 | 5/2017 |
| WO | 2017/142116 | A1 | 8/2017 |
| WO | 2017/160487 | A1 | 9/2017 |
| WO | 2017/200777 | A1 | 11/2017 |
| WO | 2017/203484 | A1 | 11/2017 |
| WO | 2017/210035 | A1 | 12/2017 |
| WO | 2017/213678 | A1 | 12/2017 |
| WO | 2017/213681 | A1 | 12/2017 |
| WO | 2017/213682 | A1 | 12/2017 |
| WO | 2017/213684 | A1 | 12/2017 |
| WO | 2017/218194 | A1 | 12/2017 |
| WO | 2018/009397 | A1 | 1/2018 |
| WO | 2018/014788 | A1 | 1/2018 |
| WO | 2018/017383 | A1 | 1/2018 |
| WO | 2018/018810 | A1 | 2/2018 |
| WO | 2018/034168 | A1 | 2/2018 |
| WO | 2018/044633 | A1 | 3/2018 |
| WO | 2018/055898 | A1 | 3/2018 |
| WO | 2018/057269 | A1 | 3/2018 |
| WO | 2018/067528 | A1 | 4/2018 |
| WO | 2018/075170 | A1 | 4/2018 |
| WO | 2018/081833 | A1 | 5/2018 |
| WO | 2018/090060 | A1 | 5/2018 |
| WO | 2018/093005 | A1 | 5/2018 |
| WO | 2018/094254 | A1 | 5/2018 |
| WO | 2018/176053 | A1 | 9/2018 |
| WO | 2018/208506 | A1 | 11/2018 |
| WO | 2018/209152 | A1 | 11/2018 |
| WO | 2018/213401 | A1 | 11/2018 |

(56) References Cited

FOREIGN PATENT DOCUMENTS

| | | | |
|---|---|---|---|
| WO | 2018/213415 | A1 | 11/2018 |
| WO | 2018/213481 | A1 | 11/2018 |
| WO | 2018/217014 | A1 | 11/2018 |
| WO | 2018/231307 | A1 | 12/2018 |
| WO | 2019/067930 | A1 | 4/2019 |
| WO | 2019/078576 | A1 | 4/2019 |
| WO | 2019/079017 | A1 | 4/2019 |
| WO | 2019/090434 | A1 | 5/2019 |
| WO | 2019/143397 | A1 | 7/2019 |
| WO | 2019/147429 | A1 | 8/2019 |
| WO | 2019/190646 | A2 | 10/2019 |
| WO | 2019/212569 | A1 | 11/2019 |
| WO | 2019/231537 | A1 | 12/2019 |
| WO | 2019/231541 | A1 | 12/2019 |
| WO | 2019/236217 | A1 | 12/2019 |
| WO | 2020/010530 | A1 | 1/2020 |
| WO | 2020/022572 | A1 | 1/2020 |
| WO | 2020/040775 | A1 | 2/2020 |
| WO | 2020/047086 | A1 | 3/2020 |
| WO | 2020/068040 | A1 | 4/2020 |
| WO | 2020/096706 | A1 | 5/2020 |
| WO | 2020/109074 | A1 | 6/2020 |
| WO | 2020/134896 | A1 | 7/2020 |
| WO | 2020/208302 | A1 | 10/2020 |
| WO | 2020/214006 | A1 | 10/2020 |
| WO | 2020/222871 | A1 | 11/2020 |
| WO | 2021/054565 | A1 | 3/2021 |
| WO | 2021/061349 | A1 | 4/2021 |
| WO | 2021/062148 | A1 | 4/2021 |
| WO | 2021/076164 | A1 | 4/2021 |
| WO | 2021/188439 | A1 | 9/2021 |
| WO | 2021/252230 | A1 | 12/2021 |
| WO | 2022/047214 | A2 | 3/2022 |
| WO | 2022/093401 | A1 | 5/2022 |
| WO | 2022/182668 | A1 | 9/2022 |
| WO | 2022/232568 | A1 | 11/2022 |
| WO | 2023/081574 | A1 | 5/2023 |
| WO | 2023/239663 | A1 | 12/2023 |

OTHER PUBLICATIONS

Daxm, "How to update your TESLA with your phone app", Retrieved from the internet: https://www.youtube.com/watch?v=8kgNGXycGKE, Oct. 31, 2018, 8 pages.

Ermolina et al., "Voice-Controlled Intelligent Personal Assistants in Health Care: International Delphi Study", Journal of Medical Internet Research, 2021, Online available at: DOI:10.2196/25312, Apr. 9, 2021, 20 pages.

Francis, Christopher, "PTAB Broadest Reasonable Interpretation: "in response to"Means"subsequent to"", The B2 IP Report retrieved from: http://web.archive.org/web/20220704055910/https:/www.b2ipreport.com/claims-interpreted/ptab-broadest-reasonable-interpretation-in-response-to-means-subsequent-to/, Jan. 27, 2017, 4 pages.

Fujimoto et al., "Development of Task Control System of Multiple Robots Using Environmental Sensors", Proceedings of the 2017 JSME Conference on Robotics and Mechatronics, Fukushima, Japan, May 10, 2017, 4 pages (Official Copy only). {See Communication under Rule 37 CFR § 1.98(a) (3)}.

Google Codelabs, "Extend Dynamic Shortcuts to Google Assistant with App Actions (Beta)" Available on: https://web.archive.org/web/20220524223852/https://codelabs.developers.google.com/codelabs/appactions-dynamic-shortcuts, May 24, 2022, 25 pages.

Graus et al., "Analyzing and Predicting Task Reminders", Conference on User Modeling Adaptation and Personalization, 2016, 9 pages.

Guarese et al., "Cooking in the Dark: Exploring Spatial Audio as MR Assistive Technology for the Visually Impaired", 18th IFIP Conference on Human-Computer Interaction (INTERACT), Available online at: https://inria.hal.science/hal-04291191/file/520519_1_En_29_Chapter.pdf, Aug. 2021, 6 pages.

Gu et al. "Alohomora: Motion-Based Hotword Detection in Head-Mounted Displays", IEEE Internet of Things Journal, vol. 7, No. 1, Jan. 2020, pp. 611-620.

Jun, Yu, "Research on 3D visual speech expression and emotional simulation", China Excellence Master's Theses Full-text Database Information Technology Edition, No. 3, Mar. 15, 2018, 78 pages (Official Copy only). {See Communication under Rule 37 CFR § 1.98(a) (3)}.

Maharjan et al., "Alexa, What Should I Eat?: A Personalized Virtual Nutrition Coach for Native American Diabetes Patients Using Amazon's Smart Speaker Technology", 2019 IEEE International Conference on E-health Networking, Application & Services (HealthCom), Online available at: https://ieeexplore.ieee.org/document/9009613, 2019, 6 pages.

Matias, Yossi, "Easier access to web pages: Ask Google Assistant to read it aloud", Available online at: https://blog.google/products/assistant/easier-access-web-pages-let-assistant-read-it-aloud/, Mar. 4, 2020, 3 pages.

Pan et al., "A Chapter-Wise Understanding System for Text-to-Speech in Chinese Novels", IEEE International Conference on Acoustics, Speech and Signal Processing (ICASSP), 2021, pp. 6069-6073.

Pradhan et al., "Understanding and Managing Notifications", IEEE Infocom 2017—IEEE Conference on Computer Communications, 2017, 9 pages.

Price et al., "Speaker Adaptation of Deep Neural Networks Using a Hierarchy of Output Layers", SLT 2014. Online Available at: IEEE Explore, 2014, pp. 153-158.

Samsung Gear 2, "User Manual", Available online at: <http://www.manualslib.com/download/754923/Samsung-Gear-2.html>, Apr. 9, 2014, 97 pages.

Sarkar et al., "Data-Driven Pause Prediction for Synthesis of Storytelling Style Speech based on Discourse Modes", 2015 IEEE International Conference on Electronics, Computing and Communication Technologies, 2015, 5 pages.

Sony, "Sony Smartwatch 3 SWR50", User Guide, Jul. 2014, 31 pages.

Unbox Therapy, "World's First Under-Display Camera Smartphone is Here", Available online at: https://youtu.be/Y5Dbcw7QWRo?si=8kXJ7Nmop8EOhni3, Sep. 21, 2020, 14 pages.

Wang et al., "Style Tokens: Unsupervised Style Modeling, Control and Transfer in End-to-End Speech Synthesis", Proceedings of the 35th International Conference on Machine Learning, Stockholm, Sweden, PMLR 80, 2018, 10 pages.

White et al., "Task completion detection: A Study in the Context of Intelligent Systems", Proceedings of the 42nd International ACM SIGIR Conference on Research and Development in Information Retrieval, Jul. 21-25, 2019, pp. 405-414.

Yeh et al., "Dialog Modeling in Audiobook Synthesis", Retrieved on Sep. 27, 2023, 6 pages.

Zhou et al., "Using Paralinguistic Information to Disambiguate User Intentions for Distinguishing Phrase Structure and Sarcasm in Spoken Dialog Systems", IEEE Spoken Language Technology Workshop (SLT), Jan. 19, 2021, pp. 1020-1027.

Abdelaziz et al., "Speaker-Independent Speech-Driven Visual Speech Synthesis using Domain-Adapted Acoustic Models", May 15, 2019, 9 pages.

"Accessibility on iOS", Apple Inc., Online available at: https://developer.apple.com/accessibility/ios/, Retrieved on Jul. 26, 2021, 2 pages.

"Alexa, Turn Up the Heat!, Smartthings Samsung [online]", Online available at: <https://web.archive.org/web/20160329142041/https://blog.smartthings.com/news/smartthingsupdates/alexa-turn-up-the-heat/>, Mar. 3, 2016, 3 pages.

Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.

Anania, Peter, "Amazon Echo with Home Automation (Smartthings)", Online available at: <https://www.youtube.com/watch?v=LMW6aXmsWNE>, Dec. 20, 2015, 1 page.

Apple Differential Privacy Team, "Learning with Privacy at Scale", Apple Machine Learning Blog, vol. 1, No. 8, Online available at:

(56) References Cited

OTHER PUBLICATIONS

<https://machinelearning.apple.com/2017/12/06/learning-with-privacy-at-scale.html>, Dec. 2017, 9 pages.
Apple, "Apple previews innovative accessibility features combining the power of hardware, software, and machine learning", Available online at: https://www.apple.com/newsroom/2022/05/apple-previews-innovative-accessibility-features/, May 17, 2022, 10 pages.
Apple, "VoiceOver for OS X", Online available at: <http://www.apple.com/accessibility/voiceover/>, May 19, 2014, pp. 1-3.
Applicant-Initiated Interview Summary received for U.S. Appl. No. 16/800,456, mailed on Apr. 12, 2021, 2 pages.
"Ask Alexa—Things That Are Smart Wiki", Online available at: <http://thingsthataresmart.wiki/index.php?title=Ask_Alexa&oldid=4283>, Jun. 8, 2016, pp. 1-31.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Badshah et al., "Deep Features-based Speech Emotion Recognition For Smart Affective Services", Multimedia Tools and Applications, Oct. 31, 2017, pp. 5571-5589.
Bao et al., "Detecting Target Objects by Natural Language Instructions Using an RGB-D Camera", Sensors (Basel, Switzerland) 2016, 16(12), 2117, Dec. 13, 2016, 23 pages.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
beointegration.com, "BeoLink Gateway-Programming Example", Online Available at: <https:/ /www.youtube.com/watch?v=TXDaJFm5UH4>, Mar. 4, 2015, 3 pages.
Bodapati et al., "Neural Word Decomposition Models for Abusive Language Detection", Proceedings of the Third Workshop on Abusive Language Online, Aug. 1, 2019, pp. 135-145.
Burgbacher et al., "Synthetic Word Gesture Generation for Stroke-Based Virtual Keyboards", IEEE Transactions on Human-Machine Systems, vol. 47, No. 2, Apr. 2017, 14 pages.
Burgess, Brian, "Amazon Echo Tip: Enable the Wake Up Sound", Online available at: <https://www.groovypost.com/howto/amazon-echo-tip-enable-wake-up-sound/>, Jun. 30, 2015, 4 pages.
Buttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
"Cake", Online Available at: <https://web.archive.org/web/20170808091948/https://emojipedia.org/search/?q=cake>, Aug. 8, 2017, 5 pages.
Cambria et al., "Jumping NLP curves: A Review of Natural Language Processing Research", IEEE Computational Intelligence magazine, 2014, vol. 9, May 2014, pp. 48-57.
Castellini, Rick, "How to enable and use dictation with an iPhone or iPad", Online Available at: <https://www.youtube.com/watch?v=8w133yN6rTU>, Sep. 7, 2017, 3 pages.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, And Language Processing, vol. 26, No. 1, Jan. 2018, pp. 184-196.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at: https://www.ifanr.com/weizhizao/612531, Jan. 25, 2016, 7 pages.
Choi et al., "Evaluation of Frequency Warping Based Features and Spectro-Temporal Features for Speaker Recognition", Speech Sounds and Phonetic Science, Online Available at: http://koreascience.or.kr/article/JAKO201510534323834.page, vol. 7, No. 1, Mar. 31, 2015, pp. 3-10.
Colt, Sam, "Here's One Way Apple's Smartwatch Could Be Better Than Anything Else", Business Insider, Aug. 21, 2014, pp. 1-4.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
"Context-Sensitive User Interface", Online available at: https://web.archive.org/web/20190407003349/https://en.wikipedia.org/wiki/Context-sensitive_user_interface, Apr. 7, 2019, 3 pages.
Corrected Notice of Allowance received for U.S. Appl. No. 15/656,793, mailed on Apr. 3, 2019, 2 pages.
Corrected Notice of Allowance received for U.S. Appl. No. 15/656,793, mailed on Apr. 22, 2019, 2 pages.
Corrected Notice of Allowance received for U.S. Appl. No. 15/656,793, mailed on Jun. 27, 2019, 2 pages.
Corrected Notice of Allowance received for U.S. Appl. No. 15/656,793, mailed on Mar. 25, 2019, 4 pages.
Corrected Notice of Allowance received for U.S. Appl. No. 15/656,793, mailed on May 1, 2019, 2 pages.
Corrected Notice of Allowance received for U.S. Appl. No. 17/461,018, mailed on Apr. 6, 2023, 2 pages.
Corrected Notice of Allowance received for U.S. Appl. No. 18/231,135, mailed on Jun. 28, 2024, 2 pages.
Corrected Notice of Allowance received for U.S. Appl. No. 15/656,793, mailed on Jul. 8, 2019, 2 pages.
Creswell et al., "Generative Adversarial Networks", IEEE Signal Processing Magazine, Jan. 2018, pp. 53-65.
Czech, Lucas, "A System for Recognizing Natural Spelling of English Words", Diploma Thesis, Karlsruhe Institute of Technology, May 7, 2014, 107 pages.
Dai et al., "Transformer-XL: Attentive Language Models Beyond a Fixed-Length Context", Online available at: arXiv:1901.02860v3, Jun. 2, 2019, 20 pages.
Decision of Board received for Japanese Patent Application No. 2018-087328, mailed on May 27, 2022, 65 pages.
Decision to Grant received for European Patent Application No. 15169349.6, mailed on Mar. 8, 2018, 2 pages.
Decision to Grant received for European Patent Application No. 17210705.4, mailed on Mar. 12, 2020, 2 pages.
Deedeevuu, "Amazon Echo Alarm Feature", Online available at: <https://www.youtube.com/watch?v=fdjU8eRLk7c>, Feb. 16, 2015, 1 page.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at: < https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available at: <https://www.tapatalk.com/groups/macrodroid/how-can-i-use-voice-or-phrases-as-triggers-to-macr-t4845.html>, May 9, 2018, 5 pages.
Dwork et al., "The Algorithmic Foundations of Differential Privacy", Foundations and Trends in Theoretical Computer Science: vol. 9: No. 3-4, 211-407, 2014, 281 pages.

(56) References Cited

OTHER PUBLICATIONS

Eder et al., "At the Lower End of Language—Exploring the Vulgar and Obscene Side of German", Proceedings of the Third Workshop on Abusive Language Online, Florence, Italy, Aug. 1, 2019, pp. 119-128.

Extended European Search Report (includes Partial European Search Report and European Search Opinion) received for European Patent Application No. 15169349.6, mailed on Jul. 28, 2015, 8 pages.

Extended European Search Report received for European Patent Application No. 17210705.4, mailed on Feb. 6, 2018, 12 pages.

Filipowicz, Luke, "How to use the QuickType keyboard in iOS 8", Online available at: <https://www.imore.com/comment/568232>, Oct. 11, 2014, pp. 1-17.

Final Office Action received for U.S. Appl. No. 14/502,737, mailed on Dec. 12, 2016, 13 pages.

Fitzpatrick, Aidan, "Introducing Camo 1.5: AR modes", Available Online at: "https://reincubate.com/blog/camo-ar-modes-release/", Oct. 28, 2021, 8 pages.

Gadget Hacks, "Tasker Too Complicated? Give MacroDroid a Try [How-To]", Online available at: <https://www.youtube.com/watch?v=8YL9cWCykKc>, May 27, 2016, 1 page.

"Galaxy S7: How to Adjust Screen Timeout & Lock Screen Timeout", Online available at: <https://www.youtube.com/watch?v=n6e1WKUS2ww>, Jun. 9, 2016, 1 page.

Ganin et al., "Unsupervised Domain Adaptation by Backpropagation", in Proceedings of the 32nd International Conference on Machine Learning, vol. 37, Jul. 2015, 10 pages.

Gatys et al., "Image Style Transfer Using Convolutional Neural Networks", Proceedings of IEEE International Conference on Acoustics, Speech and Signal Processing (ICASSP), 2016, pp. 2414-2423.

Geyer et al., "Differentially Private Federated Learning: A Client Level Perspective", arXiv:1712.07557v2, Mar. 2018, 7 pages.

Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.

Gomez, et al., "Mouth Gesture and Voice Command Based Robot Command Interface", IEEE International Conference on Robotics and Automation, May 12-17, 2009, pp. 333-338.

Goodfellow et al., "Generative Adversarial Networks", Proceedings of the Neural Information Processing Systems, Dec. 2014, 9 pages.

Google Developers, "Voice search in your app", Online available at: <https://www.youtube.com/watch?v=PS1FbB5qWEI>, Nov. 12, 2014, 1 page.

Gu et al., "BadNets: Evaluating Backdooring Attacks on Deep Neural Networks", IEEE Access, vol. 7, Mar. 21, 2019, pp. 47230-47244.

Guim, Mark, "How to Set a Person-Based Reminder with Cortana", Online available at: <http://www.wpcentral.com/how-to-person-based-reminder-cortana>, Apr. 26, 2014, 15 pages.

Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.

Guo et al., "Time-Delayed Bottleneck Highway Networks Using a DFT Feature for Keyword Spotting", IEEE International Conference on Acoustics, Speech and Signal Processing (ICASSP), IEEE, 2018, 5 pages.

Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.

Gupta et al., "I-vector-based Speaker Adaptation of Deep Neural Networks for French Broadcast Audio Transcription", ICASSP, 2014, 2014, pp. 6334-6338.

Hanqing et al., "Deep Learning of Instruction Intention Understanding Using Stacked Denoising Autoencoder", Journal of Shanghai Jiaotong University, vol. 50, No. 7, Jul. 28, 2016, 6 pages.

Haung et al., "A Study for Improving Device-Directed Speech Detection Toward Frictionless Human-Machine Interaction", in Proc. Interspeech, 2019, 5 pages.

Hawkeye, "Hawkeye—A better user testing platform", Online Available at: https://www.youtube.com/watch?v=el0TW0g_76o, Oct. 16, 2019, 3 pages.

Hawkeye, "Learn where people look in your products", Online Available at: https://www.usehawkeye.com, 2019, 6 pages.

"Headset Button Controller v7.3 APK Full APP Download for Andriod, Blackberry, iPhone", Online available at: <http://fullappdownload.com/headset-button-controller-v7-3- apk/>, Jan. 27, 2014, 11 pages.

Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.

Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.

Hershey et al., "Deep Clustering: Discriminative Embeddings for Segmentation and Separation", Proc. ICASSP, Mar. 2016, 6 pages.

"Hey Google: How to Create a Shopping List with Your Google Assistant", Online available at: <https://www.youtube.com/watch?v=w9NCsElax1Y>, May 25, 2018, 1 page.

Hinton et al., "Distilling the Knowledge in A Neural Network", arXiv preprintarXiv:1503.02531, Mar. 2, 2015, 9 pages.

Hook et al., "Automatic speech based emotion recognition using paralinguistics features", Bulletin of the Polish Academy of Sciences, Technical Sciences, vol. 67, No. 3, 2019, pp. 479-488.

"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages.

"How to Enable Google Assistant on Galaxy S7 and Other Android Phones (No Root)", Online available at: <https://www.youtube.com/watch?v=HekIQbWyksE>, Mar. 20, 2017, 1 page.

"How to Use Ok Google Assistant Even Phone is Locked", Online available at: <https://www.youtube.com/watch?v=9B_gP4j_SP8>, Mar. 12, 2018, 1 page.

id3.org, "id3v2.4.0-Frames", Online available at: <http://id3.org/id3v2.4.0-frames?action=print>, retrieved on Jan. 22, 2015, pp. 1-41.

Idasallinen, "What's The 'Like' Meter Based on?", Online Available at: <https://community.spotify.com/t5/Content-Questions/What-s-the-like-meter-based-on/td-p/1209974>, Sep. 22, 2015, 6 pages.

Ikeda, Masaru, "beGLOBAL SEOUL 2015 Startup Battle: Talkey", YouTube Publisher, Online Available at: <https://www.youtube.com/watch?v=4Wkp7sAAldg>, May 14, 2015, 1 page.

Inews and Tech, "How to Use the QuickType Keyboard in IOS 8", Online available at: <http://www.inewsandtech.com/how-to-use-the-quicktype-keyboard-in-ios-8/>, Sep. 17, 2014, 6 pages.

Intention to Grant received for European Patent Application No. 15169349.6, mailed on Oct. 16, 2017, 7 pages.

Intention to Grant received for European Patent Application No. 17210705.4, mailed on Oct. 25, 2019, 8 pages.

"Interactive Voice", Online available at: <http://www.helloivee.com/company/>, retrieved on Feb. 10, 2014, 2 pages.

International Preliminary Report on Patentability received for PCT Patent Application No. PCT/US2015/032724, mailed on Dec. 15, 2016, 8 pages.

International Search Report and Written Opinion received for PCT Patent Application No. PCT/US2015/032724, mailed on Jul. 27, 2015, 11 pages.

"IPhone 6 Smart Guide Full Version for SoftBank", Gijutsu-Hyohron Co. Ltd., vol. 1, Dec. 1, 2014, 4 pages.

Isik et al., "Single-Channel Multi-Speaker Separation using Deep Clustering", Interspeech 2016, Sep. 8-12, 2016, pp. 545-549.

(56) References Cited

OTHER PUBLICATIONS

Jeon et al., "Voice Trigger Detection from LVCSR Hypothesis Lattices Using Bidirectional Lattice Recurrent Neural Networks", International Conference on Acoustics, Speech and Signal Processing (ICASSP), IEEE, Feb. 29, 2020, 5 pages.
Jonsson et al., "Proximity-based Reminders Using Bluetooth", 2014 IEEE International Conference on Pervasive Computing and Communications Demonstrations, 2014, pp. 151-153.
Kannan et al., "Smart Reply: Automated Response Suggestion for Email", Available Online at: https://arxiv.org/pdf/1606.04870.pdf, Jun. 15, 2016, 10 pages.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, Online available at: <https://web.archive.org/web/20160505090418/https://www.theverge.com/2016/5/4/1159 3564/viv-labs-unveiling-monday-new-ai-from-siri-creators>, May 4, 2016, 3 pages.
Katzenmaier et al., "Identifying the Addressee in Human-Human-Robot Interactions based on Head Pose and Speech", Proc. ICMI '04, ACM, 2004, pp. 144-151.
Kickstarter, "Ivee Sleek: Wi-Fi Voice-Activated Assistant", Online available at: <https://www.kickstarter.com/projects/ivee/ivee-sleek-wi-fi-voice-activated-assistant>, retrieved on Feb. 10, 2014, pp. 1-13.
King et al., "Robust Speech Recognition via Anchor Word Representations", Interspeech 2017, Aug. 20-24, 2017, pp. 2471-2475.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC), vol. 6, No. 1, Jan. 2014, pp. 33-43.
Kumatani et al., "Direct Modeling of Raw Audio with DNNS for Wake Word Detection", in 2017 IEEE Automatic Speech Recognition and Understanding Workshop (ASRU), 2017, 6 pages.
Li et al., "Deep neural network for short-text sentiment classification", International Conference on Database Systems for Advanced Applications, Springer, Cham, 2016, 8 pages.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at: <https://support.google.com/assistant/answer/9071681?co=GENIE.Platform%3DAndroid &hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media Inc., Online Available at: <https://www.oreilly.com/library/view/what-is-the/9781491975633/>, 2015, 31 pages.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Maas et al., "Combining Acoustic Embeddings and Decoding Features for End-of-Utterance Detection in Real-Time Far-Field Speech Recognition Systems", in 2018 IEEE International Conference on Acoustics, Speech and Signal Processing (ICASSP), IEEE, 2018, 5 pages.
Mallidi et al., "Device-Directed Utterance Detection", Proc. Interspeech, Aug. 7, 2018, 4 pages.
Marketing Land, "Amazon Echo: Play music", Online Available at: <https://www.youtube.com/watch?v=A7V5NPbsXi4>, Apr. 27, 2015, 3 pages.
"Meet Ivee, Your Wi-Fi Voice Activated Assistant", Available Online at: <http://www.helloivee.com/>, retrieved on Feb. 10, 2014, 8 pages.
Mehri et al., "Multi-Granularity Representations of Dialog", Language Technologies Institute, Carnegie Mellon University, arXiv:1908.09890v1, Aug. 26, 2019, 10 pages.
"Method to Provide Remote Voice Navigation Capability on the Device", ip.com, Jul. 21, 2016, 4 pages.
Mhatre et al., "Donna Interactive Chat-bot acting as a Personal Assistant", International Journal of Computer Applications (0975-8887), vol. 140, No. 10, Apr. 2016, 6 pages.
Michalevsky et al., "Gyrophone: Recognizing Speech from Gyroscope Signals", Proceedings of the 23rd USENIX Security Symposium, Aug. 20-22, 2014, pp. 1053-1067.
"Microsoft Soundscape—A map delivered in 3D sound", Microsoft Research, Online available at: https://www.microsoft.com/en-us/research/product/soundscape/, Retrieved on Jul. 26, 2021, 5 pages.
Miller, Chance, "Google Keyboard Updated with New Personalized Suggestions Feature", Online available at: <http://9to5google.com/2014/03/19/google-keyboard-updated-with-new-personalized-suggestions-feature/>, Mar. 19, 2014, 4 pages.
Mnih et al., "Human-Level Control Through Deep Reinforcement Learning", Nature, vol. 518, Feb. 26, 2015, pp. 529-533.
Modern Techies, "Braina-Artificial Personal Assistant for PC(like Cortana, Siri)!!!!", Online available at: <https://www.youtube.com/watch?v=_Coo2P8ilqQ>, Feb. 24, 2017, 3 pages.
Muller et al., "A Taxonomy for Information Linking in Augmented Reality", AVR 2016, Part I, LNCS 9768, 2016, pp. 368-387.
Muller et al., "Control Theoretic Models of Pointing", ACM Transactions on Computer-Human Interaction, Aug. 2017, 36 pages.
Myers, Brad A., "Shortcutter for Palm", Available at: <http://www.cs.cmu.edu/~pebbles/v5/shortcutter/palm/index.html>, retrieved on Jun. 18, 2014, 10 pages.
Myrick et al., "How to Insert Emojis Using Your Voice with Google Assistant", Online available at: <https://web.archive.org/web/20211107160722/https://www.androidcentral.com/how-insert-emojis-using-your-voice-google-assistant>, Nov. 7, 2021, 11 pages.
Non-Final Office Action received for U.S. Appl. No. 14/502,737, mailed on Jun. 15, 2016, 11 pages.
Non-Final Office Action received for U.S. Appl. No. 15/656,793, mailed on Aug. 10, 2018, 13 pages.
Non-Final Office Action received for U.S. Appl. No. 16/530,708, mailed on Jan. 14, 2020, 24 pages.
Non-Final Office Action received for U.S. Appl. No. 16/800,456, mailed on Mar. 11, 2021, 10 pages.
Non-Final Office Action received for U.S. Appl. No. 18/231,135, mailed on Apr. 3, 2024, 22 pages.
Norouzian et al., "Exploring Attention Mechanism for Acoustic based Classification of Speech Utterances into System-Directed and Non-System-Directed", International Conference on Acoustics, Speech and Signal Processing (ICASSP), IEEE, Feb. 1, 2019, 5 pages.
Notice of Acceptance received for Australian Patent Application No. 2015202943, mailed on Apr. 20, 2017, 3 pages.
Notice of Allowance received for Chinese Patent Application No. 201510289544.9, mailed on Jun. 5, 2019, 2 pages.
Notice of Allowance received for Chinese Patent Application No. 201910768373.6, mailed on Feb. 2, 2021, 2 pages.
Notice of Allowance received for Japanese Patent Application No. 2015-109087, mailed on Mar. 30, 2018, 4 pages.
Notice of Allowance received for Japanese Patent Application No. 2018-087328, mailed on Mar. 27, 2020, 4 pages.
Notice of Allowance received for Korean Patent Application No. 10-2015-76599, mailed on Jan. 26, 2017, 3 pages.
Notice of Allowance received for Taiwanese Patent application No. 104117237, mailed on Mar. 10, 2017, 3 pages.
Notice of Allowance received for U.S. Appl. No. 14/502,737, mailed on Apr. 7, 2017, 30 pages.
Notice of Allowance received for U.S. Appl. No. 14/502,737, mailed on Jun. 8, 2017, 2 pages.
Notice of Allowance received for U.S. Appl. No. 15/656,793, mailed on Feb. 26, 2019, 17 pages.
Notice of Allowance received for U.S. Appl. No. 16/530,708, mailed on Apr. 22, 2020, 11 pages.
Notice of Allowance received for U.S. Appl. No. 16/800,456, mailed on Aug. 23, 2021, 11 pages.

(56) References Cited

OTHER PUBLICATIONS

Notice of Allowance received for U.S. Appl. No. 16/800,456, mailed on Jul. 2, 2021, 11 pages.
Notice of Allowance received for U.S. Appl. No. 17/461,018, mailed on Jul. 17, 2023, 16 pages.
Notice of Allowance received for U.S. Appl. No. 17/461,018, mailed on Mar. 28, 2023, 16 pages.
Notice of Allowance received for U.S. Appl. No. 18/231,135, mailed on Jun. 12, 2024, 14 pages.
Notification of Reason for Cancellation received for Japanese Patent Application No. 2018-087328, mailed on Mar. 18, 2021, 20 pages.
Notification of Reason for Cancellation received for Japanese Patent Application No. 2018-087328, mailed on Oct. 14, 2021, 46 pages.
"Nuance Dragon Naturally Speaking", Version 13 End-User Workbook, Nuance Communications Inc., Sep. 2014, 125 pages.
Office Action received for Australian Patent Application No. 2015202943, mailed on Apr. 27, 2016, 3 pages.
Office Action received for Australian Patent Application No. 2015202943, mailed on Oct. 31, 2016, 3 pages.
Office Action received for Chinese Patent Application No. 201510289544.9, mailed on May 3, 2018, 27 pages.
Office Action received for Chinese Patent Application No. 201510289544.9, mailed on Nov. 19, 2018, 10 pages.
Office Action received for Chinese Patent Application No. 201910768373.6, mailed on Jun. 19, 2020, 10 pages.
Office Action received for European Patent Application No. 15169349.6, mailed on Jul. 27, 2017, 5 pages.
Office Action received for European Patent Application No. 15169349.6, mailed on Sep. 26, 2016, 5 pages.
Office Action received for European Patent Application No. 17210705.4, mailed on Jul. 23, 2019, 4 pages.
Office Action received for European Patent Application No. 17210705.4, mailed on Mar. 5, 2019, 5 pages.
Office Action received for Japanese Patent Application No. 2015-109087, mailed on Sep. 19, 2017, 14 pages.
Office Action received for Japanese Patent Application No. 2015-109087, mailed on Sep. 23, 2016, 14 pages.
Office Action received for Japanese Patent Application No. 2018-087328, mailed on Jul. 16, 2019, 13 pages.
Office Action received for Korean Patent Application No. 10-2015-76599, mailed on Jun. 10, 2016, 9 pages.
Office Action received for Taiwanese Patent Application No. 104117237, mailed on Jul. 11, 2016, 17 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Patent Opposition Brief received for Japanese Patent Application No. 2018-087328, mailed on Nov. 17, 2020, 85 pages.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Philips, Chris, "Thumbprint Radio: A Uniquely Personal Station Inspired by All of Your Thumbs Up", Pandora News, Online Available at: <https://blog.pandora.com/author/chris-phillips/>, Dec. 14, 2015, 7 pages.
Ping et al., "Deep Voice 3: Scaling Text to Speech with Convolutional Sequence Learning", Available online at: https://arxiv.org/abs/1710.07654, Feb. 22, 2018, 16 pages.
"Pose, Cambridge Dictionary Definition of Pose", Available online at: <https://dictionary.cambridge.org/dictionary/english/pose>, 4 pages.
Products for Pals—ALS Tech, "Skyle for iPad Pro eye gaze control real world review", Online Available at: <https://www.youtube.com/watch?v=_3TxZtDJpFo>, Aug. 13, 2020, 4 pages.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at: <https://www.youtube.com/watch?v=0CIdLR4fhVU>, Jun. 3, 2014, 3 pages.
Raux, Antoine, "High-Density Dialog Management the Topic Stack", Adventures in High Density, Online available at: https://medium.com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Ritchie, Rene, "QuickType keyboard in iOS 8: Explained", Online Available at: <https://www.imore.com/quicktype-keyboards-ios-8-explained>, Jun. 21, 2014, pp. 1-19.
Robbins, F. M., "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Routines, "SmartThings Support", Online available at: <https://web.archive.org/web/20151207165701/https://support.smartthings.com/hc/en-us/articles/205380034-Routines>, 2015, 3 pages.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at: <https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Schenk et al., "GazeEverywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.
Seehafer, Brent, "Activate Google Assistant on Galaxy S7 with Screen off", Online available at: <https://productforums.google.com/forum/#!topic/websearch/lp3qIGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.

(56) References Cited

OTHER PUBLICATIONS

Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages.
Siou, Serge, "How to Control Apple TV 3rd Generation Using Remote app", Online available at: <https://www.youtube.com/watch?v=PhyKftZ0S9M>, May 12, 2014, 3 pages.
"SmartThings +Amazon Echo", Smartthings Samsung [online], Online available at: <https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tan et al., "Knowledge Transfer in Permutation Invariant Training for Single-channel Multi-talker Speech Recognition", ICASSP 2018, 2018, pp. 5714-5718.
Tech Target Contributor, "AI Accelerator", Available online at: https://searchenterpriseai.techtarget.com/definition/AI-accelerator, Apr. 2018, 3 pages.
Tech With Brett, "Everything the Google Nest Hub Can Do", Available online at: https://www.youtube.com/watch?v=x3vdytgru2E, Nov. 12, 2018, 13 pages.
Tech With Brett, "Google Home Multiple Users Setup", Available online at: https://www.youtube.com/watch?v=BQOAbRUeFRo&t=257s, Jun. 29, 2017, 4 pages.
Tkachenko, Sergey, "Chrome will automatically create Tab Groups", Available online at: https://winaero.com/chrome-will-automatically-create-tab-groups/, Sep. 18, 2020, 5 pages.
Tkachenko, Sergey, "Enable Tab Groups Auto Create in Google Chrome", Available online at: https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages.
Vaswani et al., "Attention Is All You Need", 31st Conference on Neural Information Processing Systems (NIPS 2017), 2017, pp. 1-11.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Villemure et al., "The Dragon Drive Innovation Showcase: Advancing the State-of-the-art in Automotive Assistants", 2018, 7 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Wang et al., "Tacotron: Towards End to End Speech Synthesis", Available online at: https://arxiv.org/abs/1703.10135, Apr. 6, 2017, 10 pages.
Wang et al., "Training Deep Neural Networks with 8-bit Floating Point Numbers", 32nd Conference on Neural Information Processing Systems (Neurl PS 2018), 2018, 10 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
"What's on Spotify?", Music for everyone, Online Available at: <https://web.archive.org/web/20160428115328/https://www.spotify.com/us/>, Apr. 28, 2016, 6 pages.
Wikipedia, "Home Automation", Online Available at: <https://en.wikipedia.org/w/index.php?title=Home_automation&oldid=686569068>, Oct. 19, 2015, 9 pages.
Wikipedia, "Siri", Online Available at: <https://en.wikipedia.org/w/index.php?title=Siri&oldid=689697795>, Nov. 8, 2015, 13 pages.
Wikipedia, "Virtual Assistant", Wikipedia, Online Available at: <https://en.wikipedia.org/w/index.php?title=Virtual_assistant&oldid=679330666>, Sep. 3, 2015, 4 pages.
Win et al., "Myanmar Text to Speech System based on Tacotron-2", International Conference on Information and Communication Tehcnology Convergence (ICTC), Oct. 21-23, 2020, pp. 578-583.
"Working with the Dragon Bar", Nuance Communications Inc., Jun. 27, 2016, 2 pages.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
X.AI, "How it Works", Online available at: <https://web.archive.org/web/20160531201426/https://x.ai/how-it-works/>, May 31, 2016, 6 pages.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yang, Astor, "Control Android TV via Mobile Phone APP RKRemoteControl", Online Available at: <https://www.youtube.com/watch?v=zpmUeOX_xro>, Mar. 31, 2015, 4 pages.
Yates, Michael C., "How Can I Exit Google Assistant After I'm Finished with it", Online available at: <https://productforums.google.com/forum/#!msg/phone-by-google/faECnR2RJwA/gKNtOkQgAQAJ>, Jan. 11, 2016, 2 pages.
Yeh, Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Yousef, Zulfikar A., "Braina (A.I) Artificial Intelligence Virtual Personal Assistant", Online available at: <https://www.youtube.com/watch?v=2h6xpB8bPSA>, Feb. 7, 2017, 3 pages.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhang et al., "A Fiber-Optic Sensor for Acoustic Emission Detection in a High Voltage Cable System", Online Available at: https://www.mdpi.com/1424-8220/16/12/2026, Nov. 30, 2016, 11 pages.
Zhang et al., "IEHouse: A Non-Intrusive Household Appliance State Recognition System", IEEE Smart World, Ubiquitous Intelligence & Computing, Advanced & Trusted Computed, 2017, 8 pages.
Zhang et al., "Interaction Proxies for Runtime Repair and Enhancement of Mobile Application Accessibility", In Proceedings of the 2017 CHI Conference on Human Factors in Computing Systems

(56) References Cited

OTHER PUBLICATIONS (CHI '17). ACM, Denver, CO, USA, Online available at: https://dl.acm.org/doi/pdf/10.1145/3025453.3025846, May 6-11, 2017, pp. 6024-6037.
Zhang et al., "Very Deep Convolutional Networks for End-to-End Speech Recognition", IEEE International Conference on Acoustics, Speech and Signal Processing (ICASSP), 2017, 5 pages.
Zhang et al., "Voicemoji: Emoji Entry Using Voice for Visually Impaired People", CHI '21, May 8-13, 2021, 18 pages.
Zhao et al., "Big Data Analysis and Application", Aviation Industry Press, Dec. 2015, pp. 236-241.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.
Zheng et al., "Intent Detection and Semantic Parsing for Navigation Dialogue Language Processing", 2017 IEEE 20th International Conference on Intelligent Transportation Systems (ITSC), 2017, 6 pages.
Zhong et al., "JustSpeak: Enabling Universal Voice Control on Android", W4A'14, Proceedings of the 11th Web for All Conference, No. 36, Apr. 7-9, 2014, 8 pages.
Zhou et al., "Learning Dense Correspondence via 3D-guided Cycle Consistency", Proceedings of the IEEE Conference on Computer Vision and Pattern Recognition (CVPR), 2016, 10 pages.
Zmolikova et al., "Speaker-Aware Neural Network Based Beamformer for Speaker Extraction in Speech Mixtures", Interspeech 2017, Aug. 20-24, 2017, pp. 2655-2659.

* cited by examiner

REDUCING THE NEED FOR MANUAL START/END-POINTING AND TRIGGER PHRASES

CROSS-REFERENCE TO RELATED APPLICATIONS

This application is a continuation of U.S. patent application Ser. No. 18/231,135, filed on Aug. 7, 2023, entitled REDUCING THE NEED FOR MANUAL START/END-POINTING AND TRIGGER PHRASES, which is a continuation of U.S. patent application Ser. No. 17/461,018, now U.S. Pat. No. 11,810,562, filed on Aug. 30, 2021, entitled REDUCING THE NEED FOR MANUAL START/END-POINTING AND TRIGGER PHRASES, which is a continuation of U.S. patent application Ser. No. 16/800,456, now U.S. Pat. No. 11,133,008, filed on Feb. 25, 2020, entitled REDUCING THE NEED FOR MANUAL START/END-POINTING AND TRIGGER PHRASES, which is a continuation of U.S. patent application Ser. No. 16/530,708, filed on Aug. 2, 2019, now U.S. Pat. No. 10,770,073, entitled REDUCING THE NEED FOR MANUAL START/END-POINTING AND TRIGGER PHRASES, which is a continuation of U.S. patent application Ser. No. 15/656,793, U.S. Pat. No. 10,373,617, filed on Jul. 21, 2017, entitled REDUCING THE NEED FOR MANUAL START/END-POINTING AND TRIGGER PHRASES, which is a continuation of U.S. patent application Ser. No. 14/502,737, U.S. Pat. No. 9,715,875, filed on Sep. 30, 2014, entitled REDUCING THE NEED FOR MANUAL START/END-POINTING AND TRIGGER PHRASES, which claims priority from U.S. Provisional Patent Application No. 62/005,760, filed on May 30, 2014, entitled REDUCING THE NEED FOR MANUAL START/END-POINTING AND TRIGGER PHRASES. The contents of each of these applications are hereby incorporated by reference in their entireties for all purposes.

FIELD

This relates generally to speech processing and, more specifically, to the selective processing of spoken user inputs using contextual data.

BACKGROUND

Intelligent automated assistants (or virtual assistants) provide an intuitive interface between users and electronic devices. These assistants can allow users to interact with devices or systems using natural language in spoken and/or text forms. For example, a user can access the services of an electronic device by providing a spoken user input to a virtual assistant associated with the electronic device. The virtual assistant can interpret the user's intent from the spoken user input and operationalize the user's intent into tasks. The tasks can then be performed by executing one or more functions of the electronic device and a relevant output can be returned to the user in natural language form.

In order for a virtual assistant to properly process and respond to a spoken user input, the virtual assistant can first identify the beginning and end of the spoken user input within a stream of audio input using processes typically referred to as start-pointing and end-pointing, respectively. Conventional virtual assistants can identify these points based on energy levels and/or acoustic characteristics of the received audio stream or manual identification by the user. For example, some virtual assistants can require users to input a start-point identifier by pressing a physical or virtual button before speaking to the virtual assistant or by uttering a specific trigger phrase before speaking to the virtual assistant in natural language form. In response to receiving one of these start-point identifiers, the virtual assistant can interpret subsequently received audio as being the spoken user input. While these techniques can be used to clearly identify spoken user input that is directed at the virtual assistant, interacting with the virtual assistant in this way can be unnatural or difficult for the user. For example, in a back-and-forth conversation between the virtual assistant and the user, the user can be required to input the start-point identifier (e.g., pressing a button or repeating the same trigger phrase) before each spoken user input.

SUMMARY

Systems and processes for operating a virtual assistant are disclosed. One example process can include receiving, at an electronic device, an audio input, monitoring the audio input to identify a first spoken user input, identifying the first spoken user input in the audio input, and determining whether to respond to the first spoken user input based on contextual information associated with the first spoken user input. The process can further include, in response to a determination to respond to the first spoken user input: generating a response to the first spoken user input; and monitoring the audio input to identify a second spoken user input. The process can further include, in response to a determination not to respond to the first spoken user input, monitoring the audio input to identify the second spoken user input without generating the response to the first spoken user input.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to systems and processes for selectively processing and responding to a spoken user input. In one example process, audio input that includes a spoken user input can be received at a user device. The spoken user input can be identified from the audio input by identify a start-point and an end-point of the spoken user input. It can be determined whether or not the spoken user input was intended for a virtual assistant running on the user device and whether the virtual assistant should respond to the spoken user input based on contextual information. The determination can be made using a rule-based system or a probabilistic (e.g., machine learning) system. If it is determined that the spoken user input was intended for the virtual assistant and that the virtual assistant should respond to the spoken user input, the spoken user input can be processed and an appropriate response can be generated. If it is instead determined that the spoken user input was not intended for the virtual assistant, the spoken user input can be ignored and/or no response can be generated. Using contextual information to determine whether or not a spoken user input was intended for the virtual assistant can advantageously allow a user to interact with the virtual assistant without having to manually identify a start-point (e.g., by pressing a button or uttering a trigger phrase) before each spoken user input.

System Overview

Figure 1:
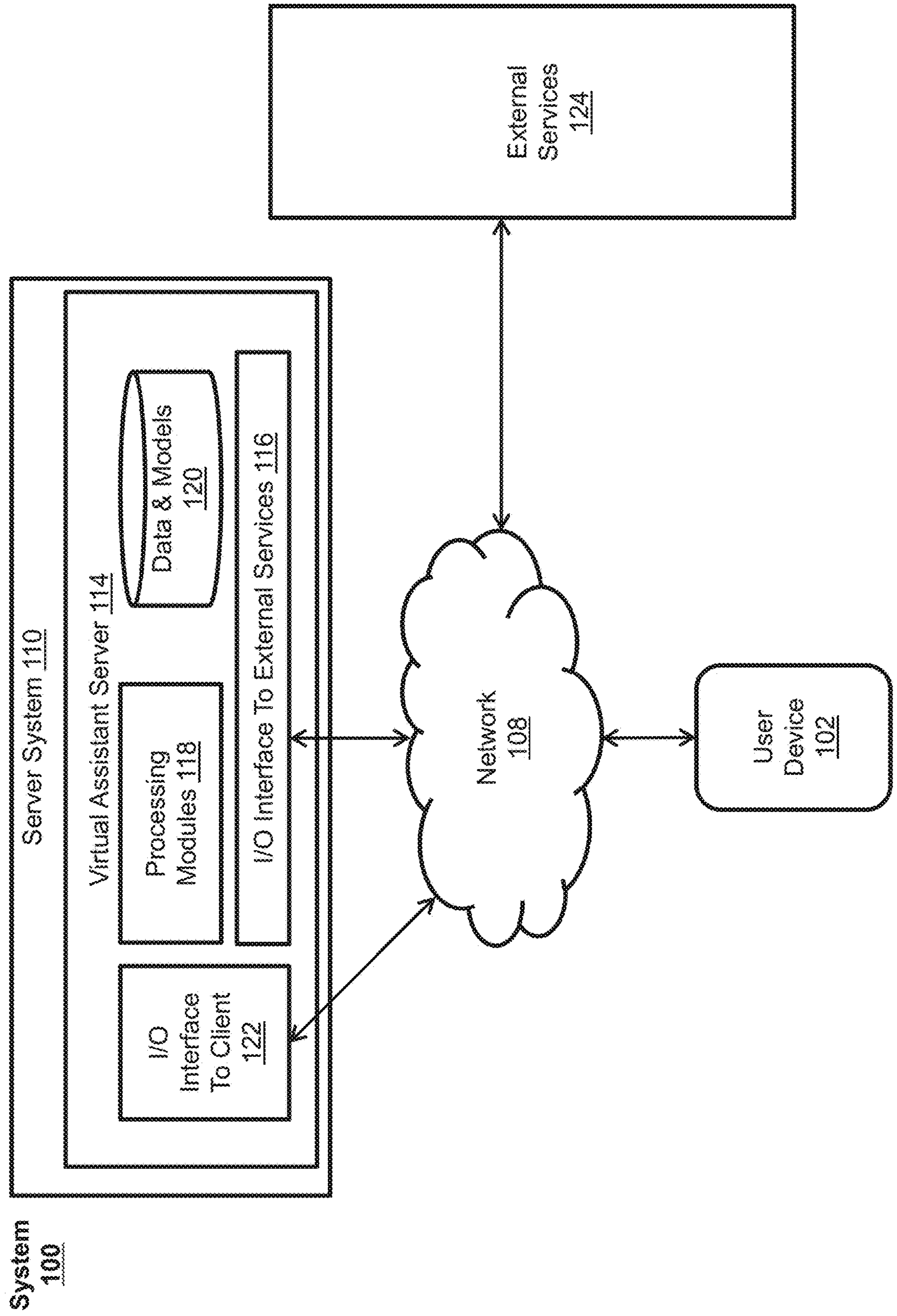
FIG. 1 illustrates an exemplary environment in which a virtual assistant can operate according to various examples.

FIG. 1 illustrates exemplary system 100 for implementing a virtual assistant according to various examples. The terms "virtual assistant," "digital assistant," "intelligent automated assistant," or "automatic digital assistant," can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

A virtual assistant can be capable of accepting a user request at least partially in the form of a natural language command, request, statement, narrative, and/or inquiry. Typically, the user request seeks either an informational answer or performance of a task by the virtual assistant. A satisfactory response to the user request can include either provision of the requested informational answer, performance of the requested task, or a combination of the two. For example, a user can ask the virtual assistant a question, such as "Where am I right now?" Based on the user's current location, the virtual assistant can answer, "You are in Central Park." The user can also request the performance of a task, for example, "Please remind me to call Mom at 4 P M today." In response, the virtual assistant can acknowledge the request and then create an appropriate reminder item in the user's electronic schedule. During performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.) and possibly using multiple devices (e.g., output text to speech via a phone headset and display text on a TV).

An example of a virtual assistant is described in Applicants' U.S. Utility application Ser. No. 12/987,982 for "Intelligent Automated Assistant," filed Jan. 10, 2011, the entire disclosure of which is incorporated herein by reference.

As shown in FIG. 1, in some examples, a virtual assistant can be implemented according to a client-server model. The virtual assistant can include a client-side portion executed on a user device 102, and a server-side portion executed on a server system 110. User device 102 can include any electronic device, such as a mobile phone, tablet computer, portable media player, desktop computer, laptop computer, PDA, television, television set-top box, wearable electronic device, or the like, and can communicate with server system 110 through one or more networks 108, which can include the Internet, an intranet, or any other wired or wireless public or private network. The client-side portion executed on user device 102 can provide client-side functionalities, such as user-facing input and output processing and communications with server system 110. Server system 110 can provide server-side functionalities for any number of clients residing on a respective user device 102.

Server system 110 can include one or more virtual assistant servers 114 that can include a client-facing I/O interface 122, one or more processing modules 118, data and model storage 120, and an I/O interface to external services 116. The client-facing I/O interface 122 can facilitate the client-facing input and output processing for virtual assistant server 114. The one or more processing modules 118 can utilize data and model storage 120 to determine the user's intent based on natural language input and perform task execution based on inferred user intent. In some examples, virtual assistant server 114 can communicate with external services 124, such as telephony services, calendar services, information services, messaging services, navigation services, and the like, through network(s) 108 for task completion or information acquisition. The I/O interface to external services 116 can facilitate such communications.

Server system 110 can be implemented on one or more standalone data processing devices or a distributed network of computers. In some examples, server system 110 can employ various virtual devices and/or services of third party service providers (e.g., third-party cloud service providers) to provide the underlying computing resources and/or infrastructure resources of server system 110.

Although the functionality of the virtual assistant is shown in FIG. 1 as including both a client-side portion and a server-side portion, in some examples, the functions of a the assistant can be implemented as a standalone application installed on a user device. In addition, the division of functionalities between the client and server portions of the virtual assistant can vary in different examples. For instance, in some examples, the client executed on user device 102 can be a thin-client that provides only user-facing input and output processing functions, and delegates all other functionalities of the virtual assistant to a backend server.

User Device

Figure 2:
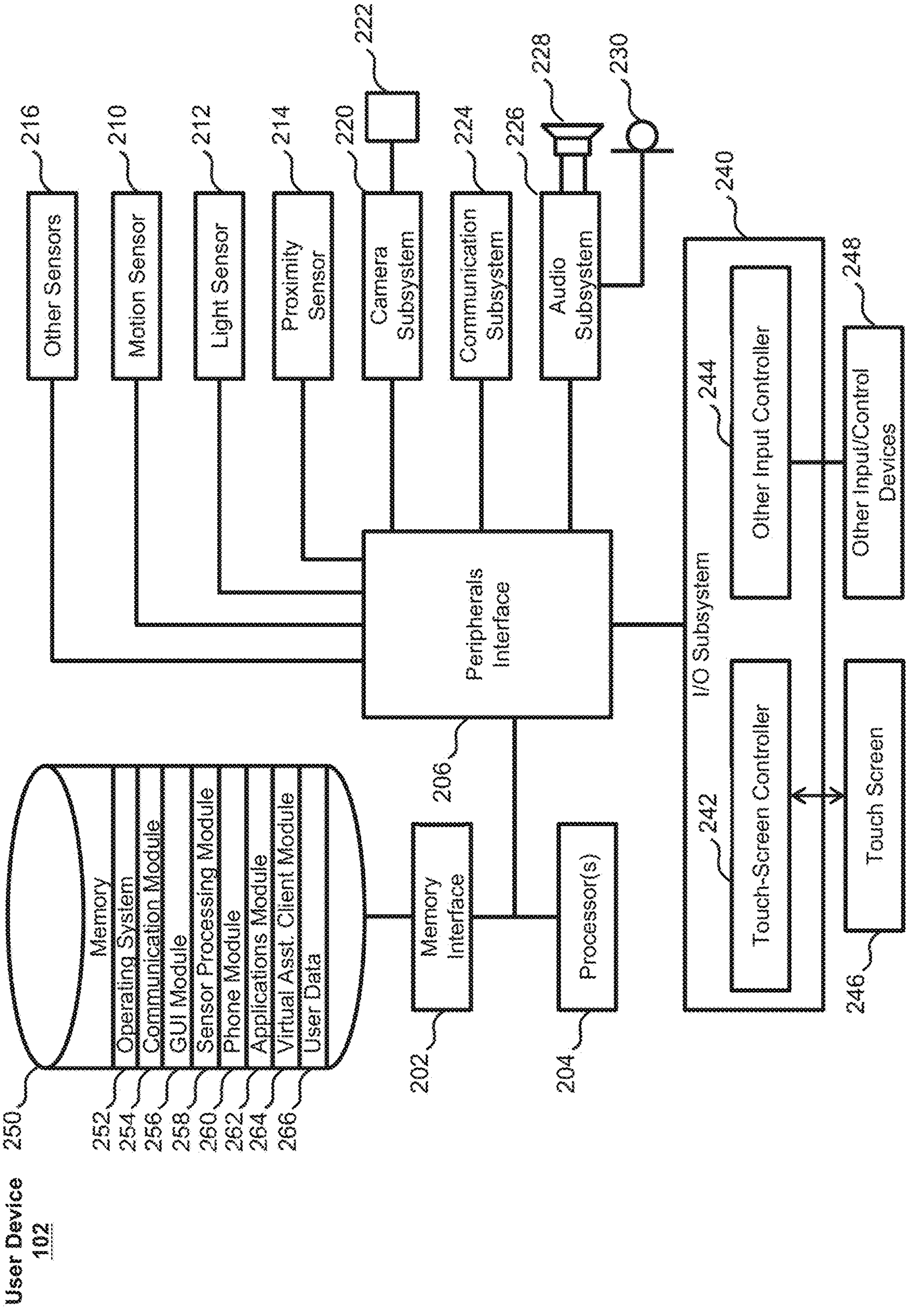
FIG. 2 illustrates an exemplary user device according to various examples.

FIG. 2 is a block diagram of a user-device 102 according to various examples. As shown, user device 102 can include a memory interface 202, one or more processors 204, and a peripherals interface 206. The various components in user device 104 can be together coupled by one or more communication buses or signal lines. User device 102 can further include various sensors, subsystems, and peripheral devices that are coupled to the peripherals interface 206. The sensors, subsystems, and peripheral devices gather information and/or facilitate various functionalities of user device 102.

For example, user device 102 can include a motion sensor 210, a light sensor 212, and a proximity sensor 214 coupled to peripherals interface 206 to facilitate orientation, light, and proximity sensing functions. One or more other sensors 216, such as a positioning system (e.g., a GPS receiver), a temperature sensor, a biometric sensor, a gyroscope, a compass, an accelerometer, and the like, are also connected to peripherals interface 206, to facilitate related functionalities In some examples, a camera subsystem 220 and an optical sensor 222 can be utilized to facilitate camera functions, such as taking photographs and recording video clips. Communication functions can be facilitated through one or more wired and/or wireless communication subsystems 224, which can include various communication ports, radio frequency receivers and transmitters, and/or optical (e.g., infrared) receivers and transmitters. An audio subsystem 226 can be coupled to speakers 228 and a microphone 230 to facilitate voice-enabled functions, such as voice recognition, voice replication, digital recording, and telephony functions.

In some examples, user device 102 can further include an I/O subsystem 240 coupled to peripherals interface 206. I/O subsystem 240 can include a touch screen controller 242 and/or other input controller(s) 244. Touch-screen controller 242 can be coupled to a touch screen 246. Touch screen 246 and the touch screen controller 242 can, for example, detect contact and movement or break thereof using any of a plurality of touch sensitivity technologies, such as capacitive, resistive, infrared, surface acoustic wave technologies, proximity sensor arrays, and the like. Other input controller(s) 244 can be coupled to other input/control devices 248, such as one or more buttons, rocker switches, a thumb-wheel, an infrared port, a USB port, and/or a pointer device such as a stylus.

In some examples, user device 102 can further include a memory interface 202 coupled to memory 250. Memory 250 can include any electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like. In some examples, a non-transitory computer-readable storage medium of memory 250 can be used to store instructions (e.g., for performing process 300 and/or 400, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing process 300 and/or 400, described below) can be stored on a non-transitory computer-readable storage medium of server system 110, or can be divided between the non-transitory computer-readable storage medium of memory 250 and the non-transitory computer-readable storage medium of server system 110. In the context of this document, a "non-transitory computer readable storage medium" can be any medium that can contain or store the program for use by or in connection with the instruction execution system, apparatus, or device.

In some examples, the memory 250 can store an operating system 252, a communication module 254, a graphical user interface module 256, a sensor processing module 258, a phone module 260, and applications module 262. Operating system 252 can include instructions for handling basic system services and for performing hardware dependent tasks. Communication module 254 can facilitate communicating with one or more additional devices, one or more computers and/or one or more servers. Graphical user interface module 256 can facilitate graphic user interface processing. Sensor processing module 258 can facilitate sensor related processing and functions. Phone module 260 can facilitate phone-related processes and functions. Applications module 262 can facilitate various functionalities of user applications, such as electronic-messaging, web browsing, media processing, navigation, imaging and/or other processes and functions.

As described herein, memory 250 can also store client-side virtual assistant instructions (e.g., in a virtual assistant client module 264) and various user data 266 (e.g., user-specific vocabulary data, preference data, and/or other data such as the user's electronic address book, to-do lists, shopping lists, etc.) to provide the client-side functionalities of the virtual assistant.

In various examples, virtual assistant client module 264 can be capable of accepting voice input (e.g., speech input), text input, touch input, and/or gestural input through various user interfaces (e.g., I/O subsystem 240, audio subsystem 226, or the like) of user device 104. Virtual assistant client module 264 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, virtual assistant client module 264 can communicate with the virtual assistant server using communication subsystems 224. Additionally, virtual assistant client module 264 can communicate with other devices, such as home automation equipment, and can thus have a physical effect on the physical world (e.g., unlocking a door) or can be embedded in such devices.

In some examples, virtual assistant client module 264 can utilize the various sensors, subsystems, and peripheral devices to gather additional information from the surrounding environment of user device 102 to establish a context associated with a user, the current user interaction, and/or the current user input. In some examples, virtual assistant client module 264 can provide the contextual information or a subset thereof with the user input to the virtual assistant server to help infer the user's intent. The virtual assistant can also use the contextual information to determine how to prepare and deliver outputs to the user. As discussed in greater detail below, the contextual information can further be used by user device 102 or server system 110 to determine whether or not a spoken user input is intended for the virtual assistant and to determine an appropriate response.

In some examples, the contextual information that accompanies the user input can include sensor information, such as lighting, ambient noise, ambient temperature, images or videos of the surrounding environment, distance to another object, and the like. The contextual information can further include information associated with the physical state of user device 102 (e.g., device orientation, device location, device temperature, power level, speed, acceleration, motion patterns, cellular signals strength, etc.) or the software state of user device 102 (e.g., running processes, installed programs, past and present network activities, background services, error logs, resources usage, front-most application, etc.). Any of these types of contextual information can be provided to the virtual assistant server as contextual information associated with a user input. Additionally, the contextual information can further include biometric user data, such as heart rate, hand temperature, voice quality, facial expression, etc.

In some examples, virtual assistant client module 264 can selectively provide information (e.g., user data 266) stored on user device 102 in response to requests from the virtual assistant server. Virtual assistant client module 264 can also elicit additional input from the user via a natural language dialogue or other user interfaces upon request by virtual assistant server 114. Virtual assistant client module 264 can pass the additional input to virtual assistant server 114 to help virtual assistant server 114 in intent inference and/or fulfillment of the user's intent expressed in the user request.

In various examples, memory 250 can include additional instructions or fewer instructions. Furthermore, various functions of user device 102 can be implemented in hardware and/or in firmware, including in one or more signal processing and/or application specific integrated circuits.

Processes for Operating the Virtual Assistant

Figure 3:
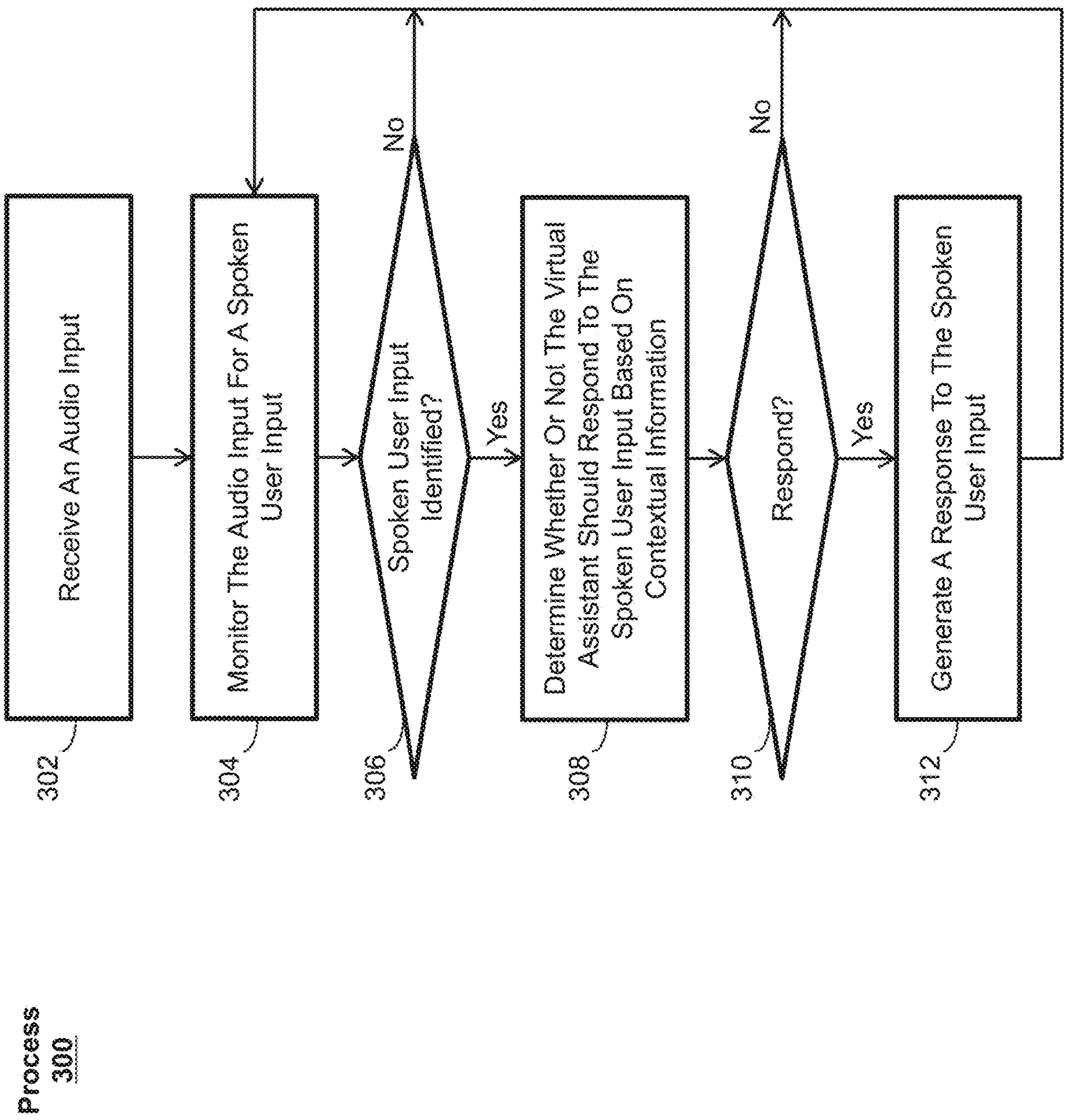
FIG. 3 illustrates an exemplary process for selectively processing and responding to a spoken user input using contextual information according to various examples.

FIG. 3 illustrates an exemplary process 300 that can be performed to selectively process and respond to a user input (e.g., a spoken user input) using contextual information according to various examples. In some examples, process 300 can be performed using a system similar or identical to system 100, shown in FIG. 1.

At block 302, an audio input can be received at a user device. The audio input can include any detectable sound, such as music, a user's voice, background noise, a combination thereof, or the like. In some examples, a user device (e.g., user device 102) can receive audio input that includes a user's natural language speech via a microphone (e.g., microphone 230). The microphone can convert the audio input into an analog or digital representation and provide the audio data to one or more processors (e.g., processor(s) 204). While shown as being discrete from the other blocks of process 300, it should be appreciated that, in some examples, audio input can continue to be received at block 302 while some or all of the other blocks of process 300 are being performed.

At block 304, the audio input received at block 302 can be monitored to identify a segment of the audio input that includes or potentially includes a spoken user input. In some examples, this can include monitoring one or more characteristics of the audio input to identify a start-point and an end-point of the spoken user input within the audio input. The start and end-points can be identified using any known start/end-pointing algorithm, such as those relying on energy features of the audio input (e.g., short-time energy and zero-crossing rate) to distinguish user speech from background noise in the audio input. In some examples, the processor(s) of the user device can analyze the energy of the audio data received from the device's microphone to identify segments of the audio input that are sufficiently high in energy and have zero-crossing rates characteristic of user speech. In other examples, the user device can transmit the audio data to a remote server (e.g., virtual assistant server 114) capable of determining the start and end-points of the spoken user input.

In some examples, block 304 can further include performing a speech-to-text conversion operation on the detected spoken user input either locally on the device or by transmitting the audio data to a remote server capable of such an operation. In other examples, block 304 may not include performing a speech-to-text conversion operation. Instead, the speech-to-text conversion operation can be performed at block 312 after determining that the virtual assistant should respond to the spoken user input at block 308.

At block 306, it can be determined whether or not a spoken user input was identified while monitoring the audio input at block 304. If no spoken user input was identified, the process can return to block 304. If, however, a spoken user input was identified, the process can proceed to block 308.

At block 308, it can be determined whether or not the virtual assistant should respond to the spoken user input by determining whether or not the spoken user input identified at block 304 was intended for the virtual assistant (e.g., the user directed the spoken user input at the virtual assistant and expects the virtual assistant to perform a task or provide a response based on the spoken user input) based on contextual information. Various example sources of contextual information that can be used at block 308 to determine whether or not the spoken user input was intended for the virtual assistant are described below. Block 308 can be performed by the user device, a remote server (e.g., virtual assistant server 114), or a combination thereof.

In some examples, a probabilistic system can be used to determine whether or not the virtual assistant should respond to the spoken user input by determining a likelihood or confidence score that the user intended for the spoken user input to be directed at the virtual assistant. The probabilistic system can include a machine learning system or classifiers, such as neural networks. Additionally, the probabilistic system can learn and adapt to the user using a feedback loop. In these probabilistic system examples, the likelihood or confidence score can include a numerical or other representation of a calculated probability that the user intended for the spoken user input to be directed at the virtual assistant. The calculated likelihood or confidence score can then be compared to a threshold value to determine whether or not the virtual assistant should respond to the spoken user input. For example, if the calculated likelihood or confidence score is greater than the threshold value, it can be determined that the spoken user input was intended for the virtual assistant. If, however, the calculated likelihood or confidence score is not greater than the threshold value, it can be determined that the spoken user input was not intended for the virtual assistant.

The likelihood or confidence score can be determined in any number of ways. For example, the determination can generally include summing positive, negative, and/or neutral contributions from any number of different types of contextual information. For example, the likelihood or confidence score can be calculated using the general formula of $P=C_1+C_2+C_3+\ldots+C_N$, where P represents the likelihood or confidence score that the spoken user input was intended for the user device and $C_1 \ldots C_N$ can be positive, negative, or zero values representing the positive, negative, or neutral contributions to the likelihood or confidence score from the N different types of contextual information. A positive contribution can represent a type of contextual information that suggests that the spoken user input was intended for the virtual assistant, a negative contribution can represent a type of contextual information that suggests that the spoken user input was not intended for the virtual assistant, and a neutral contribution can represent a type of contextual information that is neutral regarding the likelihood that the spoken user input was intended for the virtual assistant. Thus, a large P value can indicate that the spoken user input was likely intended for the virtual assistant, while small or negative P values can indicate that the spoken user input was likely not intended for the virtual assistant. The weight or value that each contextual information contribution adds to the likelihood or confidence score determination can be uniform or non-uniform. Additionally, the weight or value that each contribution adds to the likelihood or confidence score determination can depend on the value of the particular type of contextual information. For example, if contribution $C_1$ depends on the volume of the user's voice, the sign (e.g., +/−) and/or magnitude of $C_1$ can depend on a numerical representation of the volume of the user's voice.

While an example probabilistic system is provided above, it should be appreciated that modifications can be made to the described system and/or other scoring conventions can be used. For example, a positive contribution can instead represent a type of contextual information that suggests that the spoken user input was not intended for the virtual assistant and a negative contribution can instead represent a type of contextual information that suggests that the spoken user input was intended for the virtual assistant. In other examples, the contributions from the different types of contextual information can all be positive, with larger positive values indicating that the contextual information suggests that the spoken user input was intended (alternatively, not intended) for the virtual assistant. In yet other examples, the contributions from the different types of contextual information can all be negative, with larger negative values indicating that the contextual information suggests that the spoken user input was intended (alternatively, not intended) for the virtual assistant.

In other examples, a rule-based system can be used to determine whether or not the virtual assistant should respond to the spoken user input by evaluating any number of conditional rules that are based on the contextual information to determine whether or not the spoken user input was intended for the virtual assistant. In some examples, the rule-based systems can include the use of a decision tree. In other examples, the rules used by the rule-based system can be learned based on user behavior. To illustrate an example rule-based system, a first rule can include the condition that if the user is facing the device and the volume of the user's voice is above a threshold volume, then it can be determined that the user intended for the spoken user input to be directed at the virtual assistant. A second rule can include the condition that if, according to the user's calendar, the user is in a meeting, then it can be determined that the user did not intend for the spoken user input to be directed at the virtual assistant. Other similar rules containing any number of conditions that depend on any type of contextual information can be used to cause the device to determine that the spoken user input was or was not intended for the virtual assistant. In some examples, the rules can be ranked, such that if multiple rules evaluate to being true, the outcome of the higher ranking rule can be used as the result of the determination operation performed at block 308. Additionally, in some examples, if none of the rules evaluate to being true, a default determination that the spoken user input was intended for the virtual assistant (or that the spoken user input was not intended for the virtual assistant) can be made.

At block 310, if it was determined at block 308 that the virtual assistant should not respond to the spoken user input because the spoken user input was not intended for the virtual assistant, the process can return to block 304 to monitor the audio input for a spoken user input. In some examples, process 300 can proceed from block 310 to block 304 without generating a response the spoken user input. For example, process 300 can proceed from block 310 to block 304 without performing one or more of performing speech-to-text conversion, inferring user intent, identifying a task flow with steps and parameters designed to accomplish the inferred user intent, inputting specific requirements from the inferred user intent into the task flow, executing the task flow by invoking programs, methods, services, APIs, or the like, and generating output responses to the user in an audible (e.g., speech) and/or visual form. If it was instead determined at block 308 that the virtual assistant should respond to the spoken user input because the spoken user input was intended for the virtual assistant, the process can proceed to block 312.

At block 312, a response to the spoken user input can be generated by the user device and/or a remote server. In some examples, generating a response to the spoken user input can include one or more of performing speech-to-text conversion, inferring user intent, identifying a task flow with steps and parameters designed to accomplish the inferred user intent, inputting specific requirements from the inferred user intent into the task flow, executing the task flow by invoking programs, methods, services, APIs, or the like, and generating output responses to the user in an audible (e.g., speech) and/or visual form. For example, block 312 can include performing an operation requested by the user (e.g., opening an application, sending a message, calling a contact, performing a search query, creating a calendar appointment, or the like), providing information requested by the user (e.g., returning the result of a search query), performing an action that causes a change in the physical environment (e.g., communicating with a home appliance to lock a door), or the like. The operations can be performed locally on the user device, by transmitting data to a remote server for processing, or a combination thereof. After processing the spoken user input to provide an appropriate response at block 312, the process can return to block 304.

Using process 300, a virtual assistant implemented by a user device can selectively ignore or respond to spoken user inputs in a way that allows a user to speak to the virtual assistant in natural language without having to manually enter a start-point identifier, such as by pressing a physical or virtual button before speaking to the virtual assistant or by uttering a specific trigger phrase (e.g., a predetermined word or sequence of words, such as "Hey Siri") before speaking to the virtual assistant in natural language. In some examples, process 300 can be used to process all spoken user inputs received by user device 102.

To illustrate the operation of FIG. 3, one example interaction between a user and the virtual assistant can begin by the user verbally asking a question, such as "what time is it in New York?", without the user having to manually enter a start-point identifier, such as by pressing a physical or virtual button before speaking to the virtual assistant or by uttering a specific trigger phrase (e.g., a predetermined word or sequence of words, such as "Hey Siri"). At block 302, the user device can receive an audio input that includes the user's question. At block 304, the audio input can be monitored to detect a spoken user input. Since the audio input included the user's question, it can be determined at block 306 that the spoken user input was identified. At block 308, it can be determined, based on contextual information associated with the identified spoken user input, whether the virtual assistant should respond to the user's question. In this example, it can be determined (using either the rule-based or probabilistic system) that the virtual assistant should respond to the user's question because the contextual information indicates that the user was looking at the user device while speaking the question and that the volume of the user's voice was above a threshold volume. Thus, the process can proceed to block 310 and 312, where a response to the user's question can be generated. For example, at block 312, the user's question can be processed to determine the user's intent, identify tasks to be performed, and execute functions to determine and display a time of "5:01 p.m." in response to the user's query. Process 300 can then return to block 304.

The user can then verbally ask another question, such as "what is the weather there?", without the user having to manually enter a start-point identifier, such as by pressing a physical or virtual button before speaking to the virtual assistant or by uttering a specific trigger phrase (e.g., a predetermined word or sequence of words, such as "Hey Siri"). The audio input being received by the user device and that includes the user's second question can be monitored at block 304. Since the audio input included the user's second question, it can be determined at block 306 that the spoken user input was identified. At block 308, it can be determined, based on contextual information associated with the identified spoken user input, whether the virtual assistant should respond to the user's question. In this example, it can be determined (using either the rule-based or probabilistic system) that the virtual assistant should respond to the user's question because the contextual information indicates that the user asked the second question within a threshold length of time from receiving an answer to the first question, suggesting that the second question was part of the same conversation. Thus, the process can proceed to block 310 and 312, where a response to the user's question can be generated. For example, at block 312, the user's question can be processed to determine the user's intent, identify tasks to be performed, and execute functions to determine and display a message saying that "the weather is sunny" in response to the user's query. Process 300 can then return to block 304 to monitor the audio input for additional spoken user inputs.

Figure 4:
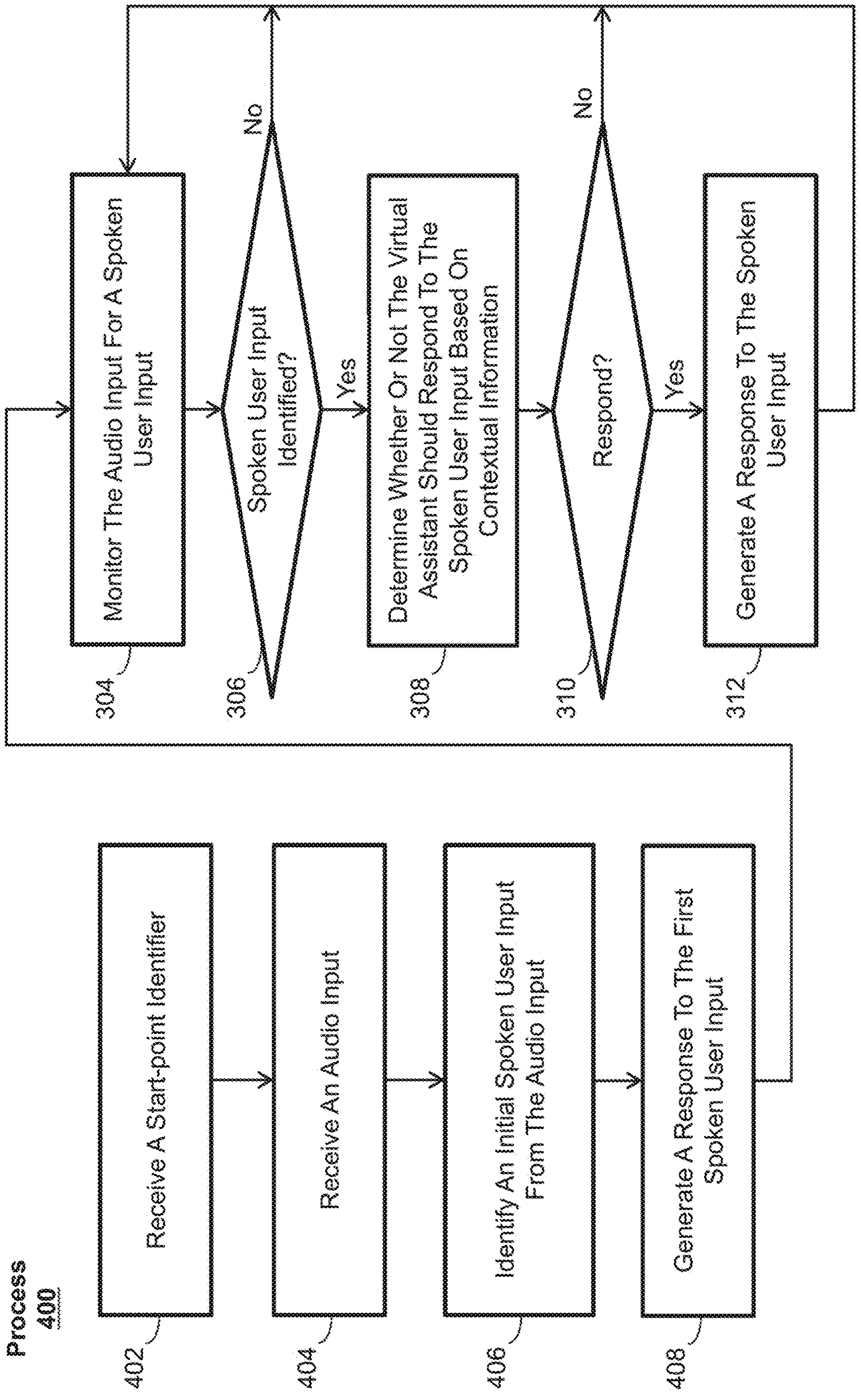
FIG. 4 illustrates another exemplary process for selectively processing and responding to a spoken user input using contextual information according to various examples.

In other examples, user device 102 can require that a start-point identifier be manually entered by the user prior to process 300 being invoked. For example, a user can be required to utter a trigger phrase or press a physical or virtual button before first speaking to the virtual assistant. In response to the manual start-point identifier, process 300 can be performed as described above and subsequent spoken user inputs can be processed without requiring user to enter additional start-point identifiers. FIG. 4 shows an example process for performing this modified interaction.

At block 402, a start-point identifier can be received. The start-point identifier can include a trigger phrase spoken by the user, a selection of a physical or virtual button, or other manual input received from the user. At block 404, an audio input can be received in a manner similar or identical to block 302, described above. At block 406, an initial spoken user input can be identified from the audio input received at block 404 by identifying an end-point for the first spoken user input. The end-point can be identified based on energy features of the audio input, as described above. At block 408, a response to the first spoken user input can be generated in a manner similar or identical to block 312, described above. However, in contrast to block 312, block 408 can be performed without determining whether or not the virtual assistant should respond to the first spoken user input in a manner similar to that of block 308, since a manual start-point identifier was received at block 402. After generating the response to the first spoken user input at block 408, the process can proceed to block 304. In some examples, block 302 can be omitted since the audio input was previously received at block 404. Blocks 304, 306, 308, 310, and 312 can be repeatedly performed, as described above with respect to FIG. 3.

In some examples, once block 304 is invoked in process 400, blocks 304, 306, 308, 310, and 312 can continue to be performed for all subsequent spoken user inputs. In other examples, performance of blocks 304, 306, 308, 310, and 312 can be stopped if no spoken user input is received (e.g., at blocks 304 and 306) for greater than a threshold length of time, resulting in the user having to enter a start-point identifier at block 402 before inputting the next spoken user input.

Using process 400, a virtual assistant implemented by a user device can only require a user to enter a manual start-point identifier once, and can allow the virtual assistant to selectively ignore or respond to subsequent spoken user inputs without requiring the user to repeatedly enter a manual start-point identifier before each subsequent spoken user input.

To illustrate the operation of FIG. 4, one example interaction between a user and the virtual assistant can begin by the user manually entering a start-point identifier, such as by pressing a physical or virtual button before speaking to the virtual assistant or by uttering a specific trigger phrase (e.g., a predetermined word or sequence of words, such as "Hey Siri"). The start-point identifier can be received at block 402. The user can then verbally ask a question, such as "what time is it in New York?" The user device can receive an audio input that includes the user's question at block 404. At block 406, the spoken user input can be identified from the audio input by identifying an end-point of the user's question. At block 408, a response to the user's question can be generated without performing a determination step similar to block 308, since the user manually identified the input as being directed at the virtual assistant at block 402. For example, at block 408, the user's question can be processed to determine the user's intent, identify tasks to be performed, and execute functions to determine and display a time of "5:01 p.m." in response to the user's query. Process 400 can then proceed to block 304.

The user can then verbally ask another question, such as "what is the weather like there?", without the user having to manually enter a start-point identifier, such as by pressing a physical or virtual button before speaking to the virtual assistant or by uttering a specific trigger phrase (e.g., a predetermined word or sequence of words, such as "Hey Siri"). The audio input being received by the user device and that includes the user's second question can be repeatedly monitored at blocks 304 and 306. Since the audio input included the user's second question, it can be determined at block 306 that the spoken user input was identified. At block 308, it can be determined, based on contextual information associated with the identified spoken user input, whether the virtual assistant should respond to the user's question. In this example, it can be determined (using either the rule-based or probabilistic system) that the virtual assistant should respond to the user's question because the contextual information indicates that the user asked the second question within a threshold length of time from receiving an answer to the first question, suggesting that the second question was part of the same conversation. Thus, the process can proceed to block 310 and 312, where a response to the user's question can be generated. For example, at block 312, the user's question can be processed to determine the user's intent, identify tasks to be performed, and execute functions to determine and display a message saying that "the weather is sunny" in response to the user's query. Process 300 can then return to block 304 to monitor the audio input for additional spoken user inputs.

In some examples, while process 300 or blocks 304, 306, 308, 310, and 312 of process 400 are being performed, a visual indicator can be displayed on a display of user device 102 to indicate that user device 102 is capable of accepting a spoken user input in natural language form without the use of trigger phrases or other manual inputs to indicate that a spoken user input is intended for user device 102.

Additionally, while the blocks of processes 300 and 400 are shown and described in a particular order, it should be appreciated that the blocks of processes 300 and 400 can be performed in other orders or at the same time. For example, in process 300, user device 102 can continually receive an audio input at block 302 while some or all of blocks 304, 306, 308, 310, and 312 can be performed. Similarly, in process 400, user device 102 can continually receive an audio input at block 404 while some or all of blocks 304, 306, 308, 310, 312, 406, and 408 can be performed.

It should be appreciated that the blocks of processes 300 and 400 can be performed on user device 102, server system 110, or a combination of user device 102 and server system 110. For instance, in some examples, all blocks of process 300 or 400 can be performed on user device 102. In other examples, all blocks of process 300 or 400 can be performed at server system 110. In yet other examples, some blocks of process 300 or 400 can be performed at user device 102, while other blocks of process 300 or 400 can be performed at server system 110.

Contextual Information

As discussed above, any number of types of contextual information, which can also include the features used by a classifier or machine learning system, can be used by processor(s) 204 and/or server system 110 at block 308 of process 300 or 400 to determine whether or not a spoken user input was intended for a virtual assistant. Described below are some example types of contextual information and ways that these types of contextual information can be used to determine whether or not a spoken user input was intended for a virtual assistant at block 308 of process 300.

In some examples, the contextual information can include time data from a clock or timer of user device 102. The time data can represent a length of time between any desired two or more events. For example, the time data can represent a length of time between the spoken user input being received and a time that a previous user input, such as a button press, mouse click, screen touch, previous spoken user input, or the like, was received. Generally, in some examples, a shorter length of time between the two events can be indicative that the user was more likely to have intended for the current spoken user input to be directed at the virtual assistant, while a longer length of time between events can be indicative that the user was less likely to have intended for the current spoken user input to be directed at the virtual assistant. However, in other examples, a longer length of time between the two events can be indicative that the user was more likely to have intended for the current spoken user input to be directed at the virtual assistant, while a shorter length of time between events can be indicative that the user was less likely to have intended for the current spoken user input to be directed at the virtual assistant.

In one example rule-based system, one rule that can be used (alone, in combination with other rules, or as one of multiple conditions in other rules) is that if the length of time between consecutive spoken user inputs is less than a threshold duration, then it can be determined that the user intended for the current spoken user input to be directed at the virtual assistant. Another rule that can be used (alone, in combination with other rules, or as one of multiple conditions in other rules) is that if the length of time between consecutive spoken user inputs is greater than or equal to the threshold duration, it can be determined that the user did not intend for the current spoken user input to be directed at the virtual assistant.

In one example probabilistic system, the length of time between consecutive spoken user inputs can be used to calculate a positive, negative, or neutral contribution to a final likelihood or confidence score, where the value of the contribution can have a linear or non-linear relationship with the value of the length of time. For example, a length of time less than a threshold duration can contribute a positive value to the final likelihood or confidence score, where the magnitude of the positive value can be greater for shorter lengths of time. Similarly, a length of time greater than or equal to the threshold duration can contribute a zero or negative value to the final likelihood or confidence score, where the magnitude of the negative value can be greater for longer lengths of time. In some examples, the length of time between consecutive spoken user inputs can be used to train a machine learning system of the probabilistic system.

In some examples, the contextual information can include conversation history data from memory 250 or another storage device located within or remote from user device 102. The conversation history data can include any number of previous spoken user inputs received from the user and/or responses generated and provided to the user by the user device. In some examples, the previously received spoken user inputs can be compared with the current spoken user input to determine if the current spoken user input is the same as a previously received spoken user input. In these examples, a match between the previous and current spoken user input (e.g., caused by the user repeating him or herself) can be indicative that the user was more likely to have intended for the current spoken user input to be directed at the virtual assistant, while no match between the previous and current spoken user input can be indicative that the user was less likely to have intended for the current spoken user input to be directed at the virtual assistant or can be neutral regarding the likelihood that the user intended for the current spoken user input to be directed at the virtual assistant. In some examples, the user repeating him or herself can be used in a feedback loop to train a machine learning system of the probabilistic system.

In one example rule-based system, one rule that can be used (alone, in combination with other rules, or as one of multiple conditions in other rules) is that if the current spoken user input is the same as or matches the previously received spoken user input, then it can be determined that the user intended for the current spoken user input to be directed at the virtual assistant. Another rule that can be used (alone, in combination with other rules, or as one of multiple conditions in other rules) is that if the current spoken user input is not the same as the previously received spoken user input, it can be determined that the user did not intend for the current spoken user input to be directed at the virtual assistant.

In one example probabilistic system, a determination that a previously received spoken user input is the same as or matches the current spoken user input can contribute a positive value to the final likelihood or confidence score, while no match between the previously received spoken user input and the current spoken user input can contribute a zero or a negative value to the final likelihood or confidence score. The magnitude of the positive or negative contribution can be adjusted based on the overall system design.

In other examples, a semantic similarity analysis can be performed on the current spoken user input and some or all of the conversation history data. In some examples, this can include computing a similarity of the determined user intents (e.g., the result of the natural language interpretation phase that takes the form of a tuple <command, parameters>). In other examples, performing the semantic similarity analysis to determine the semantic distance can include determining an edit distance combined with a similarity matrix. In these examples, a semantic distance between the current spoken user input and one or more of the previously received spoken user inputs or responses generated and provided to the user by the user device can be determined and used to determine the likelihood or confidence score that the spoken user input was intend for the virtual assistant at block 308. In these examples, a small semantic distance between the current spoken user input and one or more of the previously received spoken user inputs (e.g., the immediately preceding spoken user input) and/or one or more of the responses generated and provided to the user by the user device can be indicative that the user was more likely to have intended for the current spoken user input to be directed at the virtual assistant, while a large semantic distance between the current spoken user input and one or more of the previously received spoken user inputs (e.g., the immediately preceding spoken user input) and/or one or more of the responses generated and provided to the user by the user device can be indicative that the user was less likely to have intended for the current spoken user input to be directed at the virtual assistant.

In one example rule-based system, one rule that can be used (alone, in combination with other rules, or as one of multiple conditions in other rules) is that if a semantic distance between the current spoken user input and one or more previous spoken user inputs or responses generated by the user device is less than a threshold value, then it can be determined that the user intended for the current spoken user input to be directed at the virtual assistant. Another rule that can be used (alone, in combination with other rules, or as one of multiple conditions in other rules) is that if the semantic distance between the current spoken user input and one or more previous spoken user inputs or responses generated by the user device is greater than or equal to the threshold value, it can be determined that the user did not intend for the current spoken user input to be directed at the virtual assistant.

In one example probabilistic system, a semantic distance between the current spoken user input and one or more previous spoken user inputs or responses generated by the user device can be used to calculate a positive, negative, or neutral contribution to a final likelihood or confidence score, where the value of the contribution can have a linear or non-linear relationship with the semantic distance. For example, a semantic distance that is less than a threshold value can contribute a positive value to the final likelihood or confidence score, where the magnitude of the positive value can be greater for smaller semantic distances. Similarly, a semantic distance that is greater than or equal to the threshold value can contribute a zero or negative value to the final likelihood or confidence score, where the magnitude of the negative value can be greater for larger semantic distances.

In some examples, the contextual information can include distance data from a distance sensor, such as proximity sensor 214, of user device 102. The distance data can represent a spatial distance between the user device and the user (e.g., a distance between the user device and the user's face). Generally, in some examples, a shorter distance between the user device and the user can be indicative that the user was more likely to have intended for the current spoken user input to be directed at the virtual assistant, while a longer distance between the user device and the user can be indicative that the user was less likely to have intended for the current spoken user input to be directed at the virtual assistant. However, in other examples, a longer distance between the user device and the user can be indicative that the user was more likely to have intended for the current spoken user input to be directed at the virtual assistant, while a shorter distance between the user device and the user can be indicative that the user was less likely to have intended for the current spoken user input to be directed at the virtual assistant.

In one example rule-based system, one rule that can be used (alone, in combination with other rules, or as one of multiple conditions in other rules) is that if the distance between the user device and the user is less than a threshold distance, then it can be determined that the user intended for the current spoken user input to be directed at the virtual assistant. Another rule that can be used (alone, in combination with other rules, or as one of multiple conditions in other rules) is that if the distance between the user device and the user is greater than or equal to the threshold distance, it can be determined that the user did not intend for the current spoken user input to be directed at the virtual assistant.

In one example probabilistic system, the distance between the user device and the user can be used to calculate a positive, negative, or neutral contribution to a final likelihood or confidence score, where the value of the contribution can have a linear or non-linear relationship with the value of the distance between the user device and the user. For example, a distance less than a threshold distance can contribute a positive value to the final likelihood or confidence score, where the magnitude of the positive value can be greater for shorter distances. Similarly, a distance greater than or equal to the threshold distance can contribute a zero or negative value to the final likelihood or confidence score, where the magnitude of the negative value can be greater for greater distances.

In some examples, the contextual information can include audio data from audio subsystem 226. The audio data can include a representation of a volume of the spoken user input. Generally, in some examples, a higher volume of the spoken user input can be indicative that the user was more likely to have intended for the current spoken user input to be directed at the virtual assistant, while a lower volume of the spoken user input can be indicative that the user was less likely to have intended for the current spoken user input to be directed at the virtual assistant. However, in other examples, a lower volume of the spoken user input can be indicative that the user was more likely to have intended for the current spoken user input to be directed at the virtual assistant, while a higher volume of the spoken user input can be indicative that the user was less likely to have intended for the current spoken user input to be directed at the virtual assistant.

In one example rule-based system, one rule that can be used (alone, in combination with other rules, or as one of multiple conditions in other rules) is that if the volume of the spoken user input was greater than a threshold volume, then it can be determined that the user intended for the current spoken user input to be directed at the virtual assistant. Another rule that can be used (alone, in combination with other rules, or as one of multiple conditions in other rules) is that if the volume of the spoken user input was less than or equal to the threshold volume, it can be determined that the user did not intend for the current spoken user input to be directed at the virtual assistant.

In one example probabilistic system, the volume of the spoken user input can be used to calculate a positive, negative, or neutral contribution to a final likelihood or confidence score, where the value of the contribution can have a linear or non-linear relationship with the value of the volume of the spoken user input. For example, a volume greater than a threshold volume can contribute a positive value to the final likelihood or confidence score, where the magnitude of the positive value can be greater for higher volumes. Similarly, a volume less than or equal to the threshold volume can contribute a zero or negative value to the final likelihood or confidence score, where the magnitude of the negative value can be greater for lower volumes.

In some examples, the contextual information can include audio data from audio subsystem 226. The audio data can include a representation of a volume of the spoken user input. In some examples, if a previous spoken input was ignored and the volume of a current spoken user input is higher than the previous spoken user input, this can be indicative that the user was more likely to have intended for the current spoken user input to be directed at the virtual assistant.

In one example rule-based system, one rule that can be used (alone, in combination with other rules, or as one of multiple conditions in other rules) is that if the volume of the current spoken user input is greater than a volume of the previous spoken user input, then it can be determined that the user intended for the current spoken user input to be directed at the virtual assistant. Another rule that can be used (alone, in combination with other rules, or as one of multiple conditions in other rules) is that if the volume of the current spoken user input is less than or equal to the volume of the previous spoken user input, it can be determined that the user did not intend for the current spoken user input to be directed at the virtual assistant.

In one example probabilistic system, the volume of the spoken user input can be used to calculate a positive, negative, or neutral contribution to a final likelihood or confidence score, where the value of the contribution can have a linear or non-linear relationship with the value of the volume of the spoken user input. For example, if the volume of the current spoken user input is greater than a volume of an immediately previous spoken user input, a positive value to the final likelihood or confidence score can be added. Similarly, if the volume of the current spoken user input is less than a volume of an immediate previous spoken user input, a zero or negative value can be added to the final likelihood or confidence score.

In other examples, the audio data can be analyzed using known speaker recognition techniques to determine a number of distinct speakers that are near or within audio range of the user device. In these examples, a determination that more than one speaker is present can be indicative that the user was less likely to have intended for the current spoken user input to be directed at the virtual assistant (and was instead speaking to another person nearby), while a determination that only one speaker is present can be indicative that the user was more likely to have intended for the current spoken user input to be directed at the virtual assistant.

In one example rule-based system, one rule that can be used (alone, in combination with other rules, or as one of multiple conditions in other rules) is that if it is determined that more than one speaker was present when the spoken user input was received, then it can be determined that the user did not intend for the current spoken user input to be directed at the virtual assistant. Another rule that can be used (alone, in combination with other rules, or as one of multiple conditions in other rules) is that if it is determined that only one speaker was present when the spoken user input was received, it can be determined that the user intended for the current spoken user input to be directed at the virtual assistant.

In one example probabilistic system, a determination that more than one speaker was present when the spoken user input was received can contribute a negative value to the final likelihood or confidence score, while a determination that only one speaker was present when the spoken user input was received can contribute a zero or a positive value to the final likelihood or confidence score. The magnitude of the positive or negative contribution can be adjusted based on the overall system design.

In yet other examples, the audio data can be analyzed using known speaker recognition techniques to determine whether or not the spoken user input was received from a known or an authorized user of the user device (e.g., the owner of the device) or from the same speaker as a previously received spoken user input. In these examples, a determination that the spoken user input was received from the known or authorized user or from the same speaker as a previously received spoken user input can be indicative that the user was more likely to have intended for the current spoken user input to be directed at the virtual assistant, while a determination that the spoken user input was not received from the known or authorized user or from the same speaker as a previously received spoken user input can be indicative that the user was less likely to have intended for the current spoken user input to be directed at the virtual assistant.

In one example rule-based system, one rule that can be used (alone, in combination with other rules, or as one of multiple conditions in other rules) is that if it is determined that the spoken user input was received from the known or authorized user or from the same speaker as a previously received spoken user input, then it can be determined that the user intended for the current spoken user input to be directed at the virtual assistant. Another rule that can be used (alone, in combination with other rules, or as one of multiple conditions in other rules) is that if it is determined that the spoken user input was not received from the known or authorized user or from the same speaker as a previously received spoken user input, it can be determined that the user did not intend for the current spoken user input to be directed at the virtual assistant.

In one example probabilistic system, a determination that the spoken user input was received from the known or authorized user or from the same speaker as a previously received spoken user input can contribute a positive value to the final likelihood or confidence score, while a determination that the spoken user input was not received from the known or authorized user or from the same speaker as a previously received spoken user input can contribute a zero or a negative value to the final likelihood or confidence score. The magnitude of the positive or negative contribution can be adjusted based on the overall system design.

In some examples, the contextual information can include image data from camera subsystem 220 of user device 102. The image data can represent an image or video captured by camera subsystem 220. In some examples, the image data can be used to estimate a distance between the user device and the user. For example, the size of the user within the image can be used to estimate the distance between the user device and the user. The estimated distance between the user device and the user can be used in a rule-based or probabilistic system in a manner similar or identical to the distance data from proximity sensor 214, described above.

In other examples, the image data can be analyzed (e.g., using known eye-tracking techniques) to determine whether or not the user is looking at or facing the user device when the spoken user input was received. In these examples, a determination that the user was looking at the user device when the spoken user input was received can be indicative that the user is more likely to have intended for the current spoken user input to be directed at the virtual assistant, while a determination that the user was not looking at the user device when the spoken user input was received can be indicative that the user was less likely to have intended for the current spoken user input to be directed at the virtual assistant or can be neutral regarding the likelihood that the user intended for the current spoken user input to be directed at the virtual assistant.

In one example rule-based system, one rule that can be used (alone, in combination with other rules, or as one of multiple conditions in other rules) is that if it is determined that the user was looking at the user device when the spoken user input was received, then it can be determined that the user intended for the current spoken user input to be directed at the virtual assistant. Another rule that can be used (alone, in combination with other rules, or as one of multiple conditions in other rules) is that if it is determined that the user was not looking at the user device when the spoken user input was received, it can be determined that the user did not intend for the current spoken user input to be directed at the virtual assistant.

In one example probabilistic system, a determination that the user was looking at the user device when the spoken user input was received can contribute a positive value to the final likelihood or confidence score, while a determination that the user was not looking at the user device when the spoken user input was received can contribute a zero or a negative value to the final likelihood or confidence score. The magnitude of the positive or negative contribution can be adjusted based on the overall system design.

In yet other examples, the image data can be analyzed to determine an orientation of the device relative to the user. For example, the image data can be analyzed using known facial recognition techniques to determine whether or not the user is positioned in front of the user device based on whether or not the user appears in the field of view of optical sensor 222. Similarly, the image data can be analyzed using known image recognition techniques to determine whether or not the user is performing a particular action (e.g., pointing at the user device, gesturing at the user device, or the like) or positioned in a predefined way (e.g., sitting in front of a television, holding a remote, or the like). In these examples, a determination that the user was in front of the user device, performing a particular action, or positioned in a predefined way when the spoken user input was received can be indicative that the user was more likely to have intended for the current spoken user input to be directed at the virtual assistant, while a determination that the user was not in front of the user device, was not performing a particular action, or was not positioned in a predefined way when the spoken user input was received can be indicative that the user was less likely to have intended for the current spoken user input to be directed at the virtual assistant or can be neutral regarding the likelihood that the user intended for the current spoken user input to be directed at the virtual assistant.

In one example rule-based system, one rule that can be used (alone, in combination with other rules, or as one of multiple conditions in other rules) is that if it is determined that the user was in front of the user device, performing a particular action, or positioned in a predefined way when the spoken user input was received, then it can be determined that the user intended for the current spoken user input to be directed at the virtual assistant. Another rule that can be used (alone, in combination with other rules, or as one of multiple conditions in other rules) is that if it is determined that the user was not in front of the user device, was not performing a particular action, or was not positioned in a predefined way when the spoken user input was received, it can be determined that the user did not intend for the current spoken user input to be directed at the virtual assistant.

In one example probabilistic system, a determination that the user was in front of the user device, performing a particular action, or positioned in a predefined way when the spoken user input was received can contribute a positive value to the final likelihood or confidence score, while a determination that the user was not in front of the user device, was not performing a particular action, or was not positioned in a predefined way when the spoken user input was received can contribute a zero or a negative value to the final likelihood or confidence score. The magnitude of the positive or negative contribution can be adjusted based on the overall system design.

In some examples, the contextual information can include orientation data from motion sensor 210 of user device 102. Motion sensor 210 can include any type of orientation sensor, such as an inclinometer, compass, gyroscope, or the like, that is capable of generating orientation data that represents a free-space orientation of the user device. In some examples, certain orientations of the user device (e.g., the front of the device is facing up, the device is upright, the device is in an orientation in which a display of the device can be viewed by the user, or the like) can be indicative that the user was more likely to have intended for the current spoken user input to be directed at the virtual assistant, while other orientations of the user device (e.g., the front of the device is facing down, the device is upside down, the device is in an orientation in which a display of the device cannot be viewed by the user, or the like) can be indicative that the user was less likely to have intended for the current spoken user input to be directed at the virtual assistant.

In one example rule-based system, one rule that can be used (alone, in combination with other rules, or as one of multiple conditions in other rules) is that if the device was in one of a set of orientations (e.g., the front of the device is facing up, the device is upright, the device is in an orientation in which a display of the device can be viewed by the user, or the like) when the spoken user input was received, then it can be determined that the user intended for the current spoken user input to be directed at the virtual assistant. Another rule that can be used (alone, in combination with other rules, or as one of multiple conditions in other rules) is that if the device was not in one of the set of orientations when the spoken user input was received, it can be determined that the user did not intend for the current spoken user input to be directed at the virtual assistant.

In one example probabilistic system, a determination that the user device is in one of a set of orientations (e.g., the front of the device is facing up, the device is upright, the device is in an orientation in which a display of the device can be viewed by the user, or the like) when the spoken user input was received can contribute a positive value to the final likelihood or confidence score, while a determination that user device was not in one of the set of orientations when the spoken user input was received can contribute a zero or a negative value to the final likelihood or confidence score. The magnitude of the positive or negative contribution can be adjusted based on the overall system design.

In some examples, the contextual information can include location data from a GPS receiver from other sensors 216 of user device 102. The location data can represent a geographical location of the user device. In some examples, receiving a spoken user input while the user device is in certain locations (e.g., at home, in an office, or the like) can be indicative that the user was more likely to have intended for the current spoken user input to be directed at the virtual assistant, while receiving the spoken user input while the user device is in certain other locations (e.g., at a movie theatre, in a conference room, or the like) can be indicative that the user was less likely to have intended for the current spoken user input to be directed at the virtual assistant.

In one example rule-based system, one rule that can be used (alone, in combination with other rules, or as one of multiple conditions in other rules) is that if the device was located in one of a set of locations (e.g., at home, in an office, or the like) when the spoken user input was received, then it can be determined that the user intended for the current spoken user input to be directed at the virtual assistant. Another rule that can be used (alone, in combination with other rules, or as one of multiple conditions in other rules) is that if the device was not located in one of the set of locations when the spoken user input was received, it can be determined that the user did not intend for the current spoken user input to be directed at the virtual assistant.

In one example probabilistic system, a determination that the user device was located in one of a set of locations (e.g., at home, in an office, or the like) when the spoken user input was received can contribute a positive value to the final likelihood or confidence score, while a determination that the user device was not located in one of the set of locations when the spoken user input was received can contribute a zero or a negative value to the final likelihood or confidence score. The magnitude of the positive or negative contribution can be adjusted based on the overall system design.

In some examples, the contextual information can include operating state data from memory 250 or another storage device located within or remote from user device 102. The operating state data can include any information relating to the operating state of user device, such as whether or not content is being displayed or otherwise being presented to the user, a type or identification of the content being presented to the user, an application being run by the user device, whether or not a notification has been recently presented to the user, a previous or most recent contact, a previous or most recent email, a previous or most recent SMS message, a previous or most recent phone call, calendar entries, reminders entries, webpage visits, on/off state of a display of the user device, whether or not the user device is receiving user input other than the spoken user input, settings on the user device, previous activity, or the like. In some examples, receiving the spoken user input while the user device is in certain operating states (e.g., content or other information is being displayed to the user, content or other information is being audibly presented to the user, a particular type of content is being presented to the user, a particular content is being presented to the user, such as a conversation transcript between the user and a virtual assistant, an application is being run by the user device, a notification has been recently presented to the user, the display of the user device is on, the user device is receiving user input other than the spoken user input, such as a mouse input, keyboard input, touch sensitive display input, etc., an email was recently sent/received to/from a contact or a particular contact, an SMS message was recently sent/received to/from a contact or a particular contact, a phone call was recently sent/received to/from a contact or a particular contact, a particular setting is configured on the user device, a previous activity was performed, or the like) can be indicative that the user was more likely to have intended for the current spoken user input to be directed at the virtual assistant, while receiving the spoken user input while the user device is in certain other operating states (e.g., content or other information is not being displayed to the user, content or other information is not being audibly presented to the user, a particular type of content is not being presented to the user, a particular content is not being presented to the user, such as a conversation transcript between the user and a virtual assistant, an application is not being run by the user device, a notification has not been recently presented to the user, the display of the user device is off, the user device is not receiving user input other than the spoken user input, such as a mouse input, keyboard input, touch sensitive display input, etc., an email was not recently sent/received to/from a contact or a particular contact, an SMS message was not recently sent/received to/from a contact or a particular contact, a phone call was not recently sent/received to/from a contact or a particular contact, a particular setting is not configured on the user device, a previous activity was not performed, or the like) can be indicative that the user was less likely to have intended for the current spoken user input to be directed at the virtual assistant.

In one example rule-based system, one rule that can be used (alone, in combination with other rules, or as one of multiple conditions in other rules) is that if the display of the user device was on and the user device was presenting audio information to the user when the spoken user input was received, then it can be determined that the user intended for the current spoken user input to be directed at the virtual assistant. Another rule that can be used (alone, in combination with other rules, or as one of multiple conditions in other rules) is that if the display of the user device was off and the user device was not presenting audio information to the user when the spoken user input was received, it can be determined that the user did not intend for the current spoken user input to be directed at the virtual assistant. Other types of operating state data can similarly be used to generate rules that cause a determination to be made that the spoken user input was or was not intended for the virtual assistant.

In one example probabilistic system, a determination that the display of the user device was on and that the user device was presenting audio information to the user when the spoken user input was received can contribute a positive value to the final likelihood or confidence score, while a determination that the display of the user device was off and that the user device was not presenting audio information to the user when the spoken user input was received can contribute a zero or a negative value to the final likelihood or confidence score. The magnitude of the positive or negative contribution can be adjusted based on the overall system design. It should be appreciated that other types of operating state data can be used in a similar manner to make positive, negative, or neutral contributions to the final likelihood or confidence score depending on whether or not the operating state data indicates that the state of the device is one of a predetermined set of states.

In other examples, a semantic similarly analysis can be performed on the current spoken user input and some or all of the operating state data. In these examples, a semantic distance between the current spoken user input and one or more of the components of the operating state data can be determined and used to determine whether or not the spoken user input was intend for the user device at block 308. In these examples, small semantic distance between the current spoken user input and one or more components of the operating state data can be indicative that the user was more likely to have intended for the current spoken user input to be directed at the virtual assistant, while a large semantic distance between the current spoken user input and one or more components of the operating state data can be indicative that the user was less likely to have intended for the current spoken user input to be directed at the virtual assistant.

In one example rule-based system, one rule that can be used (alone, in combination with other rules, or as one of multiple conditions in other rules) is that if a semantic distance between the current spoken user input and one or more components of the operating state data (e.g., an application being run by the user device, a notification presented to the user, a name in a contact list, a previous contact, a previous email, a previous SMS message, content being presented to the user, a command expected to be received from the user, such as requests for directions while the user device is running a map application, content navigation instructions while the user device is in an eyes-free mode, a "start" instruction after previously receiving a "stop" or "pause" instruction, etc., or the like) is less than a threshold value, then it can be determined that the user intended for the current spoken user input to be directed at the virtual assistant. Another rule that can be used (alone, in combination with other rules, or as one of multiple conditions in other rules) is that if the semantic distance between the current spoken user input and one or more components of the operating state data is greater than or equal to a threshold value, it can be determined that the user did not intend for the current spoken user input to be directed at the virtual assistant.

In one example probabilistic system, a semantic distance between the current spoken user input and one or more components of the operating state data can be used to calculate a positive, negative, or neutral contribution to a final likelihood or confidence score, where the value of the contribution can have a linear or non-linear relationship with the semantic distance. For example, a semantic distance that is less than a threshold value can contribute a positive value to the final likelihood or confidence score, where the magnitude of the positive value can be greater for smaller semantic distances. Similarly, a semantic distance that is greater than or equal to the threshold value can contribute a zero or negative value to the final likelihood or confidence score, where the magnitude of the negative value can be greater for larger semantic distances.

In some examples, the contextual information can include lighting data from light sensor 212 of user device 102. The lighting data can include a representation of a brightness of ambient light received by light sensor 212. In some examples, a higher brightness of the sensed ambient light when the spoken user input was received can be indicative that the user was more likely to have intended for the current spoken user input to be directed at the virtual assistant (e.g., indicating that the user is in an environment in which speaking is acceptable), while a lower brightness of the sensed ambient light when the spoken user input was received can be indicative that the user was less likely to have intended for the current spoken user input to be directed at the virtual assistant (e.g., indicating that the user is in an environment in which speaking is not acceptable, such as a movie theatre). However, in other examples, a lower brightness of the sensed ambient light when the spoken user input was received can be indicative that the user was more likely to have intended for the current spoken user input to be directed at the virtual assistant, while a higher brightness of the sensed ambient light when the spoken user input was received can be indicative that the user was less likely to have intended for the current spoken user input to be directed at the virtual assistant.

In one example rule-based system, one rule that can be used (alone, in combination with other rules, or as one of multiple conditions in other rules) is that if the brightness of the sensed ambient light when the spoken user input was received is greater than a threshold brightness, then it can be determined that the user intended for the current spoken user input to be directed at the virtual assistant. Another rule that can be used (alone, in combination with other rules, or as one of multiple conditions in other rules) is that if the brightness of the sensed ambient light when the spoken user input was received input is less than or equal to the threshold brightness, it can be determined that the user did not intend for the current spoken user input to be directed at the virtual assistant.

In one example probabilistic system, the brightness of the sensed ambient light when the spoken user input was received can be used to calculate a positive, negative, or neutral contribution to a final likelihood or confidence score, where the value of the contribution can have a linear or non-linear relationship with the value of the brightness of the sensed ambient light. For example, a brightness less than a threshold brightness can contribute a negative value to the final likelihood or confidence score, where the magnitude of the negative value can be greater for lower brightness values. Similarly, a brightness greater than or equal to the threshold brightness can contribute a zero or positive value to the final likelihood or confidence score, where the magnitude of the negative value can be greater for higher brightness values.

In some examples, the contextual information can include speech recognition data from an automatic speech recognition (ASR) engine located within or remote from user device 102 (e.g., from server system 110). The speech recognition data can include an indication of whether or not the ASR engine was able to recognize the spoken user input and/or is capable of responding to the spoken user input. In some examples, an indication that the ASR engine was able to recognize the spoken user input and/or is capable of responding to the spoken user input can be indicative that the user was more likely to have intended for the current spoken user input to be directed at the virtual assistant, while an indication that the ASR engine was not able to recognize the spoken user input and/or is not capable of responding to the spoken user input can be indicative that the user was less likely to have intended for the current spoken user input to be directed at the virtual assistant.

In one example rule-based system, one rule that can be used (alone, in combination with other rules, or as one of multiple conditions in other rules) is that if the ASR engine was able to recognize the spoken user input and/or is capable of responding to the spoken user input, then it can be determined that the user intended for the current spoken user input to be directed at the virtual assistant. Another rule that can be used (alone, in combination with other rules, or as one of multiple conditions in other rules) is that if the ASR engine was not able to recognize the spoken user input and/or is not capable of responding to the spoken user input, it can be determined that the user did not intend for the current spoken user input to be directed at the virtual assistant.

In one example probabilistic system, a determination that the ASR engine was able to recognize the spoken user input and/or is capable of responding to the spoken user input can contribute a positive value to the final likelihood or confidence score, while a determination that the ASR engine was not able to recognize the spoken user input and/or is not capable of responding to the spoken user input can contribute a zero or a negative value to the final likelihood or confidence score. The magnitude of the positive or negative contribution can be adjusted based on the overall system design.

In other examples, the speech recognition data from the ASR engine can further include an indication of the length (e.g., number of words, duration of speech, or the like) of the spoken user input. Generally, in some examples, a shorter length of the spoken user input can be indicative that the user was more likely to have intended for the current spoken user input to be directed at the virtual assistant, while a longer length of the spoken user input can be indicative that the user was less likely to have intended for the current spoken user input to be directed at the virtual assistant. However, in some examples, a longer length of the spoken user input can be indicative that the user was more likely to have intended for the current spoken user input to be directed at the virtual assistant, while a shorter length of the spoken user input can be indicative that the user was less likely to have intended for the current spoken user input to be directed at the virtual assistant.

In one example rule-based system, one rule that can be used (alone, in combination with other rules, or as one of multiple conditions in other rules) is that if the length of the spoken user input is less than a threshold length, then it can be determined that the user intended for the current spoken user input to be directed at the virtual assistant. Another rule that can be used (alone, in combination with other rules, or as one of multiple conditions in other rules) is that if the length of the spoken user input is greater than or equal to the threshold length, it can be determined that the user did not intend for the current spoken user input to be directed at the virtual assistant.

In one example probabilistic system, the length of the spoken user input can be used to calculate a positive, negative, or neutral contribution to a final likelihood or confidence score, where the value of the contribution can have a linear or non-linear relationship with the value of the length of the spoken user input. For example, a length less than a threshold length can contribute a positive value to the final likelihood or confidence score, where the magnitude of the positive value can be greater for shorter lengths. Similarly, a length greater than or equal to the threshold distance can contribute a zero or negative value to the final likelihood or confidence score, where the magnitude of the negative value can be greater for longer lengths.

In other examples, the speech recognition data from the ASR engine can further include noun or pronouns identified from within the spoken user input. For example, the speech recognition data can include noun or pronouns, such as "honey," "he," "she," or the first or last name of a person. Generally, in some examples, the presence of one of these nouns or pronouns can be indicative that the user was less likely to have intended for the current spoken user input to be directed at the virtual assistant, while the absence of one of these nouns or pronouns (or presence of non-human identifiers, such as "Siri") can be indicative that the user was more likely to have intended for the current spoken user input to be directed at the virtual assistant.

In one example rule-based system, one rule that can be used (alone, in combination with other rules, or as one of multiple conditions in other rules) is that if the spoken user input includes one of a set of nouns or pronouns, then it can be determined that the user did not intend for the current spoken user input to be directed at the virtual assistant. Another rule that can be used (alone, in combination with other rules, or as one of multiple conditions in other rules) is that if the spoken user input does not include one of the set of nouns or pronouns (or includes one of another set of nouns or pronouns), it can be determined that the user intended for the current spoken user input to be directed at the virtual assistant.

In one example probabilistic system, a determination that the spoken user input includes one of a set of nouns or pronouns can contribute a negative value to the final likelihood or confidence score, while a determination that the spoken user input does not include one of the set of nouns or pronouns (or includes one of another set of nouns or pronouns) can contribute a positive or zero value to the final likelihood or confidence score. The magnitude of the positive or negative contribution can be adjusted based on the overall system design.

In some examples, the contextual information can include user data from memory 250 or another storage device located within or remote from user device 102. The user data can include any type of information associated with the user, such as a contact list, calendar, preferences, personal information, financial information, family information, or the like. In some examples, the user data can be compared with other types of contextual information at block 308 to assist in the determination of whether or not the spoken user input was intend for the virtual assistant. For example, the time that the spoken user input was received can be compared with the user's calendar to determine if the user was at an event in which the user was more or less likely to be conversing with the virtual assistant of the user device, the speech recognition data from the ASR engine can be compared with contacts in the user's contact list to determine if the a name from the user's contact list was mentioned in the spoken user input, the speech recognition data from the ASR engine can be compared with user preferences to determine if the spoken user input corresponds to a previously defined phrase that should or should not be ignored by the virtual assistant, or the like.

In one example rule-based system, one rule that can be used (alone, in combination with other rules, or as one of multiple conditions in other rules) is that if the current spoken user input was received at a time within a predetermined set of times (e.g., when the user's calendar indicates that the user was in a meeting or otherwise engaged in an activity deemed to be one in which the user would not converse with a virtual assistant), then it can be determined that the user did not intend for the current spoken user input to be directed at the virtual assistant. Another rule that can be used (alone, in combination with other rules, or as one of multiple conditions in other rules) is that if the current spoken user input was received at a time outside the predetermined set of times (e.g., when the user's calendar indicates that the user was not in a meeting or otherwise engaged in an activity deemed to be one in which the user would not converse with a virtual assistant), it can be determined that the user intended for the current spoken user input to be directed at the virtual assistant. Other types of user data can similarly be used to generate rules that cause a determination to be made that the spoken user input was or was not intended for the virtual assistant.

In one example probabilistic system, a determination that the current spoken user input was received at a time that the user's calendar indicates that the user was in a meeting or otherwise engaged in an activity deemed to be one in which the user would not converse with a virtual assistant can contribute a negative or zero value to the final likelihood or confidence score, while a determination that the current spoken user input was received at a time that the user's calendar indicates that the user was not in a meeting or otherwise engaged in an activity deemed to be one in which the user would not converse with a virtual assistant can contribute a positive value to the final likelihood or confidence score. The magnitude of the positive or negative contribution can be adjusted based on the overall system design. It should be appreciated that other types of user data can be used in a similar manner to make positive, negative, or neutral contributions to the final likelihood or confidence score.

In some examples, the contextual information can include motion data from motion sensor 210 or an accelerometer of other sensors 216 of user device 102. The motion data can represent movement of the user device and can be used to detect movement of the device caused by the user shaking the device, movement of the device toward or away from the user (e.g., movement toward or away from the user's mouth), movement caused by the user wearing the device (e.g., as a watch or other wearable device), or the like. In some examples, certain motions experienced by the user device (e.g., shaking, movement associated with the user device being worn by the user, movement toward the user, etc.) can be indicative that the user was more likely to have intended for the current spoken user input to be directed at the virtual assistant, while other motions experienced by the user device (e.g., movement away from the user) can be indicative that the user was less likely to have intended for the current spoken user input to be directed at the virtual assistant.

In one example rule-based system, one rule that can be used (alone, in combination with other rules, or as one of multiple conditions in other rules) is that if the motion data indicates that the user device was moved toward the user's mouth before the spoken user input was received, then it can be determined that the user intended for the current spoken user input to be directed at the virtual assistant. Another rule that can be used (alone, in combination with other rules, or as one of multiple conditions in other rules) is that if the motion data indicates that the device was not moved toward the user's mouth before the spoken user input was received, it can be determined that the user did not intend for the current spoken user input to be directed at the virtual assistant. Other movements can similarly be used to generate rules that cause a determination to be made that the spoken user input was or was not intended for the virtual assistant.

In one example probabilistic system, a determination that the user device was moved in one of a predetermined set of movements (e.g., toward the user's mouth before the spoken user input was received) can contribute a positive value to the final likelihood or confidence score, while a determination that user device was not moved in one of a predetermined set of movements can contribute a zero or a negative value to the final likelihood or confidence score. The magnitude of the positive or negative contribution can be adjusted based on the overall system design. It should be appreciated that other movements can be used in a similar manner to make positive, negative, or neutral contributions to the final likelihood or confidence score.

In some examples, the contextual information can include temperature data from a temperature sensor of other sensors 216 of user device 102. The temperature data can represent a temperature sensed by the temperature sensor and can be used to determine whether or not the user device is being held by the user. For example, a higher temperature or a temperature in a particular range can suggest that the device is being held in the hand of a user, while a lower temperature or a temperature outside the particular range can suggest that the device is not being held by the user.

In one example rule-based system, one rule that can be used (alone, in combination with other rules, or as one of multiple conditions in other rules) is that if the temperature is within a particular range of temperatures corresponding to the user device being held by a user, then it can be determined that the user intended for the current spoken user input to be directed at the virtual assistant. Another rule that can be used (alone, in combination with other rules, or as one of multiple conditions in other rules) is that if the temperature is not within a particular range of temperatures corresponding to the user device being held by a user, it can be determined that the user did not intend for the current spoken user input to be directed at the virtual assistant.

In one example probabilistic system, a determination, based on the temperature data, that the user device was being held by the user when the spoken user input was received can contribute a positive value to the final likelihood or confidence score, while a determination, based on the temperature data, that the user device was not being held by the user when the spoken user input was received can contribute a zero or a negative value to the final likelihood or confidence score. The magnitude of the positive or negative contribution can be adjusted based on the overall system design.

Electronic Device

Figure 5:
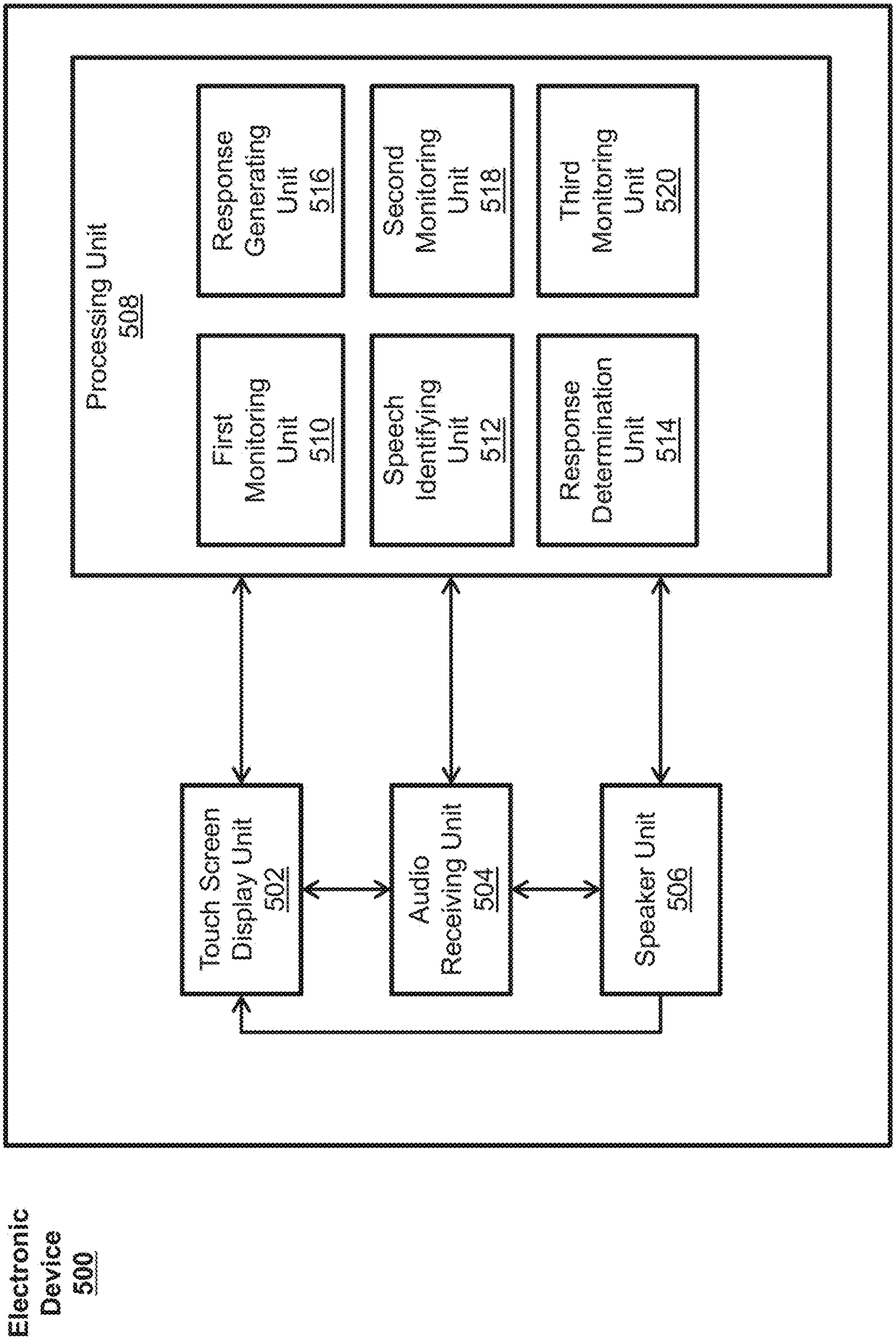
FIG. 5 illustrates a functional block diagram of an electronic device configured to selectively process and respond to a spoken user input using contextual information according to various examples.

In accordance with some examples, FIG. 5 shows a functional block diagram of an electronic device 500 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 5 can be combined or separated into sub-blocks to implement the principles of the various described examples. Therefore, the description herein optionally supports any possible combination or separation or further definition of the functional blocks described herein.

As shown in FIG. 5, electronic device 500 can include a touch screen display unit 502 configured to display a user interface and to receive touch input, and a sound receiving unit 504 configured to receive sound input. In some examples, electronic device 500 can include a speaker unit 506 configured to generate sound. Electronic device 500 can further include a processing unit 508 coupled to touch screen display unit 502 and sound receiving unit 504 (and, optionally, coupled to speaker unit 506). In some examples, processing unit 508 can include a first monitoring unit 510, a speech identifying unit 512, a response determination unit 514, a response generating unit 516, a second monitoring unit 518, and a third monitoring unit 520.

Processing unit 508 can be configured to receive an audio input (e.g., from audio receiving unit 504). Processing unit 508 can be configured to monitor the audio input (e.g., using first monitoring unit 510) to identify a first spoken user input in the audio input. Upon identifying the first spoken user input in the audio input, processing unit 508 can be configured to determine (e.g., using response determination unit 514), based on contextual information associated with the first spoken user input, whether a response to the first spoken user input should be generated. In response to determining that a response should be generated, processing unit 508 can be configured to generate a response (e.g., using response generating unit 516) to the first spoken user input and to again monitor the received audio input for a second spoken user request (e.g., using second monitoring unit 518). In response to determining that a response should not be generated, processing unit 508 can be configured to again monitor the received audio input for a second spoken user request (e.g., using second monitoring unit 518) without generating a response to the first spoken user input.

In some examples, processing unit 508 can be configured to determine (e.g., using response determination unit 514) whether to respond to the first spoken user input without identifying one or more predetermined words at the start of the first spoken user input. In other examples, processing unit 508 can be configured to determine (e.g., using response determination unit 514) whether to respond to the first spoken user input without identifying a physical or virtual button input received prior to receiving the first spoken user input.

In some examples, processing unit 508 can be configured to generate a response (e.g., using response generating unit 516) to the first spoken user input by performing speech-to-text conversion on the first spoken user input, determining a user intent based on the first spoken user input, determining a task to be performed based on the first spoken user input, determining a parameter for the task to be performed based on the first spoken user input, performing the task to be performed, displaying a text response to the first spoken user input, or outputting an audio response to the first spoken user input.

In some examples, processing unit 508 can be configured to determine (e.g., using response determination unit 514) whether to respond to the first spoken user input by evaluating one or more conditional rules that depend on the contextual information associated with the first spoken user input.

In some examples, processing unit 508 can be configured to determine (e.g., using response determination unit 514) whether to respond to the first spoken user input by calculating a likelihood score that the virtual assistant should respond to the first spoken user input based on the contextual information associated with the first spoken user input and comparing the likelihood score to a threshold value.

In some examples, processing unit 508 can be configured to determine (e.g., using response determination unit 514) whether to respond to the first spoken user input based on contextual information associated with the first spoken user input that includes one or more of an elapsed time between receiving the first spoken user input and a previous user input, a previous spoken user input, a distance between a user and the electronic device when the first spoken user input was received, an orientation of the electronic device when the first spoken user input was received, an orientation between the user and the electronic device when the first spoken user input was received, a direction of the user's eyes when the first spoken user input was received, an indication of whether the first spoken user input was recognized by an automatic speech recognizer, a semantic relationship between the first spoken user input and the previous spoken user input, a length of the first spoken user input, an identification of a speaker of the first spoken user input, a time the first spoken user input was received, an indication of whether the electronic device was outputting information to the user when the first spoken user input was received, an expectation of receiving input from the user, an indication of whether the electronic device was being held when the first spoken user input was received, an operating state of the electronic device when the first spoken user input was received, a previous action performed by the electronic device, an indication of whether content was being displayed by the electronic device when the first spoken user input was received, a semantic relationship between the first spoken user input and the content being displayed by the electronic device when the first spoken user input was received, a position of the user when the first spoken user input was received, a gesture being performed by the user when the first spoken user input was received, a previous output of the electronic device, a location of the electronic device when the first spoken user input was received, an application being run by the electronic device when the first spoken user input was received, a previous contact, a previous email, a previous SMS message, a movement of the electronic device when the first spoken user input was received, a user setting of the electronic device, an amount of light sensed by the electronic device when the first spoken user input was received, and calendar data.

In some examples, processing unit 508 can be configured to determine (e.g., using response determination unit 514) whether to respond to the first spoken user input by calculating a likelihood score that the virtual assistant should respond to the first spoken user input based on contextual information that includes an elapsed time between receiving the first spoken user input and a previous user input. In these examples, calculating the likelihood score can include decreasing the likelihood score in response to a value of the elapsed time being greater than a threshold duration and increasing the likelihood score in response to the value of the elapsed time being less than the threshold duration. In some examples, the previous user input can include a previously received touch input on a touch sensitive display, a mouse click, a button press, or a spoken user input.

In some examples, processing unit 508 can be configured to determine (e.g., using response determination unit 514) whether to respond to the first spoken user input by calculating a likelihood score that the virtual assistant should respond to the first spoken user input based on contextual information that includes a previous spoken user input. In these examples, calculating the likelihood score can include increasing the likelihood score in response to detecting a match between the previous spoken user input and the first spoken user input.

In some examples, processing unit 508 can be configured to determine (e.g., using response determination unit 514) whether to respond to the first spoken user input by calculating a likelihood score that the virtual assistant should respond to the first spoken user input based on contextual information that includes a distance between a user and the electronic device when the first spoken user input was received. In these examples, calculating the likelihood score can include decreasing the likelihood score in response to the distance being greater than a threshold distance and increasing the likelihood score in response to the distance being less than the threshold distance. In some examples, the distance can be determined based at least in part on a volume of the first spoken user input, a distance measured by a proximity sensor, an image generated by an image sensor, or accelerometer data from an accelerometer.

In some examples, processing unit 508 can be configured to determine (e.g., using response determination unit 514)

whether to respond to the first spoken user input by calculating a likelihood score that the virtual assistant should respond to the first spoken user input based on contextual information that includes an orientation of the electronic device when the first spoken user input was received. In these examples, calculating the likelihood score can include decreasing the likelihood score in response to the orientation of the device being facedown or upside down and increasing the likelihood score in response to the orientation of the device being face up or upright.

In some examples, processing unit 508 can be configured to determine (e.g., using response determination unit 514) whether to respond to the first spoken user input by calculating a likelihood score that the virtual assistant should respond to the first spoken user input based on contextual information that includes an orientation between the user and the electronic device when the first spoken user input was received. In these examples, calculating the likelihood score can include increasing the likelihood score in response to the orientation being one in which a display of the electronic device is oriented towards the user and decreasing the likelihood score in response to the orientation being one in which the display of the electronic device is oriented away from the user.

In some examples, processing unit 508 can be configured to determine (e.g., using response determination unit 514) whether to respond to the first spoken user input by calculating a likelihood score that the virtual assistant should respond to the first spoken user input based on contextual information that includes a direction of the user's eyes when the first spoken user input was received. In these examples, calculating the likelihood score can include increasing the likelihood score in response to the direction of the user's eyes being pointed at the electronic device and decreasing the likelihood score in response to the direction of the user's eyes being pointed away from the electronic device.

In some examples, processing unit 508 can be configured to determine (e.g., using response determination unit 514) whether to respond to the first spoken user input by calculating a likelihood score that the virtual assistant should respond to the first spoken user input based on contextual information that includes an indication of whether the first spoken user input was recognized by an automatic speech recognizer. In these examples, calculating the likelihood score can include increasing the likelihood score in response to the indication indicating that the first spoken user input was recognized by the automatic speech recognizer and decreasing the likelihood score in response to the indication indicating that the first spoken user input was not recognized by the automatic speech recognizer.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and the previous spoken user input. In these examples, calculating the likelihood score can include increasing the likelihood score in response to a value of the semantic relationship being greater than a spoken user input semantic threshold value and decreasing the likelihood score in response to the value of the semantic relationship being less than the spoken user input semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a length of the first spoken user input. In these examples, calculating the likelihood score can include increasing the likelihood score in response to the length of the first spoken user input less than a threshold length and decreasing the likelihood score in response to the length of the first spoken user input being greater than the threshold length.

In some examples, processing unit 508 can be configured to determine (e.g., using response determination unit 514) whether to respond to the first spoken user input by calculating a likelihood score that the virtual assistant should respond to the first spoken user input based on contextual information that includes an identification of a speaker of the first spoken user input. In some examples, calculating the likelihood score can include increasing the likelihood score in response to the identification of the speaker of the first spoken user input being one of a list of known or authorized speakers and decreasing the likelihood score in response to the identification of the speaker of the first spoken user input not being one of a list of known or authorized speakers. In other examples, calculating the likelihood score can include increasing the likelihood score in response to the identification of the speaker of the first spoken user input being the same as an identification of a speaker of the previous spoken user input and decreasing the likelihood score in response to the identification of the speaker of the first spoken user input being different than the identification of the speaker of the previous spoken user input.

In some examples, processing unit 508 can be configured to determine (e.g., using response determination unit 514) whether to respond to the first spoken user input by calculating a likelihood score that the virtual assistant should respond to the first spoken user input based on contextual information that includes a time the first spoken user input was received. In these examples, calculating the likelihood score can include increasing the likelihood score in response to the time being within a predetermined set of times and decreasing the likelihood score in response to the time not being within the predetermined set of times.

In some examples, processing unit 508 can be configured to determine (e.g., using response determination unit 514) whether to respond to the first spoken user input by calculating a likelihood score that the virtual assistant should respond to the first spoken user input based on contextual information that includes an indication of whether the electronic device was outputting information to the user when the first spoken user input was received. In these examples, calculating the likelihood score can include increasing the likelihood score in response to the indication indicating that the electronic device was outputting information to the user when the first spoken user input was received and decreasing the likelihood score in response to the indication indicating that the electronic device was not outputting information to the user when the first spoken user input was received.

In some examples, processing unit 508 can be configured to determine (e.g., using response determination unit 514) whether to respond to the first spoken user input by calculating a likelihood score that the virtual assistant should respond to the first spoken user input based on contextual information that includes an expectation of receiving input from the user. In these examples, calculating the likelihood score can include increasing the likelihood score in response to the expectation of receiving input from the user indicating that input was expected to be received from the user and decreasing the likelihood score in response to the expectation of receiving input from the user indicating that input was not expected to be received from the user.

In some examples, processing unit 508 can be configured to determine (e.g., using response determination unit 514) whether to respond to the first spoken user input by calculating a likelihood score that the virtual assistant should respond to the first spoken user input based on contextual information that includes an indication of whether the electronic device is being held when the first spoken user input was received. In these examples, calculating the likelihood score can include increasing the likelihood score in response to the indication indicating that the electronic device was being held when the first spoken user input was received and decreasing the likelihood score in response to the indication indicating that the electronic device was not being held when the first spoken user input was received.

In some examples, processing unit 508 can be configured to determine (e.g., using response determination unit 514) whether to respond to the first spoken user input by calculating a likelihood score that the virtual assistant should respond to the first spoken user input based on contextual information that includes an operating state of the electronic device when the first spoken user input was received. In these examples, calculating the likelihood score can include increasing the likelihood score in response to the operating state of the electronic device being one of a set of predetermined operating states and decreasing the likelihood score in response to the operating state of the electronic device not being one of the set of predetermined operating states.

In some examples, processing unit 508 can be configured to determine (e.g., using response determination unit 514) whether to respond to the first spoken user input by calculating a likelihood score that the virtual assistant should respond to the first spoken user input based on contextual information that includes a previous action performed by the electronic device. In these examples, calculating the likelihood score can include increasing the likelihood score in response to the previous action performed by the electronic device being one of a set of predetermined actions and decreasing the likelihood score in response to the previous action performed by the electronic device not being one of the set of predetermined actions.

In some examples, processing unit 508 can be configured to determine (e.g., using response determination unit 514) whether to respond to the first spoken user input by calculating a likelihood score that the virtual assistant should respond to the first spoken user input based on contextual information that includes an indication of whether the content was being displayed by the electronic device when the first spoken user input was received. In these examples, calculating the likelihood score can include increasing the likelihood score in response to the indication indicating that content was being displayed by the electronic device when the first spoken user input was received.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and content being displayed by the electronic device when the first spoken user input was received. In these examples, calculating the likelihood score can include increasing the likelihood score in response to a value of the semantic relationship being greater than a content semantic threshold value and decreasing the likelihood score in response to the value of the semantic relationship being less than the content semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a position of the user when the first spoken user input was received. In these examples, calculating the likelihood score can include increasing the likelihood score in response to the position of the user being one of a predetermined set of positions and decreasing the likelihood score in response to the position of the user not being one of the predetermined set of positions.

In some examples, processing unit 508 can be configured to determine (e.g., using response determination unit 514) whether to respond to the first spoken user input by calculating a likelihood score that the virtual assistant should respond to the first spoken user input based on contextual information that includes a gesture being performed by the user when the first spoken user input was received. In these examples, calculating the likelihood score can include increasing the likelihood score in response to the gesture being one of a predetermined set of gestures and decreasing the likelihood score in response to the gesture not being one of the predetermined set of gestures.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and the previous output of the electronic device. In these examples, calculating the likelihood score can include increasing the likelihood score in response to a value of the semantic relationship being greater than a previous output semantic threshold value and decreasing the likelihood score in response to the value of the semantic relationship being less than the previous output semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a location of the electronic device when the first spoken user input was received. In these examples, calculating the likelihood score can include decreasing the likelihood score in response to the location being one of a predetermined set of locations and increasing the likelihood score in response to the location not being one of the predetermined set of locations.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input an application being run by the electronic device when the first spoken user input was received. In these examples, calculating the likelihood score can include increasing the likelihood score in response to a value of the semantic relationship being greater than an application semantic threshold value and decreasing the likelihood score in response to the value of the semantic relationship being less than the application semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and a previous contact. In these examples, calculating the likelihood score can include increasing the likelihood score in response to a value of the semantic relationship being greater than a previous contact semantic threshold value and decreasing the likelihood score in response to the value of the semantic relationship being less than the previous contact semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and a previous email. In these examples, calculating the likelihood score can include increasing the likelihood score in response to a value of the semantic relationship being greater than a previous email semantic threshold value and decreasing the likelihood score in response to the value of the semantic relationship being less than the previous email semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and a previous SMS message. In these examples, calculating the likelihood score can include increasing the likelihood score in response to a value of the semantic relationship being greater than a previous SMS message semantic threshold value and decreasing the likelihood score in response to the value of the semantic relationship being less than the previous SMS semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a movement of the electronic device. In these examples, calculating the likelihood score can include increasing the likelihood score in response to the movement being one of a predetermined set of movements and decreasing the likelihood score in response to the movement not being one of the predetermined set of movements.

In some examples, processing unit 508 can be configured to determine (e.g., using response determination unit 514) whether to respond to the first spoken user input by calculating a likelihood score that the virtual assistant should respond to the first spoken user input based on contextual information that includes a user setting. In these examples, calculating the likelihood score can include increasing the likelihood score in response to the user setting being one of a predetermined set of user settings and decreasing the likelihood score in response to the user setting not being one of the predetermined set of user settings.

In some examples, processing unit 508 can be configured to determine (e.g., using response determination unit 514) whether to respond to the first spoken user input by calculating a likelihood score that the virtual assistant should respond to the first spoken user input based on contextual information that includes an amount of light sensed by the electronic device. In these examples, calculating the likelihood score can include increasing the likelihood score in response to the amount of light being greater than a threshold amount of light and decreasing the likelihood score in response to the amount of light being less than the threshold amount of light.

In some examples, processing unit 508 can be configured to determine (e.g., using response determination unit 514) whether to respond to the first spoken user input by calculating a likelihood score that the virtual assistant should respond to the first spoken user input based on contextual information that includes calendar data. In these examples, calculating the likelihood score can include decreasing the likelihood score in response to the calendar data indicating that the user is occupied at the time that the first spoken user input was received.

Processing unit 508 can be further configured to monitor the audio input (e.g., using second monitoring unit 518) to identify a second spoken user input in the audio input. Upon identifying the second spoken user input in the audio input, processing unit 508 can be configured to determine (e.g., using response determination unit 514), based on contextual information associated with the second spoken user input, whether a response to the second spoken user input should be generated. In response to determining that a response should be generated, processing unit 508 can be configured to generate a response (e.g., using response generating unit 516) to the second spoken user input and to again monitor the received audio input for a third spoken user request (e.g., using third monitoring unit 520). In response to determining that a response should not be generated, processing unit 508 can be configured to again monitor the received audio input for the third spoken user request (e.g., using third monitoring unit 520) without generating a response to the second spoken user input.

As described above, one aspect of the present technology is the gathering and use of data available from various sources to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A non-transitory computer-readable storage medium storing one or more programs, the one or more programs comprising instructions, which when executed by one or more processors of an electronic device with a camera, cause the electronic device to:

receive a first spoken input, wherein the first spoken input requests performance of a first task;

initiate a virtual assistant;

perform, by the initiated virtual assistant, the first task based on the first spoken input;

provide, at a first time, a first response indicating the performance of the first task, wherein providing the first response includes providing at least one of audio output and displayed output;

capture, via the camera, an image;

after the first time, monitor received audio input to identify a second spoken input in the audio input; and in response to identifying the second spoken input in the audio input and without detection of a start-point identifier for the virtual assistant:

in accordance with a determination that a set of virtual assistant response criteria is satisfied, wherein the set of virtual assistant response criteria includes a first criterion that is satisfied when the first spoken input and the second spoken input correspond to a same user and a second criterion that is satisfied when the image is analyzed to determine that a user is performing a particular action when the second spoken input was received:

perform, by the virtual assistant, a second task based on the second spoken input; and provide a second response indicating performance of the second task.

2. The non-transitory computer-readable storage medium of claim 1, wherein the start-point identifier for the virtual assistant includes a button press.

3. The non-transitory computer-readable storage medium of claim 1, wherein the start-point identifier for the virtual assistant includes a spoken trigger for the virtual assistant.

4. The non-transitory computer-readable storage medium of claim 1, wherein the one or more programs further comprise instructions, which when executed by the one or more processors, cause the electronic device to:

while monitoring the received audio input, output a visual indicator, wherein the visual indicator indicates that the electronic device is capable of responding to received spoken input without detecting the start-point identifier.

5. The non-transitory computer-readable storage medium of claim 1, wherein the determination that the first criterion is satisfied is based on performing speaker recognition on the first spoken input and the second spoken input.

6. The non-transitory computer-readable storage medium of claim 1, wherein the set of virtual assistant response criteria includes a third criterion that is satisfied when the same user is an authorized user of the electronic device.

7. The non-transitory computer-readable storage medium of claim 1, wherein the one or more programs further comprise instructions, which when executed by the one or more processors, cause the electronic device to:

capture, via the camera, a second image, wherein the set of virtual assistant response criteria includes a third criterion that is satisfied when the second image is analyzed to determine that the same user faces the electronic device when the second spoken input is received.

8. The non-transitory computer-readable storage medium of claim 1, wherein the set of virtual assistant response criteria includes a third criterion that is satisfied when a second image is analyzed to determine that the same user is gazing at the electronic device when the second spoken input is received.

9. The non-transitory computer-readable storage medium of claim 1, wherein the one or more programs further comprise instructions, which when executed by the one or more processors, cause the electronic device to:

capture, via the camera, a second image, wherein the set of virtual assistant response criteria includes a third criterion that is satisfied when the second image is analyzed to determine that the same user is in a field of view of the camera when the second spoken input is received.

10. The non-transitory computer-readable storage medium of claim 1, wherein the set of virtual assistant response criteria includes a third criterion that is satisfied when the second spoken input is received before a predetermined duration from the first time elapses.

11. The non-transitory computer-readable storage medium of claim 1, wherein the set of virtual assistant response criteria includes a third criterion that is satisfied when the electronic device is in a predetermined location when the second spoken input is received.

12. The non-transitory computer-readable storage medium of claim 11, wherein the predetermined location is a home of the same user.

13. The non-transitory computer-readable storage medium of claim 1, wherein the set of virtual assistant response criteria includes a third criterion that is satisfied based on a semantic relationship between the second spoken input and the first spoken input.

14. The non-transitory computer-readable storage medium of claim 1, wherein the set of virtual assistant response criteria includes a third criterion that is satisfied based on a semantic relationship between the second spoken input and the first response.

15. The non-transitory computer-readable storage medium of claim 1, wherein the set of virtual assistant response criteria includes a third criterion that is satisfied when the second spoken input is recognized by an automatic speech recognizer.

16. The non-transitory computer-readable storage medium of claim 1, wherein the one or more programs further comprise instructions, which when executed by the one or more processors, cause the electronic device to:

in response to identifying the second spoken input in the audio input and without detection of the start-point identifier for the virtual assistant:

in accordance with a determination that the set of virtual assistant response criteria is not satisfied, forgo performing, by the virtual assistant, the second task based on the second spoken input.

17. A method, comprising:

at an electronic device with a camera, one or more processors and memory:

receiving a first spoken input, wherein the first spoken input requests performance of a first task;

initiating a virtual assistant;

performing, by the initiated virtual assistant, the first task based on the first spoken input;

providing, at a first time, a first response indicating the performance of the first task, wherein providing the first response includes providing at least one of audio output and displayed output;

capturing, via the camera, an image;

after the first time, monitoring received audio input to identify a second spoken input in the audio input; and in response to identifying the second spoken input in the audio input and without detection of a start-point identifier for the virtual assistant:

in accordance with a determination that a set of virtual assistant response criteria is satisfied, wherein the set of virtual assistant response criteria includes a first criterion that is satisfied when the first spoken input and the second spoken input correspond to a same user and a second criterion that is satisfied when the image is analyzed to determine that a user is performing a particular action when the second spoken input was received:

performing, by the virtual assistant, a second task based on the second spoken input; and providing a second response indicating performance of the second task.

18. The method of claim 17, wherein the start-point identifier for the virtual assistant includes a button press.

19. The method of claim 17, wherein the start-point identifier for the virtual assistant includes a spoken trigger for the virtual assistant.

20. The method of claim 17, further comprising:

while monitoring the received audio input, outputting a visual indicator, wherein the visual indicator indicates that the electronic device is capable of responding to received spoken input without detecting the start-point identifier.

21. The method of claim 17, wherein the determination that the first criterion is satisfied is based on performing speaker recognition on the first spoken input and the second spoken input.

22. The method of claim 17, wherein the set of virtual assistant response criteria includes a third criterion that is satisfied when the same user is an authorized user of the electronic device.

23. The method of claim 17, further comprising:

capturing, via the camera, a second image, wherein the set of virtual assistant response criteria includes a third criterion that is satisfied when the second image is analyzed to determine that the same user faces the electronic device when the second spoken input is received.

24. The method of claim 17, wherein the set of virtual assistant response criteria includes a third criterion that is satisfied when a second image is analyzed to determine that the same user is gazing at the electronic device when the second spoken input is received.

25. The method of claim 17, further comprising:

capturing, via the camera, a second image, wherein the set of virtual assistant response criteria includes a third criterion that is satisfied when the second image is analyzed to determine that the same user is in a field of view of the camera when the second spoken input is received.

26. The method of claim 17, wherein the set of virtual assistant response criteria includes a third criterion that is satisfied when the second spoken input is received before a predetermined duration from the first time elapses.

27. The method of claim 17, wherein the set of virtual assistant response criteria includes a third criterion that is satisfied when the electronic device is in a predetermined location when the second spoken input is received.

28. The method of claim 27, wherein the predetermined location is a home of the same user.

29. The method of claim 17, wherein the set of virtual assistant response criteria includes a third criterion that is satisfied based on a semantic relationship between the second spoken input and the first spoken input.

30. The method of claim 17, wherein the set of virtual assistant response criteria includes a third criterion that is satisfied based on a semantic relationship between the second spoken input and the first response.

31. The method of claim 17, wherein the set of virtual assistant response criteria includes a third criterion that is satisfied when the second spoken input is recognized by an automatic speech recognizer.

32. The method of claim 17, further comprising:

in response to identifying the second spoken input in the audio input and without detection of the start-point identifier for the virtual assistant:

in accordance with a determination that the set of virtual assistant response criteria is not satisfied, forgoing performing, by the virtual assistant, the second task based on the second spoken input.

33. An electronic device, comprising:

a camera;

one or more processors;

memory; and one or more programs, wherein the one or more programs are stored in the memory and configured to be executed by the one or more processors, the one or more programs including instructions for:

receiving a first spoken input, wherein the first spoken input requests performance of a first task;

initiating a virtual assistant;

performing, by the initiated virtual assistant, the first task based on the first spoken input;

providing, at a first time, a first response indicating the performance of the first task, wherein providing the first response includes providing at least one of audio output and displayed output;

capturing, via the camera, an image;

after the first time, monitoring received audio input to identify a second spoken input in the audio input; and in response to identifying the second spoken input in the audio input and without detection of a start-point identifier for the virtual assistant:

in accordance with a determination that a set of virtual assistant response criteria is satisfied, wherein the set of virtual assistant response criteria includes a first criterion that is satisfied when the first spoken input and the second spoken input correspond to a same user and a second criterion that is satisfied when the image is analyzed to determine that a user is performing a particular action when the second spoken input was received:

performing, by the virtual assistant, a second task based on the second spoken input; and providing a second response indicating performance of the second task.

34. The electronic device of claim 33, wherein the start-point identifier for the virtual assistant includes a button press.

35. The electronic device of claim 33, wherein the start-point identifier for the virtual assistant includes a spoken trigger for the virtual assistant.

36. The electronic device of claim 33, wherein the one or more programs further include instructions for:

while monitoring the received audio input, outputting a visual indicator, wherein the visual indicator indicates that the electronic device is capable of responding to received spoken input without detecting the start-point identifier.

37. The electronic device of claim 33, wherein the determination that the first criterion is satisfied is based on performing speaker recognition on the first spoken input and the second spoken input.

38. The electronic device of claim 33, wherein the set of virtual assistant response criteria includes a third criterion that is satisfied when the same user is an authorized user of the electronic device.

39. The electronic device of claim 33, wherein the one or more programs further include instructions for:

capturing, via the camera, a second image, wherein the set of virtual assistant response criteria includes a third criterion that is satisfied when the second image is analyzed to determine that the same user faces the electronic device when the second spoken input is received.

40. The electronic device of claim 33, wherein the set of virtual assistant response criteria includes a third criterion that is satisfied when a second image is analyzed to determine that the same user is gazing at the electronic device when the second spoken input is received.

41. The electronic device of claim 33, wherein the one or more programs include instructions for:

capturing, via the camera, a second image, wherein the set of virtual assistant response criteria includes a third criterion that is satisfied when the second image is analyzed to determine that the same user is in a field of view of the camera when the second spoken input is received.

42. The electronic device of claim 33, wherein the set of virtual assistant response criteria includes a third criterion that is satisfied when the second spoken input is received before a predetermined duration from the first time elapses.

43. The electronic device of claim 33, wherein the set of virtual assistant response criteria includes a third criterion that is satisfied when the electronic device is in a predetermined location when the second spoken input is received.

44. The electronic device of claim 43, wherein the predetermined location is a home of the same user.

45. The electronic device of claim 33, wherein the set of virtual assistant response criteria includes a third criterion that is satisfied based on a semantic relationship between the second spoken input and the first spoken input.

46. The electronic device of claim 33, wherein the set of virtual assistant response criteria includes a third criterion that is satisfied based on a semantic relationship between the second spoken input and the first response.

47. The electronic device of claim 33, wherein the set of virtual assistant response criteria includes a third criterion that is satisfied when the second spoken input is recognized by an automatic speech recognizer.

48. The electronic device of claim 33, wherein the one or more programs further include instructions for:

in response to identifying the second spoken input in the audio input and without detection of the start-point identifier for the virtual assistant:

in accordance with a determination that the set of virtual assistant response criteria is not satisfied, forgoing performing, by the virtual assistant, the second task based on the second spoken input.

* * * * *